US012235413B2

(12) United States Patent
Nitta

(10) Patent No.: US 12,235,413 B2
(45) Date of Patent: *Feb. 25, 2025

(54) IMAGING LENS

(71) Applicant: TOKYO VISIONARY OPTICS CO., LTD., Tokyo (JP)

(72) Inventor: Koji Nitta, Tokyo (JP)

(73) Assignee: TOKYO VISIONARY OPTICS Co., Ltd., Tokyo (JP)

(*) Notice: Subject to any disclaimer, the term of this patent is extended or adjusted under 35 U.S.C. 154(b) by 59 days.

This patent is subject to a terminal disclaimer.

(21) Appl. No.: 17/392,595

(22) Filed: Aug. 3, 2021

(65) Prior Publication Data

US 2021/0373297 A1 Dec. 2, 2021

Related U.S. Application Data

(63) Continuation of application No. 16/405,307, filed on May 7, 2019, now Pat. No. 11,567,298.

(30) Foreign Application Priority Data

May 7, 2018 (JP) .................................. 2018-089463

(51) Int. Cl.
G02B 13/00 (2006.01)
G02B 9/64 (2006.01)
(52) U.S. Cl.
CPC ........... *G02B 13/0045* (2013.01); *G02B 9/64* (2013.01)
(58) Field of Classification Search
CPC .......................... G02B 13/001; G02B 13/0015; G02B 13/002; G02B 13/0045; G02B 9/00;

(Continued)

(56) References Cited

U.S. PATENT DOCUMENTS

2017/0052350 A1 2/2017 Chen
2017/0329108 A1* 11/2017 Hashimoto .............. G02B 9/64
(Continued)

FOREIGN PATENT DOCUMENTS

CN 107678140 A 2/2018
CN 107703608 A * 2/2018 ......... G02B 13/0045

OTHER PUBLICATIONS

English machine translation of CN 107703608 A and original Zhou et al CN-107703608-A (Year: 2018).*

Primary Examiner — Marin Pichler
(74) Attorney, Agent, or Firm — Maine Cernota & Curran

(57) ABSTRACT

There is provided an imaging lens with high-resolution which satisfies demand of the wide field of view, the low-profileness and the low F-number, and excellently corrects aberrations. An imaging lens comprises in order from an object side to an image side, a first lens having a convex surface facing the object side near an optical axis, a second lens, a third lens having negative refractive power near the optical axis, a fourth lens, a fifth lens, a sixth lens, a seventh lens, and an eighth lens having a concave surface facing the image side and the negative refractive power near the optical axis, wherein an image-side surface of said eighth lens is formed as an aspheric surface having at least one pole point in a position off the optical axis, said sixth lens has positive refractive power near the optical axis, an object-side surface of said seventh lens is a convex surface facing the object side near the optical axis, and a below conditional expression (1) is satisfied:

$0.15 < vd7/vd8 < 0.55$ where
vd7: an abbe number at d-ray of the seventh lens,
vd8: an abbe number at d-ray of the eighth lens.

14 Claims, 30 Drawing Sheets

(58) Field of Classification Search
CPC . G02B 9/64; G02B 9/62; G02B 1/041; G02B 27/0025
USPC .................. 359/708, 713, 750, 754, 755
See application file for complete search history.

(56) References Cited

U.S. PATENT DOCUMENTS

2019/0056568 A1\*  2/2019  Huang ............... G02B 13/0045
2019/0121098 A1   4/2019  Zhou et al.
2020/0249437 A1\*  8/2020  Hirano ............... G02B 13/0045

\* cited by examiner

IMAGING LENS

The present application is based on and claims priority of a Japanese patent application No. 2018-089463 filed on May 7, 2018, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly relates to an imaging lens which is built in a smartphone and a mobile phone which become increasingly compact and excellent in performance, an information terminal such as a PDA (Personal Digital Assistant), a game console, PC and a robot, and moreover, a home appliance with camera function, a monitoring camera and an automobile.

Description of the Related Art

In recent years, it becomes common that camera function is mounted in a home appliance, information terminal equipment, an automobile and public transportation. Demand of products with the camera function is more increased, and development of products is being made accordingly.

The imaging lens mounted in such equipment is required to be compact and to have high-resolution performance.

As a conventional imaging lens aiming high performance, for example, the imaging lens disclosed in Patent Document 1 (CN107678140A) has been known.

Patent Document 1 discloses an imaging lens comprising, in order from an object side, a first lens, a second lens having positive refractive power, a third lens, a fourth lens, a fifth lens, a sixth lens, a seventh lens having a convex surface facing an image side, and an eighth lens.

SUMMARY OF THE INVENTION

However, in lens configurations disclosed in the Patent Document 1, when wide field of view, low-profileness and low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low-profileness and the low F-number in well balance and excellently corrects aberrations.

Regarding terms used in the present invention, "a convex surface", "a concave surface" or "a plane surface" of lens surfaces implies that a shape of the lens surface near an optical axis (paraxial portion). "Refractive power" implies the refractive power near the optical axis. "A pole point" implies an off-axial point on an aspheric surface at which a tangential plane intersects the optical axis perpendicularly. "A Total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens having a convex surface facing the object side near an optical axis, a second lens, a third lens having negative refractive power near the optical axis, a fourth lens, a fifth lens, a sixth lens, a seventh lens and an eighth lens having a concave surface facing the image side and negative refractive power near the optical axis, wherein an image-side surface of the eighth lens is formed as an aspheric surface having at least one pole point in a position off the optical axis.

According to the imaging lens having the above-described configuration, the first lens properly corrects spherical aberration and distortion by having the convex surface facing the object side near the optical axis. The second lens properly corrects astigmatism and the distortion. The third lens properly corrects the spherical aberration, coma aberration and chromatic aberration. The fourth lens properly corrects the astigmatism and the astigmatism. The fifth lens properly corrects the astigmatism and the distortion. The sixth lens properly corrects the spherical aberration, the astigmatism, field curvature and the distortion. The seventh lens properly corrects the astigmatism, the field curvature and the distortion. The eighth lens properly corrects the chromatic aberration, the astigmatism, the field curvature and the distortion. The image-side surface of the eighth lens is a concave surface facing the image side near the optical axis, and the field curvature and the distortion can be properly corrected and a light ray incident angle to an image sensor can be properly controlled, when the image-side surface of the eighth lens is formed as the aspheric surface having at least one pole point in a position off the optical axis.

According to the imaging lens having the above-described configuration, it is preferable that the second lens has positive refractive power near the optical axis.

When the refractive power of the second lens is positive, a total track length can be shortened and the astigmatism can be properly corrected.

According to the imaging lens having the above-described configuration, it is preferable that an image-side surface of the second lens has a concave surface facing the image side near the optical axis.

When the image-side surface of the second lens has the concave surface facing the image side near the optical axis, the field curvature and the distortion can be properly corrected.

According to the imaging lens having the above-described configuration, it is preferable that an image-side surface of the third lens has a concave surface facing the image side near the optical axis.

When the image-side surface of the third lens has the concave surface facing the image side near the optical axis, coma aberration, the astigmatism and the distortion can be properly corrected.

According to the imaging lens having the above-described configuration, it is preferable that an image-side surface of the fifth lens has a concave surface facing the image side near the optical axis.

When the image-side surface of the fifth lens has the concave surface facing the image side near the optical axis, the astigmatism and the distortion can be properly corrected.

According to the imaging lens having the above-described configuration, it is preferable that the sixth lens has positive refractive power near the optical axis.

When the refractive power of the sixth lens is positive, it is favorable for low-profileness.

According to the imaging lens having the above-described configuration, it is preferable that an image-side surface of the sixth lens has a convex surface facing the image side near the optical axis.

When the image-side surface of the sixth lens has the convex surface facing the image side near the optical axis, the light ray incident angle to the image-side surface of the sixth lens can be appropriately controlled, and the astigmatism, the field curvature and the distortion can be properly corrected.

According to the imaging lens having the above-described configuration, it is preferable that an object-side surface of the seventh lens has a convex surface facing the object side near the optical axis.

When the object-side surface of the seventh lens has the convex surface facing the object side near the optical axis, the astigmatism can be properly corrected.

According to the imaging lens having the above-described configuration, it is preferable that an image-side surface of the seventh lens has a concave surface facing the image side near the optical axis.

When the image-side surface of the seventh lens has the concave surface facing the image side near the optical axis, the astigmatism and the distortion can be properly corrected.

According to the imaging lens having the above-described configuration, it is preferable that the object-side surface of the seventh lens is formed as an aspheric surface having at least one pole point in a position off the optical axis.

When the object-side surface of the seventh lens is formed as an aspheric surface having at least one pole point in a position off the optical axis, the field curvature and the distortion can be properly corrected.

According to the imaging lens having the above-described configuration, it is preferable that the image-side surface of the seventh lens is formed as an aspheric surface having at least one pole point in a position off the optical axis.

When the image-side surface of the seventh lens is formed as an aspheric surface having at least one pole point in a position off the optical axis, the field curvature and the distortion can be properly corrected.

According to the imaging lens having the above-described configuration, it is preferable that a below conditional expression (1) is satisfied:

$$0.15 < vd7/vd8 < 0.55 \quad (1)$$

where
vd7: an abbe number at d-ray of the seventh lens,
vd8: an abbe number at d-ray of the eighth lens.

The conditional expression (1) defines an appropriate range of the respective abbe numbers at d-ray of the seventh lens and the eighth lens. By satisfying the conditional expression (1), the chromatic aberration can be properly corrected.

According to the imaging lens having the above-described configuration, it is preferable that a below conditional expression (2) is satisfied:

$$0.50 < (D1/|f1|) \times 100 < 13.00 \quad (2)$$

where
D1: a thickness along the optical axis of the first lens,
f1: a focal length of the first lens.

The conditional expression (2) defines an appropriate range of a thickness along the optical axis of the first lens. When a value is below the upper limit of the conditional expression (2), the thickness along the optical axis of the first lens is suppressed from being too large, and an air gap of the image side of the first lens can be easily secured. As a result, the low-profileness can be maintained. On the other hand, when the value is above the lower limit of the conditional expression (2), the thickness along the optical axis of the first lens is suppressed from being too small, and the formability of the lens becomes excellent.

According to the imaging lens having the above-described configuration, it is preferable that a below conditional expression (3) is satisfied:

$$3.00 < (D7/TTL) \times 100 < 8.70 \quad (3)$$

where
D7: a thickness along the optical axis of the seventh lens, and
TTL: a total track length.

The conditional expression (3) defines an appropriate range of a thickness along the optical axis of the seventh lens. When a value is below the upper limit of the conditional expression (3), the thickness along the optical axis of the seventh lens is suppressed from being too large, and an air gap of the object side and the image side of the seventh lens can be easily secured. As a result, the low-profileness can be maintained. On the other hand, when the value is above the lower limit of the conditional expression (3), the thickness along the optical axis of the seventh lens is suppressed from being too small, and the formability of the lens becomes excellent.

According to the imaging lens having the above-described configuration, it is preferable that a below conditional expression (4) is satisfied:

$$0.30 < D4/D8 < 1.20 \quad (4)$$

where
D4: a thickness along the optical axis of the fourth lens,
D8: a thickness along the optical axis of the eighth lens.

The conditional expression (4) defines an appropriate range of the thickness along the optical axis of the fourth lens and the thickness along the optical axis of the eighth lens. By satisfying the conditional expression (4), difference between the thickness of the fourth lens and the thickness of the eighth lens is suppressed from being increased, and the low-profileness is achieved.

Furthermore, by satisfying the conditional expression (4), the spherical aberration and the distortion can be properly corrected.

According to the imaging lens having the above-described configuration, it is preferable that a below conditional expression (5) is satisfied:

$$0.40 < D7/D8 < 1.40 \quad (5)$$

where
D7: the thickness along the optical axis of the seventh lens,
D8: the thickness along the optical axis of the eighth lens.

The conditional expression (5) defines an appropriate range of the thickness along the optical axis of the seventh lens and the thickness along the optical axis of the eighth lens. By satisfying the conditional expression (5), difference between the thickness of the seventh lens and the thickness of the eighth lens is suppressed from being increased, and the low-profileness is achieved.

Furthermore, by satisfying the conditional expression (5), the astigmatism and the distortion can be properly corrected.

According to the imaging lens having the above-described configuration, it is preferable that a below conditional expression (6) is satisfied:

$$0.30 < f6/f < 4.50 \quad (6)$$

where f6: a focal length of the sixth lens, and f: a focal length of the overall optical system of the imaging lens.

The conditional expression (6) defines an appropriate range of refractive power of the sixth lens. When a value is below the upper limit of the conditional expression (6), the positive refractive power of the sixth lens becomes appropriate, and the low-profileness can be achieved. On the other hand, when the value is above the lower limit of the conditional expression (6), the astigmatism, the field curvature and the distortion can be properly corrected.

According to the imaging lens having the above-described configuration, it is preferable that a below conditional expression (7) is satisfied:

$$1.40 < |f7|/f \qquad (7)$$

where f7: a focal length of the seventh lens, and f: the focal length of the overall optical system of the imaging lens.

The conditional expression (7) defines an appropriate range of refractive power of the seventh lens. When the value is above the lower limit of the conditional expression (7), the distortion can be properly corrected.

According to the imaging lens having the above-described configuration, it is preferable that a below conditional expression (8) is satisfied:

$$-1.90 < f8/f < -0.60 \qquad (8)$$

where f8: a focal length of the eighth lens, and f: the focal length of the overall optical system of the imaging lens.

The conditional expression (8) defines an appropriate range of refractive power of the eighth lens. When a value is below the upper limit of the conditional expression (8), negative refractive power of the eighth lens becomes appropriate, and it is favorable for the low-profileness. On the other hand, when the value is above the lower limit of the conditional expression (8), the chromatic aberration, the astigmatism and the distortion can be properly corrected.

According to the imaging lens having the above-described configuration, it is preferable that a below conditional expression (9) is satisfied:

$$0.70 < r4/f < 2.70 \qquad (9)$$

where r4: paraxial curvature radius of the image-side surface of the second lens, and f: the focal length of the overall optical system of the imaging lens.

The conditional expression (9) defines an appropriate range of the paraxial curvature radius of the image-side surface of the second lens. When a value is below the upper limit of the conditional expression (9), the astigmatism and the distortion can be properly corrected. On the other hand, when the value is above the lower limit of the conditional expression (9), the coma aberration can be properly corrected.

According to the imaging lens having the above-described configuration, it is preferable that a below conditional expression (10) is satisfied:

$$-3.00 < r12/f < -0.20 \qquad (10)$$

where r12: paraxial curvature radius of the image-side surface of the sixth lens, and f: the focal length of the overall optical system of the imaging lens.

The conditional expression (10) defines an appropriate range of the paraxial curvature radius of the image-side surface of the sixth lens. By satisfying the conditional expression (10), the astigmatism, the field curvature and the distortion can be properly corrected.

According to the imaging lens having the above-described configuration, it is preferable that a below conditional expression (11) is satisfied:

$$0.10 < (T4/TTL) \times 100 < 2.45 \qquad (11)$$

where

T4: a distance along the optical axis from an image-side surface of the fourth lens to an object-side surface of the fifth lens, and TTL: a total track length.

The conditional expression (11) defines an appropriate range of the distance along the optical axis between the fourth lens and the fifth lens. By satisfying the conditional expression (11), the astigmatism and the field curvature can be properly corrected.

According to the imaging lens having the above-described configuration, it is preferable that a below conditional expression (12) is satisfied:

$$1.20 < |f1|/f < 9.50 \qquad (12)$$

where f1: a focal length of the first lens, and f: the focal length of the overall optical system of the imaging lens.

The conditional expression (12) defines an appropriate range of refractive power of the first lens. By satisfying the conditional expression (12), the total track length can be shortened and the chromatic aberration, the astigmatism, the field curvature and the distortion can be properly corrected.

According to the imaging lens having the above-described configuration, it is preferable that a below conditional expression (13) is satisfied:

$$3.80 < |f4|/f \qquad (13)$$

where f4: a focal length of the fourth lens, and f: the focal length of the overall optical system of the imaging lens.

The conditional expression (13) defines an appropriate range of refractive power of the fourth lens. When a value is above the lower limit of the conditional expression (13), the coma aberration, the astigmatism and the distortion can be properly corrected.

According to the imaging lens having the above-described configuration, it is preferable that composite refractive power of the third lens and the fourth lens is negative, and is more preferable that a below conditional expression (14) is satisfied:

$$-8.50 \leq f34/f < -1.00 \qquad (14)$$

where f34: a composite focal length of the third lens and the fourth lens, and f: the focal length of the overall optical system of the imaging lens.

When the composite refractive power of the third lens and the fourth lens is negative, the chromatic aberration can be properly corrected. Furthermore, the conditional expression (14) defines an appropriate range of the composite refractive power of the third lens and the fourth lens. When a value is below the upper limit of the conditional expression (14), the negative composite refractive power of the third lens and the fourth lens becomes appropriate, and the chromatic aberration can be corrected and the low-profileness can be achieved. On the other hand, when the value is above the lower limit of the conditional expression (14), the chromatic aberration and the spherical aberration can be properly corrected.

According to the imaging lens having the above-described configuration, it is preferable that composite refractive power of the fifth lens and the sixth lens is positive, and is more preferable that a below conditional expression (15) is satisfied:

$$0.35 < f56/f < 3.40 \qquad (15)$$

where
- f56: a composite focal length of the fifth lens and the sixth lens, and
- f: the focal length of the overall optical system of the imaging lens.

When the composite refractive power of the fifth lens and the sixth lens is positive, it is favorable for the low-profileness. Furthermore, the conditional expression (15) defines an appropriate range of the composite refractive power of the fifth lens and the sixth lens. When a value is below the upper limit of the conditional expression (15), the positive composite refractive power of the fifth lens and the sixth lens becomes appropriate, and the low-profileness can be achieved. On the other hand, when the value is above the lower limit of the conditional expression (15), the astigmatism, the field curvature and the distortion can be properly corrected.

Effect of Invention

According to the present invention, there can be provided an imaging lens with high resolution which satisfies demand of the wide field of view, the low-profileness and the low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5, 7, 9, 11, 13, 15, 17, 19, 21, 23, 25, 27 and 29 are schematic views of the imaging lenses in Examples 1 to 15 according to the embodiments of the present invention, respectively.

Figure 1:
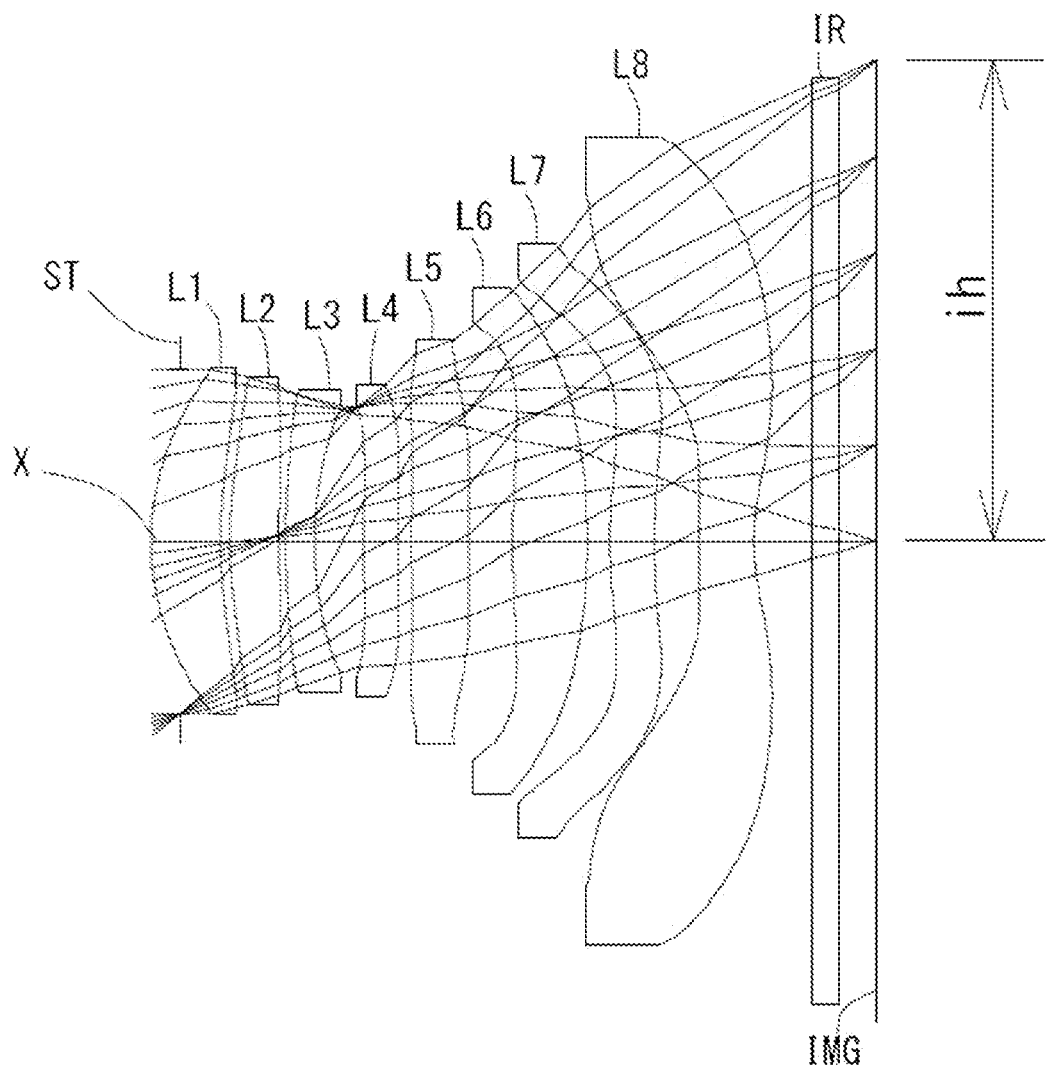
FIG. 1 is a schematic view showing an imaging lens in Example 1 according to the present invention.

As shown in FIG. 1, the imaging lens according to the present embodiment comprises in order from an object side to an image side, a first lens L1 having a convex surface facing the object side near an optical axis X, a second lens L2, a third lens L3 having negative refractive power near the optical axis X, a fourth lens L4, a fifth lens L5, a sixth lens L6, a seventh lens L7 and an eighth lens L8 having a concave surface facing the image side and negative refractive power near the optical axis X. An image-side surface of the eighth lens L8 is formed as an aspheric surface having at least one pole point in a position off the optical axis X.

A filter IR such as an IR cut filter and a cover glass are arranged between the eighth lens L8 and an image plane IMG (namely, the image plane of an image sensor). The filter IR is omissible.

By arranging an aperture stop ST on the object side of the first lens L1, correction of aberrations and control of an incident angle of the light ray of high image height to the image sensor become facilitated.

The first lens L1 has a convex surface facing the object side near the optical axis X and has a meniscus shape having a concave surface facing the image side. Therefore, spherical aberration, astigmatism and distortion can be properly corrected.

The second lens L2 has a convex surface facing the object side near the optical axis X and has the meniscus shape having a concave surface facing the image side. Therefore, the spherical aberration, the astigmatism, field curvature and the distortion can be properly corrected.

The third lens L3 has negative refractive power and has the meniscus shape having a convex surface facing the object side and a concave surface facing the image side near the optical axis X. Therefore, chromatic aberration, the spherical aberration, coma aberration, the astigmatism and the distortion can be properly corrected.

The fourth lens L4 has the negative refractive power and has the meniscus shape having a convex surface facing the object side and a concave surface facing the image side near the optical axis X. Therefore, the coma aberration, the astigmatism and the distortion can be properly corrected. The refractive power of the fourth lens L4 may be positive as in the Examples 8, 11, 14 and 15 shown in FIGS. 15, 21, 27 and 29. In this situation, low-profileness is more facilitated. Furthermore, a shape of the fourth lens L4 may be the meniscus shape having a concave surface facing the object side and a convex surface facing the image side near the optical axis X as in the Examples 2, 3, 4, 5, 6 and 7 shown in FIGS. 3, 5, 7, 9, 11 and 13. In this case, a light ray incident angle to the fourth lens L4 becomes appropriate and the astigmatism, the field curvature and the distortion are properly corrected.

The fifth lens L5 has positive refractive power and has the meniscus shape having a convex surface facing the object side and a concave surface facing the image side near the optical axis X. Therefore, the astigmatism and the distortion are properly corrected while maintaining the low-profileness. The refractive power of the fifth lens L5 may be negative as in the Examples 9 and 15 shown in FIGS. 17 and 29, and in this situation, it is favorable for correction of the chromatic aberration. Furthermore, a shape of the fifth lens L5 may be the meniscus shape having a concave surface facing the object side and a convex surface facing the image side near the optical axis X as in the Example 3 shown in FIG. 5. In this case, a light ray incident angle to the fifth lens L5 becomes appropriate, and the coma aberration, the astigmatism and the distortion are properly corrected. As in the Example 10 shown in FIG. 19, the fifth lens L5 may have a biconvex shape having the convex surfaces facing the object side and the image side near the optical axis X. In this case, the positive refractive power of the both sides become favorable for the low-profileness. Furthermore, the biconvex shape suppresses curvature from being large, and effectively reduces sensitivity to a manufacturing error.

The sixth lens L6 has the biconvex shape having convex surfaces facing the object side and the image side near the optical axis X. Therefore, by positive refractive power of the both sides, the low-profileness is achieved. Furthermore, the biconvex shape suppresses curvature from being large, and reduces sensitivity to the manufacturing error.

The seventh lens L7 has the positive refractive power and has the meniscus shape having a convex surface facing the object side and a concave surface facing the image side near the optical axis X. Therefore, the astigmatism, the field curvature and the distortion are properly corrected. The refractive power of the seventh lens L7 may be negative as in the Examples 5, 6, 7, 8 and 9 shown in FIGS. 9, 11, 13, 15 and 17, and it is favorable for correction of the chromatic aberration.

The object-side surface and the image-side surface of the seventh lens L7 are formed as aspheric surfaces having at least one pole point in a position off the optical axis X, therefore, the field curvature and the distortion are properly corrected.

The eighth lens L8 has the negative refractive power and has the meniscus shape having a convex surface facing the object side and a concave surface facing the image side near the optical axis X, therefore the chromatic aberration, the astigmatism, the field curvature and the distortion are properly corrected. A shape of the eighth lens L8 may be a biconcave shape having the concave surfaces facing the object side and the image side near the optical axis X as in the Example 8 shown in FIG. 15. In this case, the negative refractive power of the both sides is favorable for correction of the chromatic aberration, and the biconcave shape suppresses curvature from being large, and reduces sensitivity to the manufacturing error.

The image-side surface of the eighth lens L8 is formed as the aspheric surface having at least one pole point in a position off the optical axis X, therefore the field curvature and the distortion are more properly corrected and a light ray incident angle to an image sensor is appropriately controlled.

Regarding the imaging lens according to the present embodiments, it is preferable that all lenses of the first lens L1 to the eighth lens L8 are single lenses. Configuration with only the single lenses can frequently use the aspheric surfaces. In the present embodiments, all lens-surfaces are formed as the appropriate aspherical surfaces, and proper correction of aberrations is made. In comparison with the case in which a cemented lens is used, workload is reduced, and manufacturing in low cost becomes possible.

Furthermore, the imaging lens according to the present embodiments makes manufacturing facilitated by using plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the below conditional expressions (1) to (15).

$$0.15 < vd7/vd8 < 0.55 \quad (1)$$

$$0.50 < (D1/|f1|) \times 100 < 13.00 \quad (2)$$

$3.00 < (D7/TTL) \times 100 < 8.70$ (3)

$0.30 < D4/D8 < 1.20$ (4)

$0.40 < D7/D8 < 1.40$ (5)

$0.30 < f6/f < 4.50$ (6)

$1.40 < |f7|/f$ (7)

$-1.90 < f8/f < -0.60$ (8)

$0.70 < r4/f < 2.70$ (9)

$-3.00 < r12/f < -0.20$ (10)

$0.10 < (T4/TTL) \times 100 < 2.45$ (11)

$1.20 < |f1|/f < 9.50$ (12)

$3.80 < |f4|/f$ (13)

$-8.50 < f34/f < -1.00$ (14)

$0.35 < f56/f < 3.40$ (15)

where
vd7: an abbe number at d-ray of the seventh lens L7,
vd8: an abbe number at d-ray of the eighth lens L8,
D1: a thickness along the optical axis X of the first lens L1,
D4: a thickness along the optical axis X of the fourth lens L4,
D7: a thickness along the optical axis X of the seventh lens L7,
D8: a thickness along the optical axis X of the eighth lens L8,
T4: a distance along the optical axis X from an image-side surface of the fourth lens L4 to an object-side surface of the fifth lens L5,
TTL: a total track length,
f: a focal length of the overall optical system of the imaging lens,
f1: a focal length of the first lens L1,
f4: a focal length of the fourth lens L4,
f6: a focal length of the sixth lens L6,
f7: a focal length of the seventh lens L7,
f8: a focal length of the eighth lens L8,
f34: a composite focal length of the third lens L3 and the fourth lens L4,
f56: a composite focal length of the fifth lens L5 and the sixth lens L6,
r4: paraxial curvature radius of the image-side surface of the second lens L2,
r12: paraxial curvature radius of the image-side surface of the sixth lens L6.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (15a).

$0.25 < vd7/vd8 < 0.45$ (1a)

$0.75 < (D1/|f1|) \times 100 < 11.00$ (2a)

$4.50 < (D7/TTL) \times 100 < 8.00$ (3a)

$0.45 < D4/D8 < 1.00$ (4a)

$0.60 < D7/D8 < 1.20$ (5a)

$0.55 < f6/f < 3.50$ (6a)

$2.00 < |f7|/f$ (7a)

$-1.50 < f8/f < -0.70$ (8a)

$1.10 < r4/f < 2.30$ (9a)

$-2.40 < r12/f < -0.30$ (10a)

$0.20 < (T4/TTL) \times 100 < 2.10$ (11a)

$1.40 < |f1|/f < 8.00$ (12a)

$5.00 < |f4|/f$ (13a)

$-7.00 < f34/f < -1.50$ (14a)

$0.55 < f56/f < 2.80$ (15a)

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$

Equation 1

Next, examples of the imaging lens according to this embodiment will be explained. In each example, f denotes the focal length of the overall optical system of the imaging lens, Fno denotes a F-number, ω denotes a half field of view, ih denotes a maximum image height, and TTL denotes a total track length. Additionally, i denotes surface number counted from the object side, r denotes paraxial curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1

Unit mm f = 4.70　　　　　　　　　　　　　　　　　i h = 3.93
Fno = 1.70　　　　　　　　　　　　　　　　TTL = 5.86
ω(°) = 39.2

Surface Data

| Surface Number i (Object) | Curvature Curvature Infinity | Surface Distance d Infinity | Refractive Index Nd | Abbe Number νd |
|---|---|---|---|---|
| 1(Stop) | Infinity | −0.2335 | | |
| 2* | 2.1489 | 0.5891 | 1.544 | 55.86 (ν d1) |
| 3* | 3.9663 | 0.0762 | | |
| 4* | 3.5173 | 0.4018 | 1.544 | 55.86 (ν d2) |
| 5* | 8.2118 | 0.0500 | | |
| 6* | 4.4637 | 0.2400 | 1.671 | 10.48 (ν d3) |
| 7* | 2.8249 | 0.4049 | | |
| 8* | 21.9770 | 0.2800 | 1.651 | 20.37 (ν d4) |
| 9* | 16.6105 | 0.1050 | | |
| 10* | 8.2840 | 0.4674 | 1.635 | 55.66 (ν d5) |
| 11* | 10.0000 | 0.0659 | | |
| 12* | 10.0905 | 0.6089 | 1.544 | 55.86 (ν d6) |
| 13* | −5.2302 | 0.1870 | | |
| 14* | 5.1665 | 0.3600 | 1.671 | 19.48 (ν d7) |
| 15* | 6.0405 | 0.3882 | | |
| 16* | 7.1580 | 0.4430 | 1.535 | 59.56 (ν d8) |
| 17* | 1.6776 | 0.4845 | | |
| 18 | Infinity | 0.2100 | 1.517 | 64.20 |
| 19 | Infinity | 0.3120 | | |
| Image Plane | Infinity | | | |

Constituent Lens Data

| Lens | Start Surface | Focal Length | Composite Focal Length | |
|---|---|---|---|---|
| 1 | 2 | 7.760 | f 34 | −10.835 |
| 2 | 4 | 10.973 | f 56 | 6.110 |
| 3 | 6 | −12.177 | | |
| 4 | 8 | −105.133 | | |
| 5 | 10 | 82.440 | | |
| 6 | 12 | 6.419 | | |
| 7 | 14 | 45.630 | | |
| 8 | 16 | −4.215 | | |

Aspheric Surface Data

| | Second Surface | Third Surface | Fourth Surface | Fifth Surface | Sixth Surface | Seventh Surface | Eighth Surface | Ninth Surface |
|---|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 | −1.740052E+02 |
| A4 | 3.278810E−03 | −4.553414E−02 | −5.956228E−02 | −1.318761E−01 | −1.373723E−01 | −3.655549E−02 | −3.693839E−02 | −7.704056E−02 |
| A6 | −3.088762E−02 | −4.650473E−03 | −8.599440E−04 | 1.659148E−01 | 1.888061E−01 | −1.569586E−03 | 5.568778E−02 | 1.304304E−01 |
| A8 | 8.549144E−02 | 8.109592E−02 | 8.004349E−02 | −1.065876E−01 | −8.914701E−02 | 3.170746E−01 | −2.484203E−01 | −2.756729E−01 |
| A10 | −1.394918E−01 | −1.916615E−01 | −2.288787E−01 | −1.535064E−01 | −2.847622E−01 | −1.132073E+00 | 4.288311E−01 | 3.368272E−01 |
| A12 | 1.395691E−01 | 2.600205E−01 | 3.475131E−01 | 4.963610E−01 | 8.036273E−01 | 2.196519E+00 | −3.942007E−01 | −2.436046E−01 |
| A14 | −8.814981E−02 | −1.011713E−01 | −2.980638E−01 | −5.930845E−01 | −9.989510E−01 | −2.579527E+00 | 9.702211E−02 | 8.216253E−02 |
| A16 | 3.405850E−02 | 8.554938E−02 | 1.471429E−01 | 3.776154E−01 | 6.833954E−01 | 1.925123E+00 | 1.387973E−01 | 7.135021E−03 |
| A18 | −7.339694E−03 | −2.100502E−02 | −3.946668E−02 | −1.266648E−01 | −2.480365E−01 | −7.167524E−01 | −1.255342E−01 | −1.441548E−02 |
| A20 | 6.551611E−04 | 2.196603E−03 | 4.521132E−03 | 1.764291E−02 | 3.738156E−02 | 1.206119E−01 | 3.249874E−02 | 3.288177E−03 |

| | Tenth Surface | Eleventh Surface | Twelfth Surface | Thirteenth Surface | Fourteenth Surface | Fifteenth Surface | Sixteenth Surface | Seventeenth Surface |
|---|---|---|---|---|---|---|---|---|
| k | 0.000000E+00 | 0.000000E+00 | 0.000000E+00 | −6.516982E+00 | −1.082492E+01 | 0.000000E+00 | −1.664901E+02 | −6.800000E+00 |
| A4 | −1.439133E−01 | −1.132796E−01 | −2.079467E−02 | 5.588729E−03 | 3.478317E−02 | 5.148528E−02 | −1.749188E−01 | −1.097408E−01 |
| A6 | 1.941093E−01 | 7.810621E−02 | 1.750870E−02 | −5.574784E−02 | −1.420925E−01 | −1.485537E−01 | 4.793593E−02 | 4.927783E−02 |
| A8 | −2.689332E−01 | −9.321089E−02 | −2.715955E−02 | 8.901582E−02 | 1.095813E−01 | 1.094306E−01 | −2.117841E−07 | −1.535821E−02 |
| A10 | 2.928323E−01 | 9.339036E−02 | 1.659862E−02 | −7.573238E−02 | −4.773375E−02 | −5.011567E−02 | −3.784729E−00 | 3.586298E−03 |
| A12 | −2.025321E−01 | −6.540855E−02 | −7.654682E−03 | 3.712636E−02 | 9.821796E−03 | 1.467193E−02 | 1.337803E−03 | −6.211681E−04 |
| A14 | 8.792582E−02 | 3.320544E−02 | 2.075643E−03 | −1.116549E−02 | 1.308786E−04 | −2.673953E−03 | −2.468928E−04 | 2.461950E−05 |
| A16 | −2.365986E−02 | −1.109601E−02 | −1.053879E−04 | 2.064052E−03 | −4.696752E−04 | 2.567530E−04 | 2.628429E−05 | −5.747958E−08 |

TABLE 1-continued

| | | | Example 1 | | | | | |
|---|---|---|---|---|---|---|---|---|
| A18 | 3.661907E−03 | 2.088349E−03 | −8.983667E−05 | −2.161230E−04 | 8.392781E−05 | −1.595739E−05 | −1.521484E−06 | 2.534126E−07 |
| A20 | −2.515838E−04 | −1.647862E−04 | 1.569178E−05 | 9.768236E−06 | −4.890149E−05 | 3.293750E−07 | 3.713891E−08 | −4.858512E−09 |

The imaging lens in Example 1 satisfies conditional expressions (1) to (15) as shown in Table 16.

Figure 2:
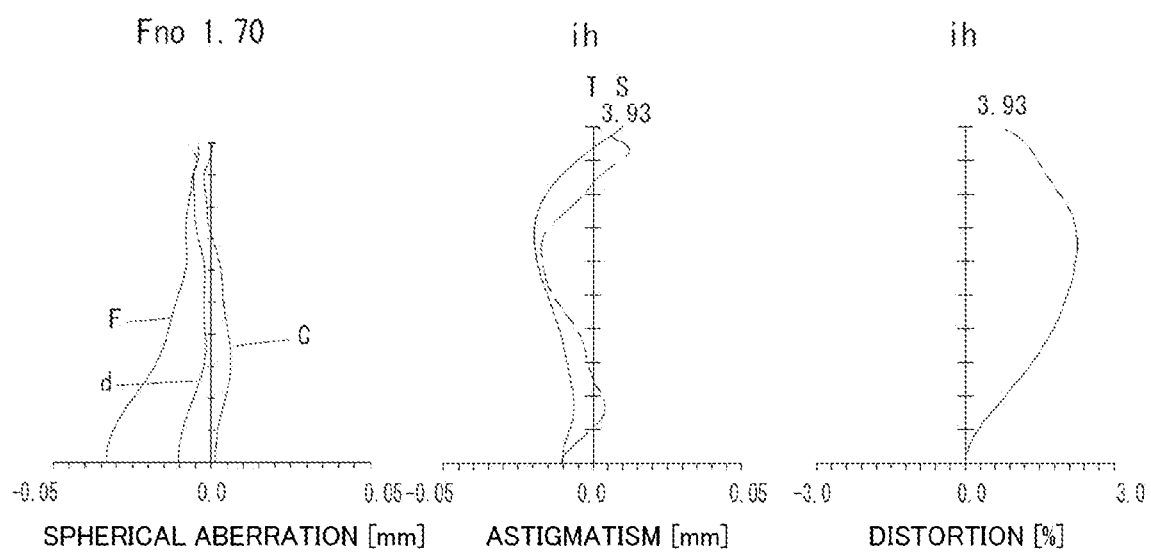
FIG. 2 shows spherical aberration, astigmatism, and distortion of the imaging lens in Example 1 according to the present invention.
Figure 3:
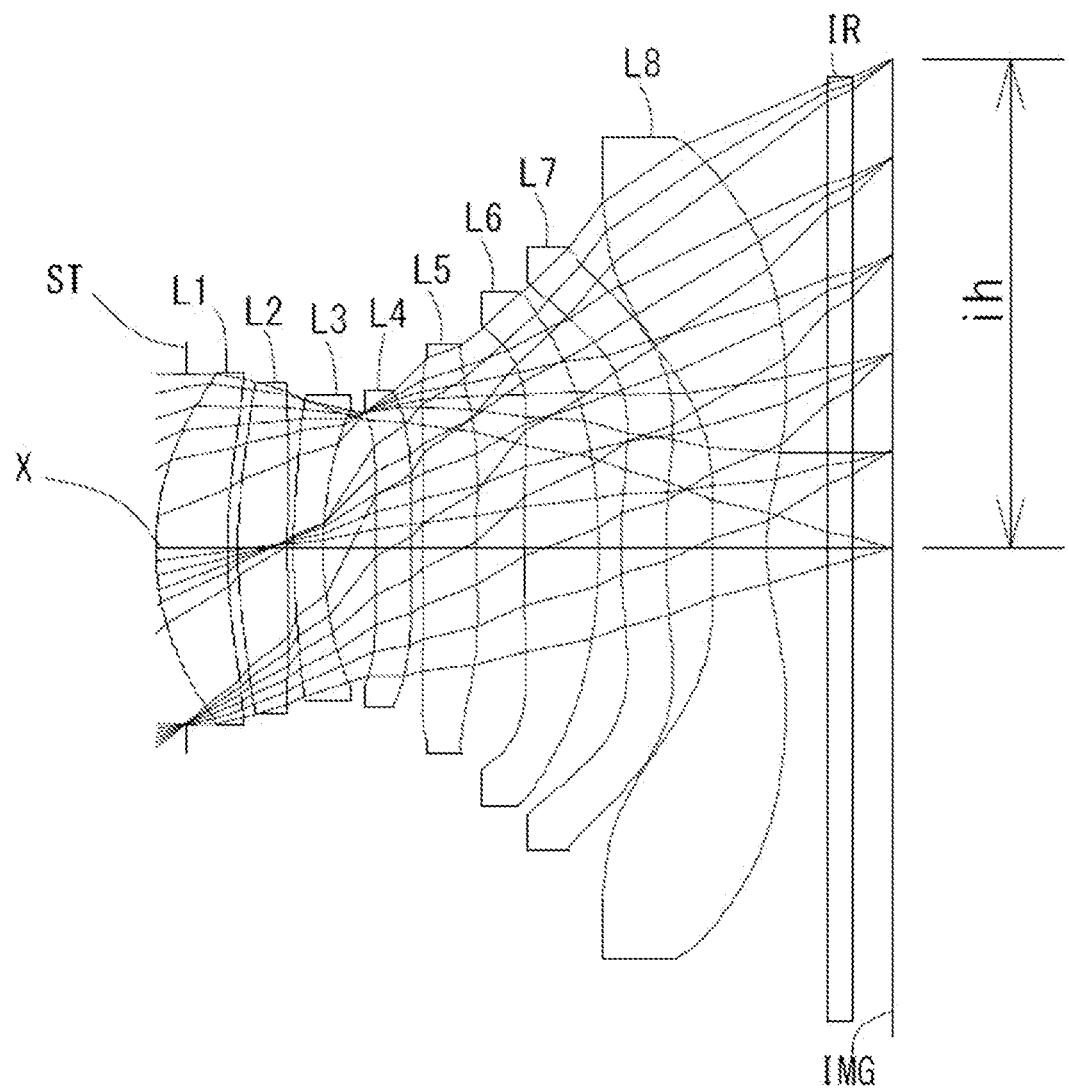
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8, 10, 12, 14, 16, 18, 20, 22, 24, 26, 28 and 30). As shown in FIG. 2, each aberration is corrected excellently.

Example 2

The basic lens data is shown below in Table 2.

TABLE 2

| Example 2 |
|---|
| Unit mm | f = 4.77  i h = 3.93
Fno = 1.70  TTL = 5.86
ω(°) = 39.2

Surface Data

| Surface Number i | Curvature Curvature | Surface Distance d | Refractive Index Nd | Abbe Number νd |
|---|---|---|---|---|
| (Object) | Infinity | Infinity | | |
| 1(Stop) | Infinity | −0.2439 | | |
| 2* | 2.1448 | 0.5755 | 1.544 | 55.86 (ν d1) |
| 3* | 4.0565 | 0.0822 | | |
| 4* | 3.5793 | 0.4020 | 1.544 | 55.86 (ν d2) |
| 5* | 8.6562 | 0.0500 | | |
| 6* | 4.6704 | 0.2400 | 1.671 | 10.48 (ν d3) |
| 7* | 2.9050 | 0.4281 | | |
| 8* | −96.9778 | 0.2835 | 1.651 | 20.37 (ν d4) |
| 9* | −133.0359 | 0.0892 | | |
| 10* | 9.2794 | 0.4336 | 1.535 | 55.66 (ν d5) |
| 11* | 10.0114 | 0.3770 | | |
| 12* | 11.7892 | 0.6063 | 1.544 | 55.86 (ν d6) |
| 13* | −4.8922 | 0.1810 | | |
| 14* | 5.2085 | 0.3600 | 1.671 | 19.48 (ν d7) |
| 15* | 5.9489 | 0.3839 | | |
| 16* | 7.2542 | 0.4430 | 1.535 | 59.68 (ν d8) |
| 17* | 1.6748 | 0.4845 | | |
| 18 | Infinity | 0.2100 | 1.517 | 64.20 |
| 19 | Infinity | 0.3139 | | |
| Image Plane | Infinity | | | |

Constituent Lens Data

| Lens | Start Surface | Focal Length | Composite Focal Length | |
|---|---|---|---|---|
| 1 | 2 | 7.559 | f 34 | −11.730 |
| 2 | 4 | 10.908 | f 56 | 6.351 |
| 3 | 6 | −12.108 | | |
| 4 | 8 | −381.155 | | |
| 5 | 10 | 156.698 | | |
| 6 | 12 | 6.434 | | |
| 7 | 14 | 52.151 | | |
| 8 | 16 | −4.188 | | |

Aspheric Surface Data

| | Second Surface | Third Surface | Fourth Surface | Fifth Surface | Sixth Surface | Seventh Surface | Eighth Surface | Ninth Surface |
|---|---|---|---|---|---|---|---|---|
| k | 0.000000E+00 | 0.000000E+00 | 0.000000E+00 | 0.000000E+00 | 0.000000E+00 | 0.000000E+00 | 0.000000E+00 | −1.740052E+02 |
| A4 | 3.280270E−03 | −4.458300E−02 | −5.957149E−02 | −1.313753E−01 | −1.366096E−01 | −3.594829E−02 | −2.787327E−02 | −7.250395E−02 |
| A6 | −3.088110E−02 | −5.941053E−03 | 4.823494E−04 | 1.648580E−01 | 1.925996E−01 | 9.580209E−04 | 1.737558E−02 | 1.170215E−01 |
| A8 | 8.547223E−02 | 7.906815E−02 | 6.728963E−02 | −1.108603E−01 | −1.228795E−01 | 2.897103E−01 | −1.265013E−01 | −2.557525E−01 |
| A10 | −1.395087E−01 | −1.834124E−01 | −1.948095E−01 | −1.308885E−01 | −1.783848E−01 | −1.037364E+00 | 1.291478E−01 | 3.025491E−01 |
| A12 | 1.395619E−01 | 2.381546E−01 | 3.010745E−01 | 4.508870E−01 | 6.152200E−01 | 2.008225E+00 | 1.082785E−01 | −1.839334E−01 |
| A14 | −8.815076E−02 | −1.823679E−01 | −2.620915E−01 | −5.450621E−01 | −7.996456E−01 | −2.355540E+00 | −4.542949E−01 | 1.776438E−02 |

TABLE 2-continued

| | | | Example 2 | | | | |
|---|---|---|---|---|---|---|---|
| A16 | 3.405951E−02 | 8.218827E−02 | 1.315705E−01 | 3.495623E−01 | 5.591269E−01 | 1.588156E+00 | 5.183737E−01 | 4.595237E−02 |
| A18 | −7.338775E−03 | −2.041870E−02 | −3.611067E−02 | −1.180023E−01 | −2.060310E−01 | −6.576554E−01 | −2.749286E−01 | −2.667277E−02 |
| A20 | 6.555106E−04 | 2.170486E−03 | 4.269588E−03 | 1.659708E−02 | 3.146939E−02 | 1.115736E−01 | 5.827791E−02 | 4.889530E−03 |

| | Tenth Surface | Eleventh Surface | Twelfth Surface | Thirteenth Surface | Fourteenth Surface | Fifteenth Surface | Sixteenth Surface | Seventeenth Surface |
|---|---|---|---|---|---|---|---|---|
| k | 0.000000E+00 | 0.000000E+00 | 0.000000E+00 | −6.722161E+00 | −1.063399E+01 | 0.000000E+00 | −1.684901E+02 | −6.650003E+00 |
| A4 | −1.469480E−01 | −1.148376E−01 | −2.031650E−02 | 1.982024E−03 | 2.528218E−02 | 4.585699E−02 | −1.782452E−01 | −1.083260E−01 |
| A6 | 2.132773E−01 | 7.824884E−02 | 1.847022E−02 | −4.590325E−02 | −1.298149E−01 | −1.403543E−01 | 5.430419E−02 | 4.898167E−02 |
| A8 | −3.279724E−01 | −8.953735E−02 | −2.901374E−02 | 8.198174E−02 | 1.007761E−01 | 1.031580E−01 | −6.622975E−03 | −1.865709E−02 |
| A10 | 3.925639E−01 | 8.352678E−02 | 1.857638E−02 | −7.320965E−02 | −4.360969E−02 | −4.591506E−02 | −4.417429E−04 | 3.759154E−03 |
| A12 | −2.978091E−01 | −5.265202E−02 | −5.843022E−03 | 3.702096E−02 | 8.687972E−03 | 1.360314E−02 | 3.885740E−04 | −6.804882E−04 |
| A14 | 1.412112E−01 | 2.439921E−02 | 2.746843E−03 | −1.138812E−02 | 2.787417E−04 | −2.447086E−03 | −8.639495E−05 | 7.925314E−05 |
| A16 | −4.107404E−02 | −7.853119E−03 | −3.525239E−04 | 2.141188E−03 | −4.699577E−04 | 2.576841E−04 | 1.013429E−05 | −6.035598E−06 |
| A18 | 6.751202E−03 | 1.492778E−03 | −4.400230E−05 | −2.272373E−04 | 8.197480E−05 | −1.393733E−05 | −6.245518E−07 | 2.614425E−07 |
| A20 | −4.826255E−04 | −1.222214E−04 | 1.250859E−05 | 1.039453E−05 | −4.745481E−05 | 2.724598E−07 | 1.588742E−08 | −4.908555E−09 |

The imaging lens in Example 2 satisfies conditional expressions (1) to (15) as shown in Table 16.

Figure 4:
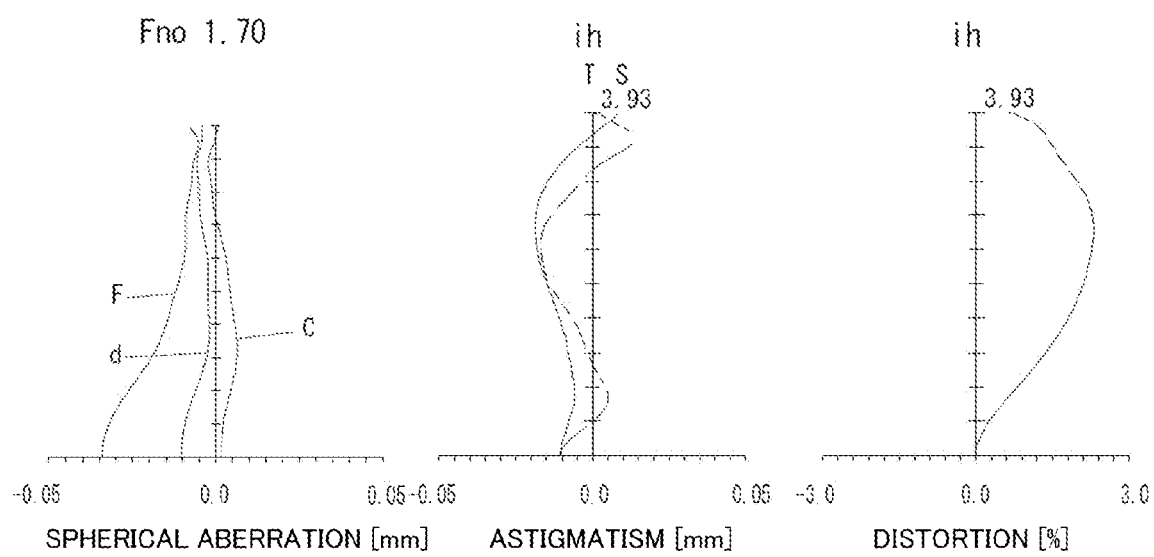
FIG. 4 shows spherical aberration, astigmatism, and distortion of the imaging lens in Example 2 according to the present invention.
Figure 5:
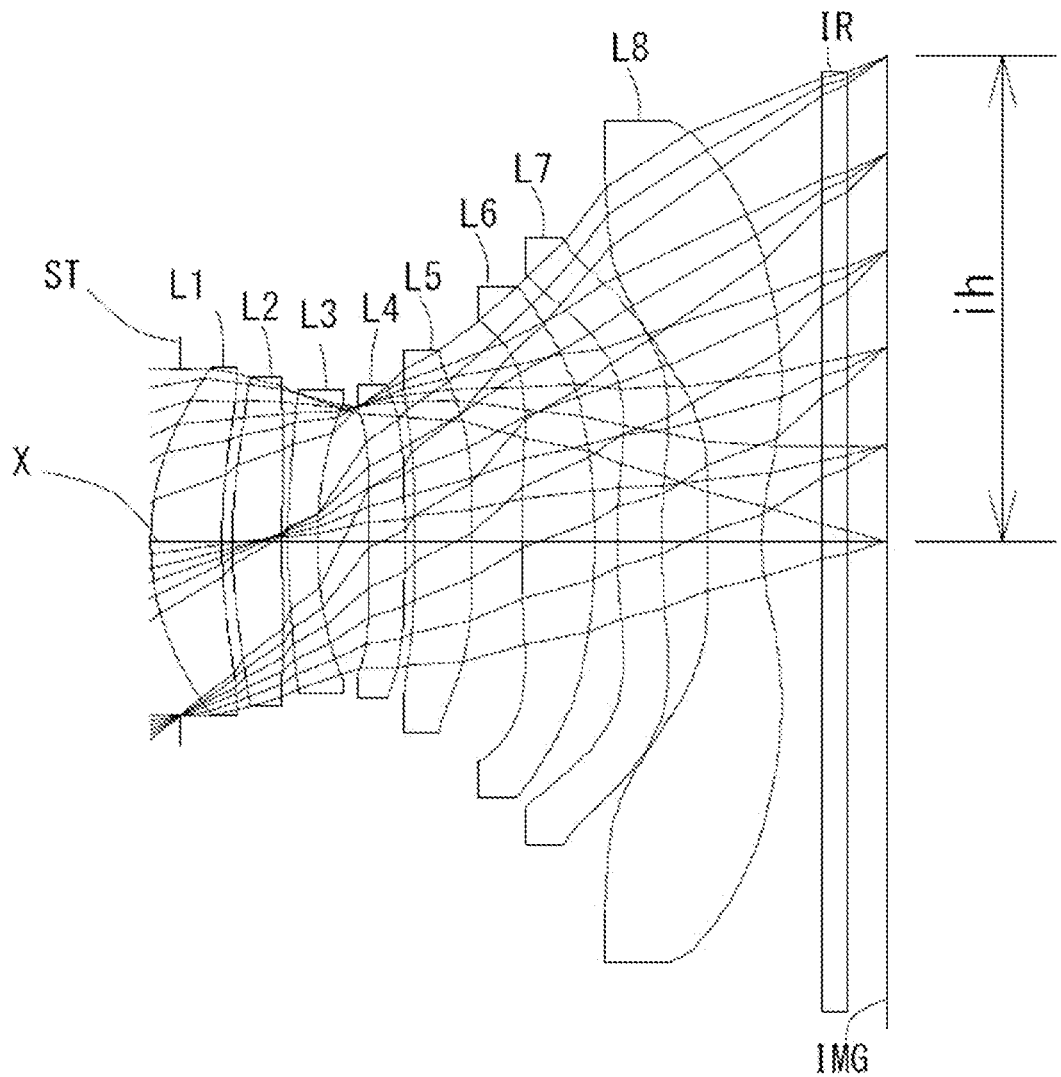
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3

Unit mm f = 4.77   i h = 3.93
Fno = 1.70   TTL = 5.89
ω(°) = 39.2

Surface Data

| Surface Number i | Curvature Curvature | Surface Distance d | Refractive Index Nd | Abbe Number νd |
|---|---|---|---|---|
| (Object) | Infinity | Infinity | | |
| 1(Stop) | Infinity | −0.2435 | | |
| 2* | 2.1605 | 0.5744 | 1.544 | 55.86 (ν d1) |
| 3* | 4.0525 | 0.0844 | | |
| 4* | 3.5251 | 0.4033 | 1.544 | 55.86 (ν d2) |
| 5* | 8.3647 | 0.0500 | | |
| 6* | 4.8738 | 0.2400 | 1.671 | 10.48 (ν d3) |
| 7* | 3.0968 | 0.4169 | | |
| 8* | −86.9778 | 0.2863 | 1.651 | 20.37 (ν d4) |
| 9* | −133.0359 | 0.0833 | | |
| 10* | −3457.3740 | 0.4674 | 1.535 | 55.66 (ν d5) |
| 11* | −80.4628 | 0.3991 | | |
| 12* | 10.1865 | 0.5933 | 1.544 | 55.86 (ν d6) |
| 13* | −5.3295 | 0.1818 | | |
| 14* | 5.3474 | 0.3600 | 1.671 | 19.48 (ν d7) |
| 15* | 5.7872 | 0.3693 | | |
| 16* | 7.0744 | 0.4430 | 1.535 | 55.68 (ν d8) |
| 17* | 1.6896 | 0.4845 | | |
| 18 | Infinity | 0.2100 | 1.517 | 64.20 |
| 19 | Infinity | 0.3177 | | |
| Image Plane | Infinity | | | |

Constituent Lens Data

| Lens | Start Surface | Focal Length | Composite Focal Length | |
|---|---|---|---|---|
| 1 | 2 | 7.680 | f 34 | −12.929 |
| 2 | 4 | 10.874 | f 56 | 6.277 |
| 3 | 6 | −13.377 | | |
| 4 | 8 | −381.164 | | |
| 5 | 10 | 154.029 | | |
| 6 | 12 | 6.516 | | |

TABLE 3-continued

Example 3

| | | |
|---|---|---|
| 7 | 14 | 78.872 |
| 8 | 16 | −4.206 |

Aspheric Surface Data

| | Second Surface | Third Surface | Fourth Surface | Fifth Surface | Sixth Surface | Seventh Surface | Eighth Surface | Ninth Surface |
|---|---|---|---|---|---|---|---|---|
| k   | 0.000000E+00  | 0.000000E+00  | 0.000000E+00  | 0.000000E+00  | 0.000000E+00  | 0.000000E+00  | 0.000000E+00  | −1.740052E+02 |
| A4  | 3.412678E−03  | −4.424684E−02 | −5.869229E−02 | −1.307331E−01 | −1.376112E−01 | −3.453295E−02 | −3.097143E−02 | −5.768079E−02 |
| A6  | −3.074040E−02 | −1.061449E−01 | −2.506692E−03 | 1.516161E−01  | 1.902821E−01  | −1.407239E−02 | 2.144994E−02  | 9.286574E−02 |
| A8  | 8.551929E−02  | 9.491259E−02  | 7.883070E−02  | −4.698937E−02 | −9.204443E−02 | 3.753712E−01  | −1.448228E−01 | −2.778051E−01 |
| A10 | −1.395048E−01 | −2.179896E−01 | −2.240067E−01 | −2.806889E−01 | −2.636456E−01 | −1.292432E+00 | 1.646730E−01  | 4.231874E−01 |
| A12 | 1.395598E−01  | 2.862987E−01  | 3.478678E−01  | 6.613938E−01  | 7.406626E−01  | 2.462505E+00  | 1.041061E−01  | −3.700268E−01 |
| A14 | −8.815036E−02 | −2.245263E−01 | −3.086979E−01 | −7.316904E−01 | −9.134933E−01 | −2.865478E+00 | −6.367006E−01 | 1.813477E−01 |
| A16 | 3.407110E−02  | 1.042955E−01  | 1.591194E−01  | 4.517063E−01  | 6.234154E−01  | 2.022937E+00  | 6.380524E−01  | −4.065195E−02 |
| A18 | −7.337411E−03 | −2.670548E−02 | −4.490927E−02 | −1.496723E−01 | −2.269853E−01 | −7.983052E−01 | −3.452277E−01 | −1.434414E−03 |
| A20 | 6.563808E−04  | 2.912898E−03  | 5.438238E−03  | 2.086284E−02  | 3.451827E−02  | 1.380539E−01  | 7.402241E−02  | 1.825860E−03 |

| | Tenth Surface | Eleventh Surface | Twelfth Surface | Thirteenth Surface | Fourteenth Surface | Fifteenth Surface | Sixteenth Surface | Seventeenth Surface |
|---|---|---|---|---|---|---|---|---|
| k   | 0.000000E+00  | 0.000000E+00  | 0.000000E+00  | −6.279545E+00 | −8.178149E+00 | 0.000000E+00  | −1.684901E+02 | −6.300548E+00 |
| A4  | −1.153818E−01 | −1.054318E−01 | −1.996238E−02 | −2.034972E−04 | 6.721009E−03  | 2.829086E−02  | −1.682974E−01 | −1.070705E−01 |
| A6  | 1.482735E−01  | 6.842962E−02  | 2.385353E−02  | −2.838965E−03 | −7.404897E−02 | −1.030887E−01 | 4.142839E−02  | 4.642569E−02 |
| A8  | −2.695209E−01 | −1.233397E−01 | −4.953416E−02 | 5.448793E−03  | 3.948503E−02  | 6.591759E−02  | 5.919284E−04  | −1.411484E−02 |
| A10 | 3.358251E−01  | 1.663845E−01  | 3.545708E−02  | −1.560375E−02 | −8.689166E−03 | −2.572345E−02 | −2.447584E−03 | 3.229687E−03 |
| A12 | −2.139190E−01 | −1.417877E−01 | −1.431445E−02 | 1.224195E−02  | 2.378118E−03  | 6.790914E−03  | 6.815469E−04  | −5.425407E−04 |
| A14 | 6.355791E−02  | 7.997095E−02  | 2.983030E−03  | −4.733048E−03 | 2.164998E−03  | −1.037711E−03 | −1.055293E−04 | 6.240168E−05 |
| A16 | −3.795573E−03 | −2.826269E−02 | −1.977734E−05 | 1.023396E−03  | −8.058639E−04 | 8.325653E−05  | 9.926208E−06  | −4.555244E−06 |
| A18 | −2.103884E−03 | 5.563336E−03  | −1.327896E−04 | −1.191768E−04 | 7.947654E−05  | −2.115955E−06 | −5.254533E−07 | 1.889534E−07 |
| A20 | 3.467348E−04  | −4.604956E−04 | 1.978557E−05  | 5.812544E−06  | −4.132435E−06 | −6.399841E−08 | 1.193602E−08  | −3.392882E−09 |

The imaging lens in Example 3 satisfies conditional expressions (1) to (15) as shown in Table 16.

Figure 6:
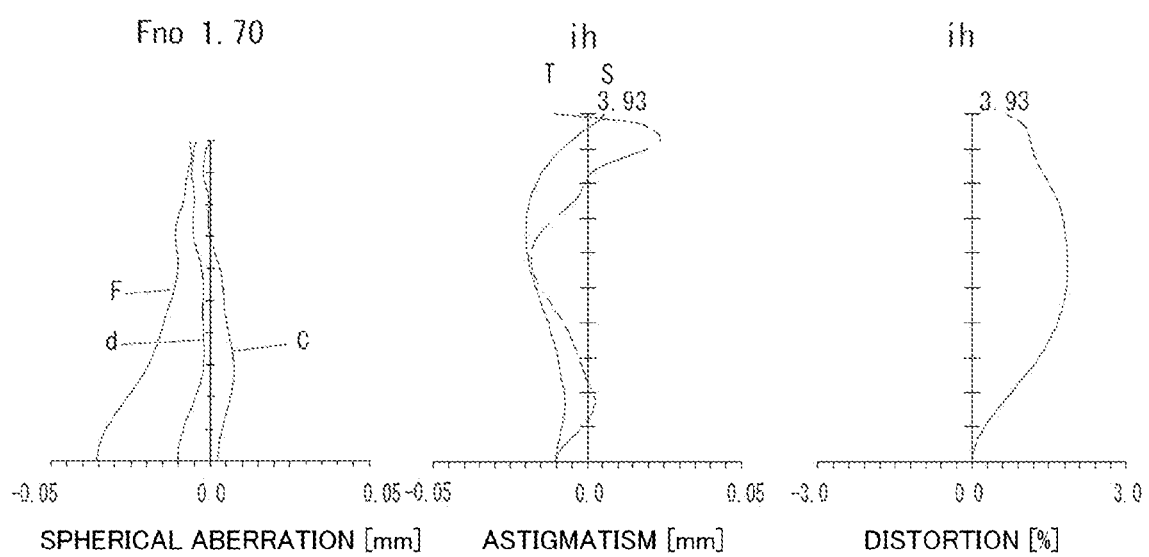
FIG. 6 shows spherical aberration, astigmatism, and distortion of the imaging lens in Example 3 according to the present invention.
Figure 7:
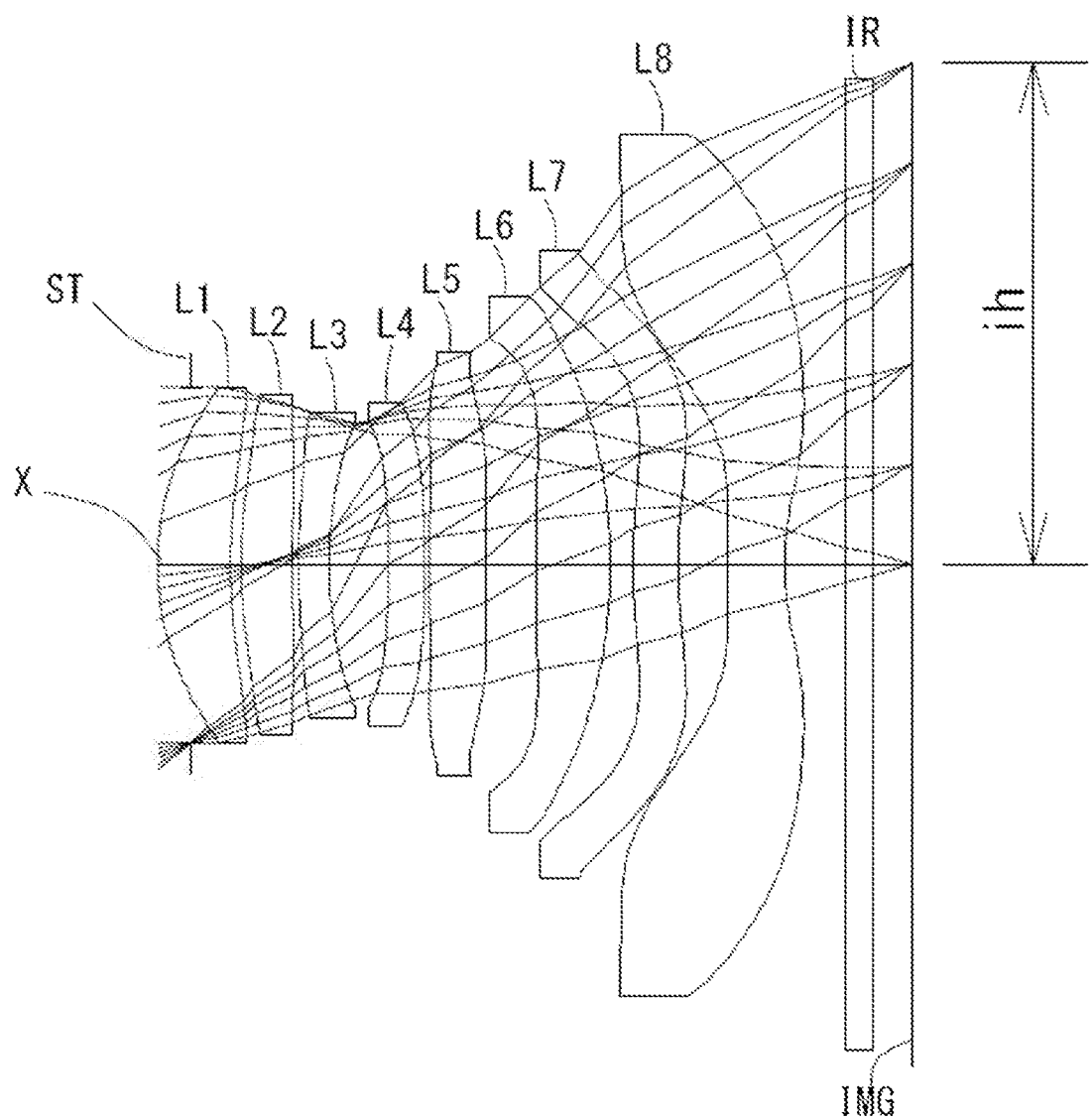
FIG. 7 is a schematic view showing an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example4

Unit mm f = 4.76  i h = 3.93
Fno = 1.70  TTL = 5.86
ω(°) = 39.2

Surface Data

| Surface Number i | Curvature Curvature | Surface Distance d | Refractive Index Nd | Abbe Number νd |
|---|---|---|---|---|
| (Object) | Infinity | Infinity | | |
| 1 (Stop) | Infinity | −0.2533 | | |
| 2* | 2.1576 | 0.5748 | 1.544 | 55.86 (ν d1) |
| 3* | 4.0785 | 0.0820 | | |
| 4* | 3.5169 | 0.4021 | 1.544 | 55.86 (ν d2) |
| 5* | 8.3224 | 0.0500 | | |
| 6* | 4.7924 | 0.2400 | 1.671 | 19.48 (ν d3) |
| 7* | 3.0809 | 0.4584 | | |
| 8* | −10.0000 | 0.2813 | 1.661 | 20.37 (ν d4) |
| 9* | −15.2520 | 0.0364 | | |
| 10* | 7.4579 | 0.4501 | 1.535 | 65.66 (ν d5) |
| 11* | 10.4143 | 0.3944 | | |
| 12* | 16.5780 | 0.5826 | 1.544 | 55.86 (ν d6) |
| 13* | −4.3540 | 0.1773 | | |
| 14* | 5.0003 | 0.3500 | 1.671 | 19.46 (ν d7) |
| 15* | 5.8617 | 0.3883 | | |
| 16* | 6.7723 | 0.4430 | 1.535 | 55.66 (ν d8) |

TABLE 4-continued

| | | Example4 | | |
|---|---|---|---|---|
| 17* | 1.7024 | 0.4845 | | |
| 18 | Infinity | 0.2100 | 1.517 | 64.20 |
| 19 | Infinity | 0.3121 | | |
| Image Plane | Infinity | | | |

Constituent Lens Data

| Lens | Start Surface | Focal Length | Composite Focal Length | |
|---|---|---|---|---|
| 1 | 2 | 7.514 | f34 | −10.473 |
| 2 | 4 | 10.869 | f56 | 5.923 |
| 3 | 6 | −13.517 | | |
| 4 | 8 | −44.908 | | |
| 5 | 10 | 48.547 | | |
| 6 | 12 | 6.539 | | |
| 7 | 14 | 43.393 | | |
| 8 | 16 | −4.038 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | 3.837166E−03 | −4.474240E−02 | −6.225584E−02 | −1.800390E−01 | −1.305263E−01 |
| A6 | −3.065587E−02 | −6.017387E−03 | 5.724039E−03 | 1.593343E−01 | 1.840252E−01 |
| A8 | 8.549903E−02 | 8.916743E−02 | 6.482711E−02 | −1.029298E−01 | −1.276261E−01 |
| A10 | −1.396448E−01 | −2.125939E−01 | −2.038704E−01 | −1.421365E−01 | −1.519161E−01 |
| A12 | 1.396352E−01 | 2.765852E−01 | 3.165110E−01 | 4.611165E−01 | 5.705177E−01 |
| A14 | −8.816920E−02 | −2.126016E−01 | −2.743903E−01 | −6.457169E−01 | −7.499418E−01 |
| A16 | 3.406994E−02 | 9.715867E−02 | 1.383927E−01 | 3.443872E−01 | 5.237499E−01 |
| A18 | −7.336256E−03 | −2.462704E−02 | −3.848675E−02 | −1.347857E−01 | −1.920504E−01 |
| A20 | 8.576884E−04 | 2.670536E−03 | 4.607885E−03 | 1.597284E−02 | 2.923183E−02 |

| | Tenth Surface | Eleventh Surface | Twelfth Surface | Thirteenth Surface | Fourteenth Surface |
|---|---|---|---|---|---|
| k | 0.000000E+00 | 0.000000E+00 | 0.000000E+00 | −9.010375E+00 | −8.724350E+00 |
| A4 | −1.467133E−01 | −9.724438E−02 | −1.133351E−02 | −1.064882E−02 | 2.037564E−02 |
| A6 | 1.767273E−01 | 3.774437E−02 | 7.895412E−03 | −3.839037E−02 | −1.240612E−01 |
| A8 | −2.064591E−01 | −2.480825E−02 | −2.379161E−02 | 6.527713E−02 | 8.729909E−02 |
| A10 | 2.243203E−01 | 1.463773E−02 | 2.306862E−02 | −4.872020E−02 | −2.822705E−02 |
| A12 | −1.729546E−01 | −4.646942E−03 | −1.580767E−02 | 1.943507E−02 | 4.549829E−04 |
| A14 | 8.680274E−02 | 3.838575E−03 | 8.442322E−03 | −4.371045E−03 | 2.640268E−03 |
| A16 | −2.695350E−02 | −3.008955E−03 | −1.344699E−03 | 5.443778E−04 | −8.427150E−04 |
| A18 | 4.713502E−03 | 3.200428E−04 | 8.929129E−05 | −3.334476E−05 | 1.119789E−04 |
| A20 | −3.560377E−01 | −3.811830E−05 | 5.601486E−06 | 6.489201E−07 | −5.675473E−06 |

Aspheric Surface Data

| | Seventh Surface | Eighth Surface | Ninth Surface |
|---|---|---|---|
| k | 0.000000E+00 | 0.000000E+00 | −1.740052E+02 |
| A4 | −3.040262E−02 | −3.696544E−03 | −6.215152E−02 |
| A6 | −1.917243E−02 | −7.627233E−02 | 2.603991E−02 |
| A8 | 3.617788E−01 | 1.113476E−01 | 3.687240E−02 |
| A10 | −1.289175E+00 | −2.864420E−01 | −2.164661E−01 |
| A12 | 2.668915E+00 | 5.919412E−01 | 3.980214E−01 |
| A14 | −3.122869E+00 | −8.410386E−01 | −4.076784E−01 |
| A16 | 2.303550E+00 | 7.374018E−01 | 2.429592E−01 |
| A18 | −9.495796E−01 | −3.596820E−01 | −7.895124E−02 |
| A20 | 1.691196E−01 | 7.532629E−02 | 1.894597E−02 |

| | Fifteenth Surface | Sixteenth Surface | Seventeenth Surface |
|---|---|---|---|
| k | 0.000000E+00 | −1.664901E+02 | −6.514106E+00 |
| A4 | 4.908378E−02 | 1.829840E−01 | −1.884159E−01 |
| A6 | −1.451819E−01 | 6.514608E−02 | 4.831254E−02 |
| A8 | 1.035187E−01 | −1.571852E−02 | −1.493512E−02 |
| A10 | −4.443004E−02 | 3.781055E−03 | 3.400549E−03 |
| A12 | 1.198206E−02 | −7.483484E−04 | −5.606625E−04 |

TABLE 4-continued

| | | Example4 | | |
|---|---|---|---|---|
| | A14 | −1.977813E−03 | 9.799572E−05 | 6.292951E−05 |
| | A16 | 1.856155E−04 | −7.750449E−06 | −4.477993E−06 |
| | A18 | −6.223435E−06 | 3.357120E−07 | 1.813594E−07 |
| | A20 | 6.826253E−08 | −6.132627E−09 | −3.190401E−09 |

The imaging lens in Example 4 satisfies conditional expressions (1) to (15) as shown in Table 16.

Figure 8:
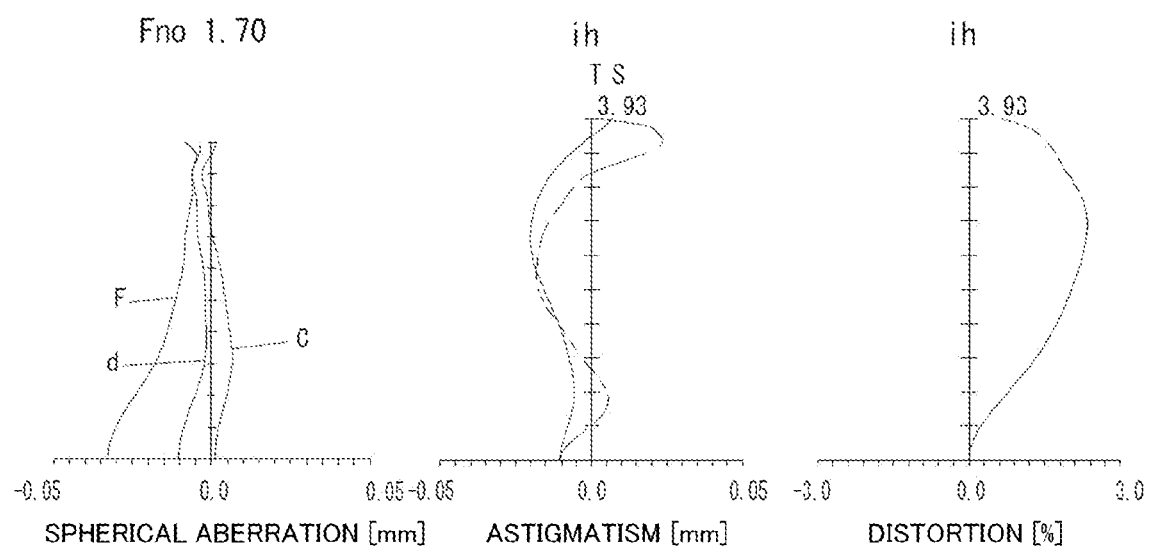
FIG. 8 shows spherical aberration, astigmatism, and distortion of the imaging lens in Example 4 according to the present invention.
Figure 9:
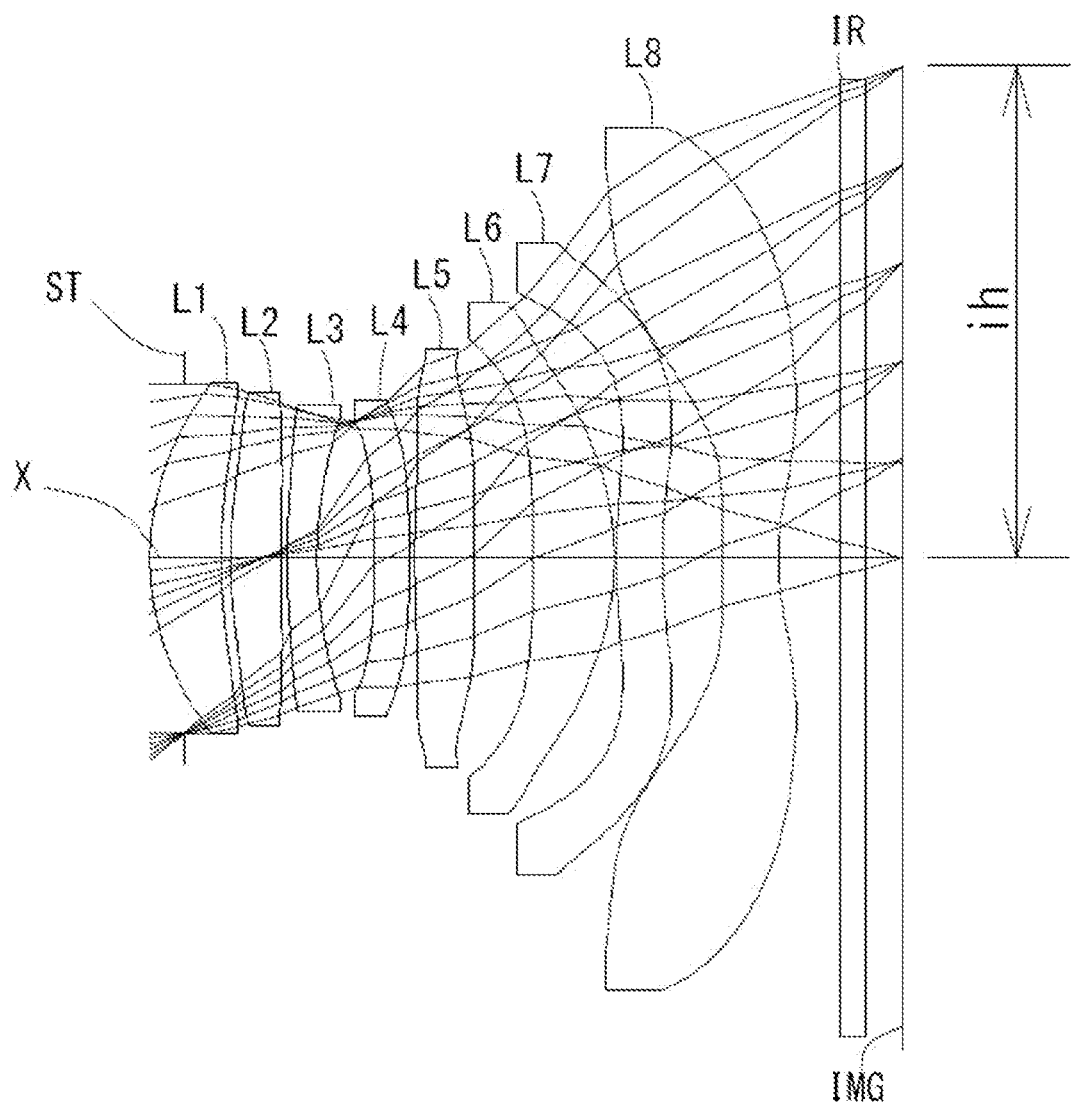
FIG. 9 is a schematic view showing an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example5

Unit mm f = 4.76    i h = 3.93
Fno = 1.70  TTL = 5.95
ω(°) = 39.2

Surface Data

| Surface Number i (Object) | Curvature Curvature Infinity | Surface Distance d Infinity | Refractive Index Nd | Abbe Number νd |
|---|---|---|---|---|
| 1 (Stop) | Infinity | −0.2533 | | |
| 2* | 2.1990 | 0.5697 | 1.544 | 55.88 (ν d1) |
| 3* | 4.0423 | 0.0750 | | |
| 4* | 3.5287 | 0.4009 | 1.544 | 55.86 (ν d2) |
| 5* | 8.9853 | 0.0500 | | |
| 6* | 5.0009 | 0.2400 | 1.671 | 19.48 (ν d3) |
| 7* | 3.2089 | 0.4598 | | |
| 8* | −7.3795 | 0.2806 | 1.661 | 20.37 (ν d4) |
| 9* | −11.3498 | 0.0420 | | |
| 10* | 6.3916 | 0.4725 | 1.535 | 65.66 (ν d5) |
| 11* | 19.7842 | 0.4790 | | |
| 12* | −10.0000 | 0.6441 | 3.544 | 55.86 (ν d6) |
| 13* | −2.3053 | 0.0150 | | |
| 14* | 5.1933 | 0.3694 | 1.671 | 19.46 (ν d7) |
| 15* | 4.3680 | 0.4842 | | |
| 16* | 35.9254 | 0.4430 | 1.535 | 65.66 (ν d8) |
| 17* | 1.8927 | 0.4845 | | |
| 18 | Infinity | 0.2100 | 1.517 | 64.20 |
| 19 | Infinity | 0.2985 | | |
| Image Plane | Infinity | | | |

Constituent Lens Data

| Lens | Start Surface | Focal Length | Composite Focal Length | |
|---|---|---|---|---|
| 1 | 2 | 7.990 | f34 | −9.892 |
| 2 | 4 | 10.406 | f56 | 4.371 |
| 3 | 6 | −14.097 | | |
| 4 | 8 | −32.850 | | |
| 5 | 10 | 17.440 | | |
| 6 | 12 | 6.346 | | |
| 7 | 14 | 43.393 | | |
| 8 | 16 | −4.038 | | |

TABLE 5-continued

Example5

Aspheric Surface Data

|     | Second Surface | Third Surface | Fourth Surface | Fifth Surface | Sixth Surface |
| --- | --- | --- | --- | --- | --- |
| k   | 0.000000E+00 | 0.000000E+00 | 0.000000E+00 | 0.000000E+00 | 0.000000E+00 |
| A4  | 5.486225E−03 | −4.874030E−02 | −7.208791E−02 | −1.214967E−01 | −1.123111E−01 |
| A6  | −3.025978E−02 | −1.869157E−03 | 1.282859E−02 | 1.189102E−01 | 1.301033E−01 |
| A8  | 8.590098E−02 | 1.005988E−01 | 7.035615E−02 | 2.584970E−02 | −2.789997E−04 |
| A10 | −1.394428E−01 | −2.381144E−01 | −2.064985E−01 | −3.844015E−01 | −3.855776E−01 |
| A12 | 1.396047E−01 | 3.006156E−01 | 2.922227E−01 | 7.241770E−01 | 8.245371E−01 |
| A14 | −8.818680E−02 | −2.284022E−01 | −2.385380E−01 | −7.084065E−01 | −8.903322E−01 |
| A16 | 3.406177E−02 | 1.051294E−01 | 1.170465E−01 | 3.976528E−01 | 5.452114E−01 |
| A18 | −7.335752E−03 | −2.711037E−02 | −3.224993E−02 | −1.215644E−01 | −1.799829E−01 |
| A20 | 6.593708E−04 | 2.992147E−03 | 3.836222E−03 | 1.575809E−02 | 2.507054E−02 |

|     | Tenth Surface | Eleventh Surface | Twelfth Surface | Thirteenth Surface | Fourteenth Surface |
| --- | --- | --- | --- | --- | --- |
| k   | 0.000000E+00 | 0.000000E+00 | 0.000000E+00 | −4.842829E+00 | −9.183175E+00 |
| A4  | −1.575698E−01 | −7.137327E−02 | −1.696511E−02 | −3.253744E−02 | 5.376003E−04 |
| A6  | 2.380971E−01 | 1.835161E−02 | 2.526267E−02 | 3.403944E−03 | −7.907425E−02 |
| A8  | −3.429715E−01 | −4.405635E−03 | −5.951747E−02 | −3.958811E−03 | 5.879975E−02 |
| A10 | 3.762547E−01 | −3.087156E−02 | 6.369998E−02 | 1.819909E−02 | −1.951968E−02 |
| A12 | −2.728550E−01 | 1.685896E−02 | −4.806987E−02 | −2.285945E−02 | −9.812472E−04 |
| A14 | 1.282812E−01 | −9.636533E−03 | 2.282954E−02 | 1.282869E−02 | 2.975227E−03 |
| A16 | −3.784739E−02 | 2.801571E−03 | −6.244941E−03 | −3.641552E−03 | −9.667477E−04 |
| A18 | 6.391014E−03 | −3.690392E−04 | 8.660881E−04 | 5.345941E−04 | 1.336843E−04 |
| A20 | −4.726062E−04 | 3.733381E−05 | −4.580307E−05 | −2.904106E−05 | −6.987608E−08 |

Aspheric Surface Data

|     | Seventh Surface | Eighth Surface | Ninth Surface |
| --- | --- | --- | --- |
| k   | 0.000000E+00 | 0.000000E+00 | −1.740052E+02 |
| A4  | −3.617306E−02 | −1.395089E−03 | −9.270279E−02 |
| A6  | −8.370670E−02 | −7.746172E−02 | 1.044895E−01 |
| A8  | 5.890776E−01 | 1.759016E−01 | −6.900224E−02 |
| A10 | −1.939306E+00 | −5.617326E−01 | −1.958685E−01 |
| A12 | 3.797630E+00 | 1.134018E+00 | 5.414098E−01 |
| A14 | −4.626552E+00 | −1.499371E+00 | −6.253196E−01 |
| A16 | 3.449219E+00 | 1.223495E+00 | 3.935637E−01 |
| A18 | −1.444364E+00 | −5.635420E−01 | −1.321293E−01 |
| A20 | 2.620696E−01 | 1.130857E−01 | 1.869803E−02 |

|     | Fifteenth Surface | Sixteenth Surface | Seventeenth Surface |
| --- | --- | --- | --- |
| k   | 0.000000E+00 | −1.654901E+02 | −6.610224E+00 |
| A4  | 2.635106E−03 | −1.812937E−01 | −1.062651E−01 |
| A6  | −9.379264E−02 | 6.482922E−02 | 4.801942E−02 |
| A8  | 7.608696E−02 | −1.359715E−02 | −1.514694E−02 |
| A10 | −3.652731E−02 | 2.477062E−03 | 3.523441E−03 |
| A12 | 1.106021E−02 | −3.835799E−04 | −5.868667E−04 |
| A14 | −2.086501E−03 | 4.227198E−05 | 6.581154E−05 |

TABLE 5-continued

| | Example5 | | |
|---|---|---|---|
| A16 | 2.342278E−04 | −2.850878E−06 | −4.648798E−06 |
| A18 | −1.409832E−05 | 1.028598E−07 | 1.860873E−07 |
| A20 | 3.440553E−07 | −1.419140E−09 | −3.221523E−08 |

The imaging lens in Example 5 satisfies conditional expressions (1) to (15) as shown in Table 16.

Figure 10:
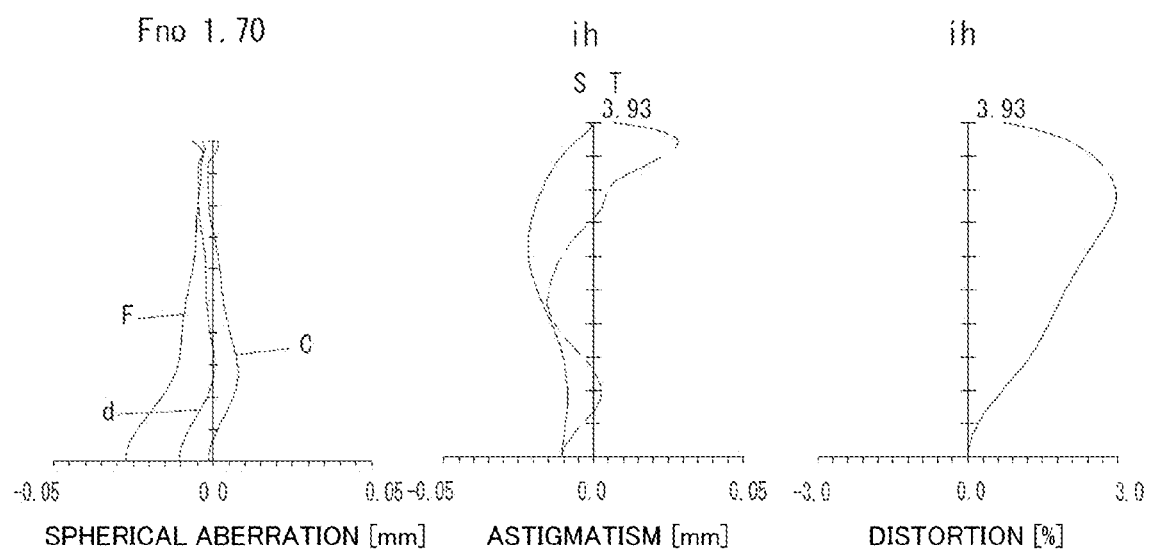
FIG. 10 shows spherical aberration, astigmatism, and distortion of the imaging lens in Example 5 according to the present invention.
Figure 11:
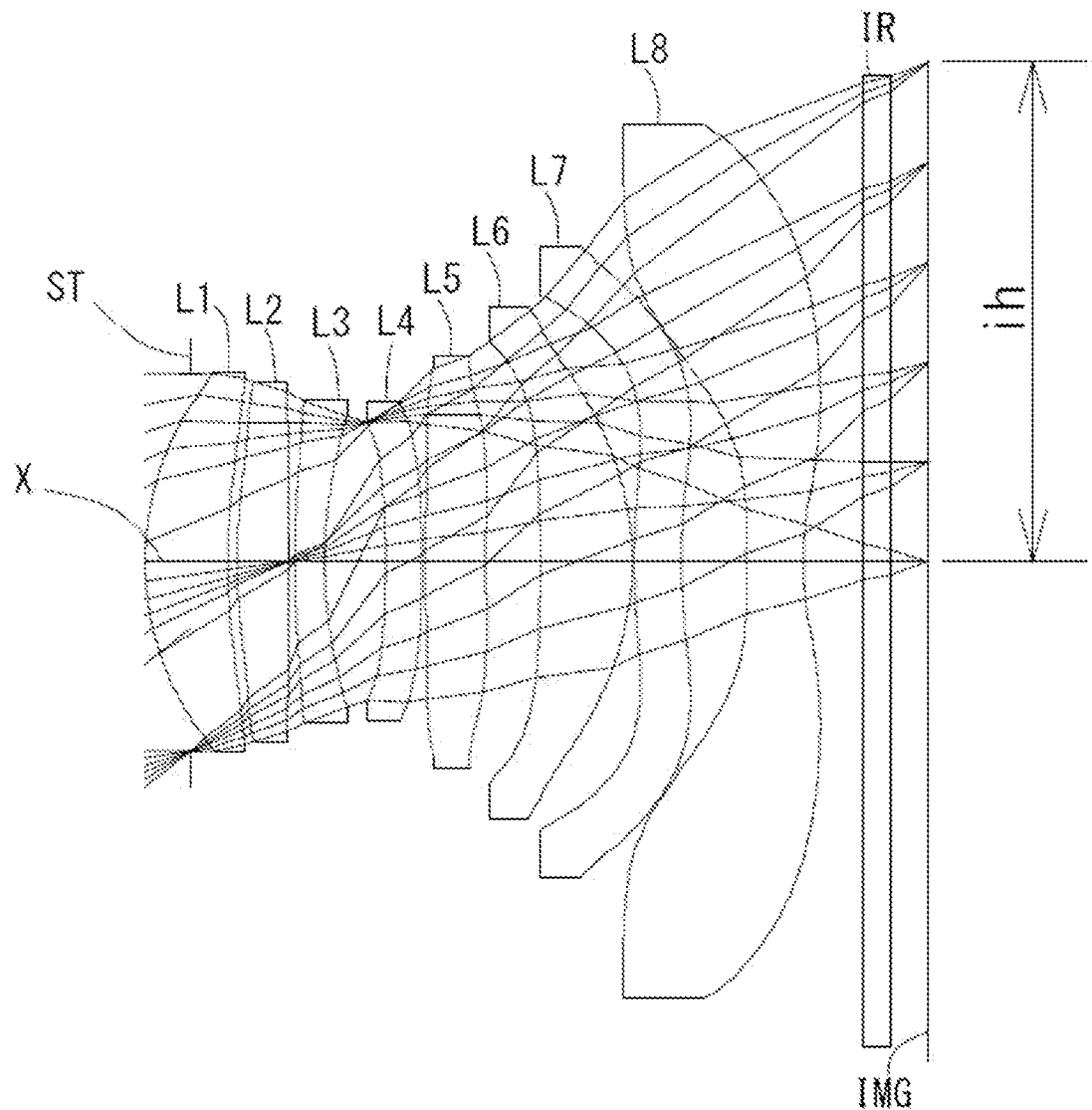
FIG. 11 is a schematic view showing an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example6

Unit mm f = 4.76  i h = 3.93
Fno = 1.60  TTL = 6.10
ω(°) = 39.2

Surface Data

| Surface Number i | Curvature Curvature | Surface Distance d | Refractive Index Nd | Abbe Number νd |
|---|---|---|---|---|
| (Object) | Infinity | Infinity | | |
| 1 (Stop) | Infinity | −0.3850 | | |
| 2* | 2.2990 | 0.6475 | 1.544 | 55.86 (ν d1) |
| 3* | 4.1984 | 0.0750 | | |
| 4* | 3.7564 | 0.4000 | 1.544 | 55.56 (ν d2) |
| 5* | 9.2364 | 0.0500 | | |
| 6* | 5.1814 | 0.2400 | 1.671 | 19.48 (ν d3) |
| 7* | 3.3874 | 0.4789 | | |
| 8* | −8.6967 | 0.2838 | 1.681 | 20.37 (ν d4) |
| 9* | −14.3470 | 0.0254 | | |
| 10* | 6.0842 | 0.4826 | 1.535 | 65.66 (ν d5) |
| 11* | 11.9586 | 0.4284 | | |
| 12* | −21.3527 | 0.7263 | 1.544 | 55.86 (ν d6) |
| 13* | −2.2634 | 0.0150 | | |
| 14* | 5.2258 | 0.3674 | 1.671 | 19.48 (ν d7) |
| 15* | 4.3297 | 0.5143 | | |
| 16* | 123.4657 | 0.4430 | 1.535 | 65.66 (ν d8) |
| 17* | 1.8934 | 0.4845 | | |
| 18 | Infinity | 0.2100 | 1.517 | 64.20 |
| 19 | Infinity | 0.3018 | | |
| Image Plane | Infinity | | | |

Constituent Lens Data

| Lens | Start Surface | Focal Length | Composite Focal Length | |
|---|---|---|---|---|
| 1 | 2 | 8.335 | f34 | −10.625 |
| 2 | 4 | 11.340 | f56 | 4.047 |
| 3 | 6 | −15.399 | | |
| 4 | 8 | −34.102 | | |
| 5 | 10 | 22.615 | | |
| 6 | 12 | 4.590 | | |
| 7 | 14 | −45.027 | | |
| 8 | 16 | −3.600 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | 6.593735E−03 | −5.718901E−02 | −7.678589E−02 | −1.243221E−01 | −1.057164E−01 |
| A6 | −3.020039E−02 | 4.680507E−02 | 2.110959E−02 | 1.382617E−01 | 1.254319E−01 |

TABLE 6-continued

| | | | Example6 | | |
|---|---|---|---|---|---|
| A8 | 8.626306E−02 | −3.767968E−02 | 4.028405E−02 | −5.397282E−02 | −4.837977E−02 |
| A10 | −1.393489E−01 | 3.384222E−02 | −3.238042E−01 | −1.832333E−01 | −1.856741E−01 |
| A12 | 1.395973E−01 | 3.426556E−03 | 1.562044E−01 | 4.068979E−01 | 4.336189E−01 |
| A14 | −8.819504E−02 | −6.572981E−03 | −1.075457E−01 | −3.953001E−01 | −4.522914E−01 |
| A16 | 3.406453E−02 | 4.268550E−03 | 4.462115E−02 | 2.103218E−01 | 2.580332E−01 |
| A18 | −7.329469E−03 | −1.549556E−03 | −1.056046E−02 | −5.947546E−02 | −7.757733E−02 |
| A20 | 6.640507E−04 | 2.287654E−04 | 1.099703E−03 | 7.004295E−03 | 9.684945E−03 |

| | Tenth Surface | Eleventh Surface | Twelfth Surface | Thirteenth Surface | Fourteenth Surface |
|---|---|---|---|---|---|
| k | 0.000000E+00 | 0.000000E+00 | 0.000000E+00 | −4.847815E+00 | −9.348175E+00 |
| A4 | −1.819298E−01 | −8.868000E−02 | −3.268133E−02 | −6.172681E−02 | −2.433812E−02 |
| A6 | 3.627423E−01 | 3.627474E−02 | 5.612811E−02 | 6.949340E−02 | −2.012911E−02 |
| A8 | −6.360741E−01 | −1.043647E−02 | −1.024251E−01 | −8.980157E−02 | −1.643631E−02 |
| A10 | 7.607095E−01 | −1.980189E−02 | 1.127864E−01 | 8.889730E−02 | 3.956626E−02 |
| A12 | −5.731984E−01 | 2.379055E−02 | −8.598369E−02 | −5.941549E−02 | −3.039717E−02 |
| A14 | 2.711322E−01 | −9.255137E−03 | 4.161282E−02 | 2.440912E−02 | 1.207549E−02 |
| A16 | −7.852283E−02 | 5.416312E−04 | −1.185606E−02 | −5.808314E−03 | −2.642895E−03 |
| A18 | 1.277736E−02 | 4.605547E−04 | 3.792583E−03 | 7.309080E−04 | 3.015035E−04 |
| A20 | −8.979100E−04 | −8.017422E−05 | −1.096507E−04 | −3.791016E−05 | −1.398291E−05 |

| | | Aspheric Surface Data | | |
|---|---|---|---|---|
| | | Seventh Surface | Eighth Surface | Ninth Surface |
| | k | 0.000000E+00 | 0.000000E+00 | −1.740052E+02 |
| | A4 | −1.097938E−02 | 1.428687E−02 | −8.652449E−02 |
| | A6 | −1.156454E−01 | −1.254552E−01 | 8.713090E−02 |
| | A8 | 7.033708E−01 | 3.429297E−01 | 3.107614E−02 |
| | A10 | −2.202875E+00 | −1.010336E+00 | −4.646444E−01 |
| | A12 | 4.120368E+00 | 1.904429E+00 | 9.420528E−01 |
| | A14 | −4.758592E+00 | −2.246262E+00 | −9.470845E−01 |
| | A16 | 3.330612E+00 | 1.630238E+00 | 5.280145E−01 |
| | A18 | −1.298325E+00 | −6.463187E−01 | −1.566903E−01 |
| | A20 | 2.172236E−01 | 1.122478E−01 | 1.944633E−02 |

| | | Fifteenth Surface | Sixteenth Surface | Seventeenth Surface |
|---|---|---|---|---|
| | k | 0.000000E+00 | −1.664001E+02 | −6.336284E+00 |
| | A4 | 5.230094E−03 | 1.873115E−01 | −1.140721E−01 |
| | A6 | −8.266249E−02 | 6.964355E−02 | 6.640896E−02 |
| | A8 | 6.551119E−02 | −1.456116E−02 | −1.921850E−02 |
| | A10 | −2.901143E−02 | 2.000897E−03 | 4.642722E−03 |
| | A12 | 7.464086E−03 | −1.274914E−04 | −7.718337E−04 |

TABLE 6-continued

| | | Example6 | | |
|---|---|---|---|---|
| | A14 | −1.036319E−03 | 9.493552E−06 | 8.442191E−05 |
| | A16 | 5.780277E−05 | 2.530882E−06 | −5.754320E−06 |
| | A18 | 1.754994E−06 | −1.857411E−07 | 2.211445E−07 |
| | A20 | −2.376038E−07 | 4.874600E−09 | −3.664199E−09 |

The imaging lens in Example 6 satisfies conditional expressions (1) to (15) as shown in Table 16.

Figure 12:
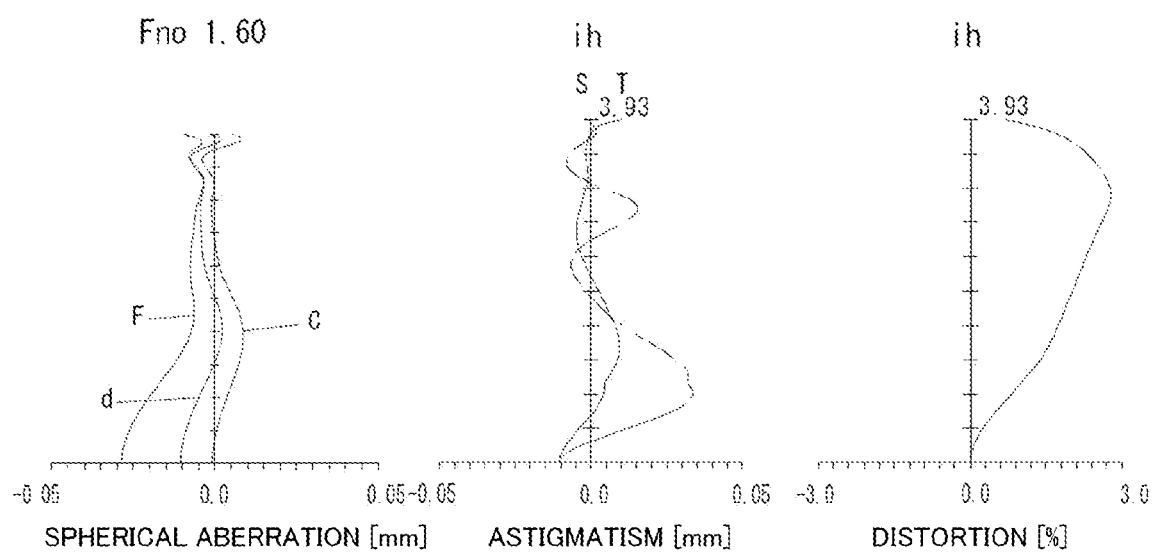
FIG. 12 shows spherical aberration, astigmatism, and distortion of the imaging lens in Example 6 according to the present invention.
Figure 13:
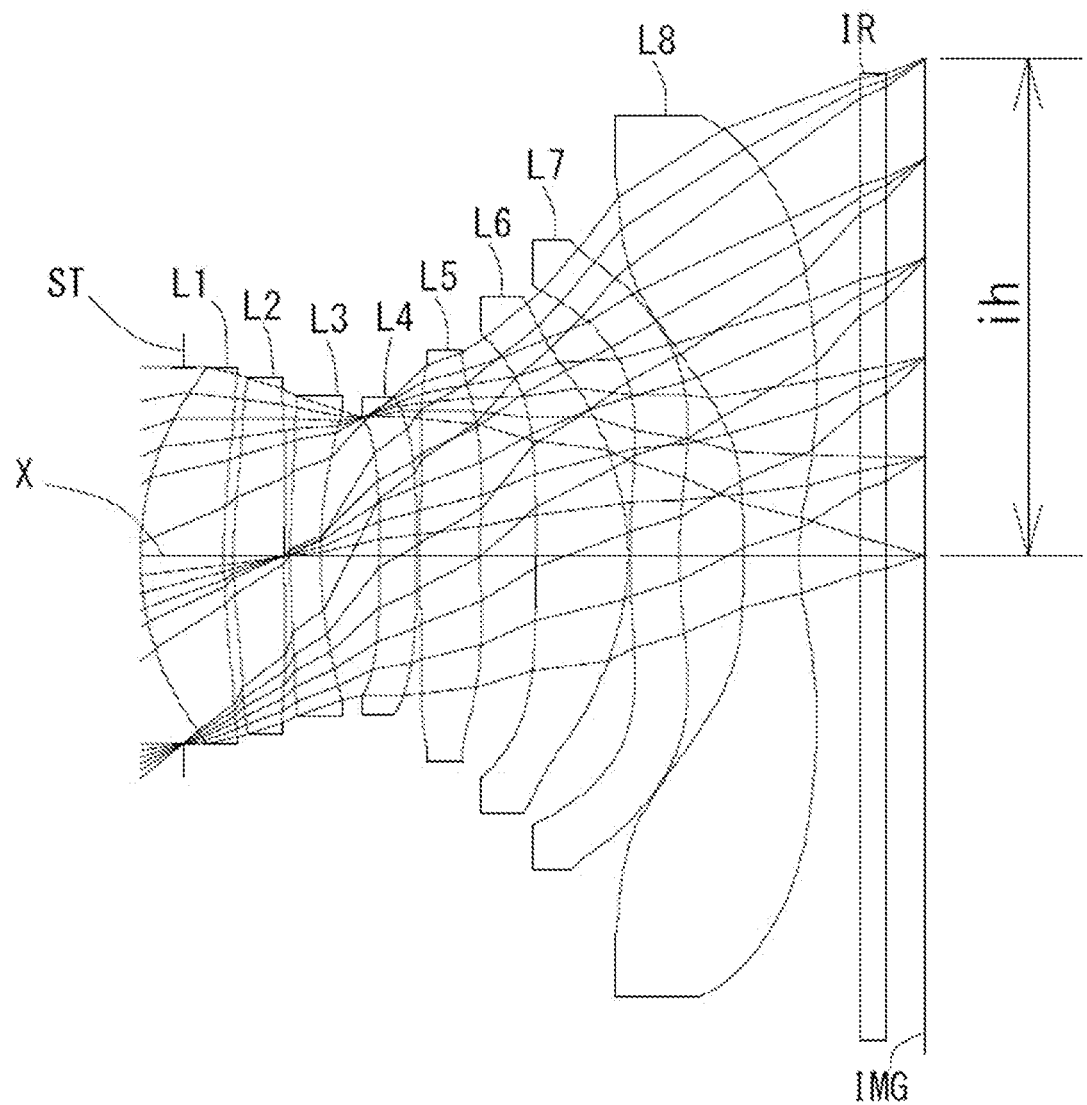
FIG. 13 is a schematic view showing an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

Example7

Unit mm f = 4.76      i h = 3.93
Fno = 1.60     TTL = 6.14
ω(°) = 39.2

Surface Data

| Surface Number i | Curvature Curvature | Surface Distance d | Refractive Index Nd | Abbe Number νd |
|---|---|---|---|---|
| (Object) | Infinity | Infinity | | |
| 1 (Stop) | Infinity | −0.3331 | | |
| 2* | 2.3734 | 0.6608 | 1.544 | 55.56 (ν d1) |
| 3* | 4.9347 | 0.0750 | | |
| 4* | 3.9504 | 0.4000 | 1.544 | 55.56 (ν d2) |
| 5* | 8.9219 | 0.0500 | | |
| 6* | 5.9703 | 0.2400 | 1.671 | 19.48 (ν d3) |
| 7* | 3.4817 | 0.4687 | | |
| 8* | −10.3307 | 0.2942 | 0.535 | 25.66 (ν d4) |
| 9* | −14.9233 | 0.0175 | | |
| 10* | 6.3150 | 0.4828 | 1.535 | 55.86 (ν d5) |
| 11* | 11.8443 | 0.4440 | | |
| 12* | −21.7002 | 0.7263 | 1.544 | 55.86 (ν d6) |
| 13* | −2.0516 | 0.0150 | | |
| 14* | 6.7767 | 0.3937 | 1.671 | 19.48 (ν d7) |
| 15* | 4.4819 | 0.5049 | | |
| 16* | 862.5580 | 0.4430 | 1.535 | 55.66 (ν d8) |
| 17* | 1.9084 | 0.4845 | | |
| 18 | Infinity | 0.2100 | 1.517 | 64.20 |
| 19 | Infinity | 0.3016 | | |
| Image Plane | Infinity | | | |

Constituent Lens Data

| Lens | Start Surface | Focal Length | Composite Focal Length | |
|---|---|---|---|---|
| 1 | 2 | 7.701 | f34 | −10.797 |
| 2 | 4 | 12.665 | f56 | 3.730 |
| 3 | 6 | −12.943 | | |
| 4 | 8 | −64.200 | | |
| 5 | 10 | 24.547 | | |
| 6 | 12 | 4.109 | | |
| 7 | 14 | −21.166 | | |
| 8 | 16 | −3.577 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | 6.978491E−03 | −5.880821E−02 | −7.374250E−02 | −1.138919E−01 | −9.760524E−02 |

TABLE 7-continued

| | | Example7 | | | | |
|---|---|---|---|---|---|---|
| A6 | −3.023701E−02 | 5.153542E−02 | 1.477714E−02 | 1.371841E−01 | 1.067148E−01 |
| A8 | 8.533970E−02 | −4.188153E−02 | 5.414008E−02 | −1.203605E−01 | −2.262593E−02 |
| A10 | −1.393308E−01 | −8.972292E−04 | −1.620352E−01 | −4.288824E−02 | −2.488418E−01 |
| A12 | 1.395950E−01 | 4.312754E−02 | 2.183993E−01 | 2.706418E−01 | 5.604328E−01 |
| A14 | −8.820100E−02 | −4.548871E−02 | −1.547233E−01 | −3.306274E−01 | −6.035198E−01 |
| A16 | 3.406413E−02 | 2.405457E−02 | 7.286168E−02 | 2.806961E−01 | 3.597364E−01 |
| A18 | −7.328989E−03 | −6.352326E−03 | −1.772977E−02 | −6.257010E−02 | −1.137238E−01 |
| A20 | 6.665051E−04 | 8.514547E−04 | 1.840043E−03 | 8.000487E−03 | 1.497062E−02 |

| | Tenth Surface | Eleventh Surface | Twelfth Surface | Thirteenth Surface | Fourteenth Surface |
|---|---|---|---|---|---|
| k | 0.000000E+00 | 0.000000E+00 | 0.000000E+00 | −5.404381E+00 | −2.867602E+00 |
| A4 | −1.690688E−01 | −9.108641E−02 | −4.054363E−02 | −3.095503E−02 | 4.621114E−03 |
| A6 | 3.210982E−01 | 5.707541E−02 | 9.089039E−02 | 1.806458E−02 | −6.998319E−02 |
| A8 | −5.794209E−01 | −7.130533E−02 | −1.599016E−01 | −4.355914E−02 | 3.503357E−02 |
| A10 | 7.112341E−01 | 7.301572E−02 | 1.871750E−01 | 8.370127E−02 | 6.463641E−03 |
| A12 | −5.388008E−01 | −6.024326E−02 | −1.374992E−01 | −6.171370E−02 | −1.704382E−02 |
| A14 | 2.522613E−01 | 3.908900E−02 | 6.378357E−02 | 2.334015E−02 | 8.737869E−03 |
| A16 | −7.156590E−02 | −1.536711E−02 | −1.751347E−02 | −5.814579E−03 | −2.146434E−03 |
| A18 | 1.133917E−02 | 3.714078E−03 | 2.565226E−03 | 7.512862E−04 | 2.617479E−04 |
| A20 | −7.738680E−04 | −3.424480E−04 | −1.527171E−04 | −3.950040E−05 | −1.288431E−05 |

| | | Aspheric Surface Data | | |
|---|---|---|---|---|
| | | Seventh Surface | Eighth Surface | Ninth Surface |
| | k | 0.000000E+00 | 0.000000E+00 | −1.740052E+02 |
| | A4 | −5.515185E−03 | 1.848219E−02 | −5.792220E−02 |
| | A6 | −1.747572E−01 | −7.550289E−02 | 3.004852E−02 |
| | A8 | 9.783425E−01 | 5.393825E−02 | 1.237699E−01 |
| | A10 | −2.895325E+00 | −1.958323E−01 | −6.240725E−01 |
| | A12 | 5.151082E+00 | 5.508396E−01 | 1.121065E+00 |
| | A14 | −5.676887E+00 | −8.720035E−01 | −1.069473E+00 |
| | A16 | 3.797228E+00 | 7.703616E−01 | 5.742591E−01 |
| | A18 | −1.415213E+00 | −3.820583E−01 | −1.648835E−01 |
| | A20 | 2.262224E−01 | 7.103857E−02 | 1.984328E−02 |

| | | Fifteenth Surface | Sixteenth Surface | Seventeenth Surface |
|---|---|---|---|---|
| | k | 0.000000E+00 | −1.864901E+02 | −6.000000E+00 |
| | A4 | −1.808781E−02 | −1.881334E−01 | −1.213353E−01 |
| | A6 | −6.802498E−02 | 6.374572E−02 | 6.322198E−02 |
| | A8 | 5.612786E−02 | −5.568267E−03 | −2.204520E−02 |
| | A10 | −2.431776E−02 | −3.067119E−03 | 5.349744E−03 |
| | A12 | 5.678508E−03 | 1.350926E−03 | −8.867409E−04 |

TABLE 7-continued

| | | Example7 | | |
|---|---|---|---|---|
| | A14 | −5.754913E−04 | −2.568849E−04 | 9.877162E−05 |
| | A16 | −1.664138E−05 | 2.660074E−05 | −6.606971E−06 |
| | A18 | 8.247214E−06 | −1.456579E−06 | 2.554220E−07 |
| | A20 | −4.771366E−07 | 3.308538E−08 | −4.271667E−09 |

The imaging lens in Example 7 satisfies conditional expressions (1) to (15) as shown in Table 16.

Figure 14:
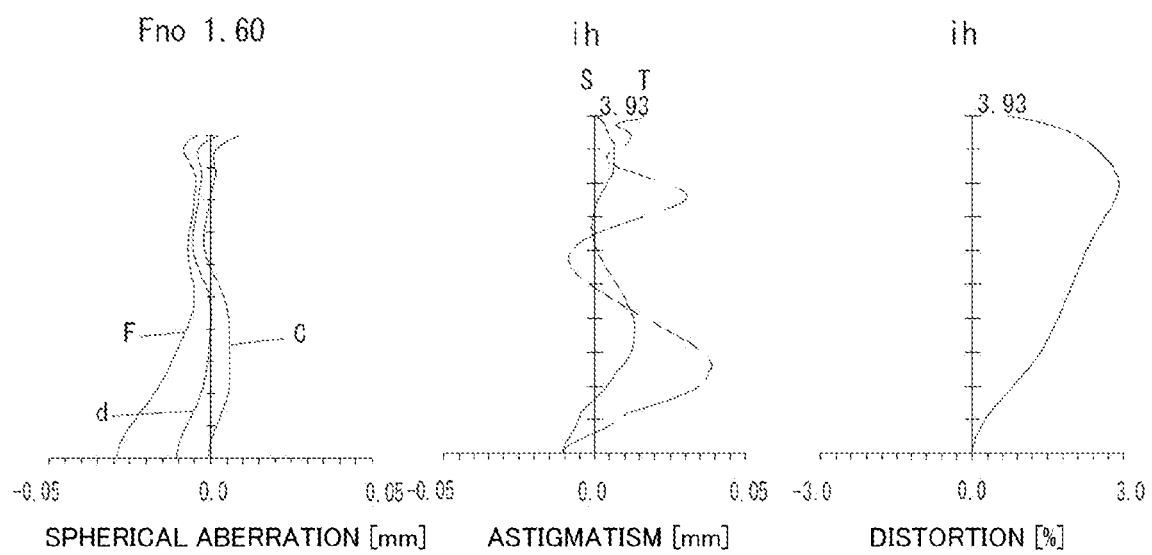
FIG. 14 shows spherical aberration, astigmatism, and distortion of the imaging lens in Example 7 according to the present invention.
Figure 15:
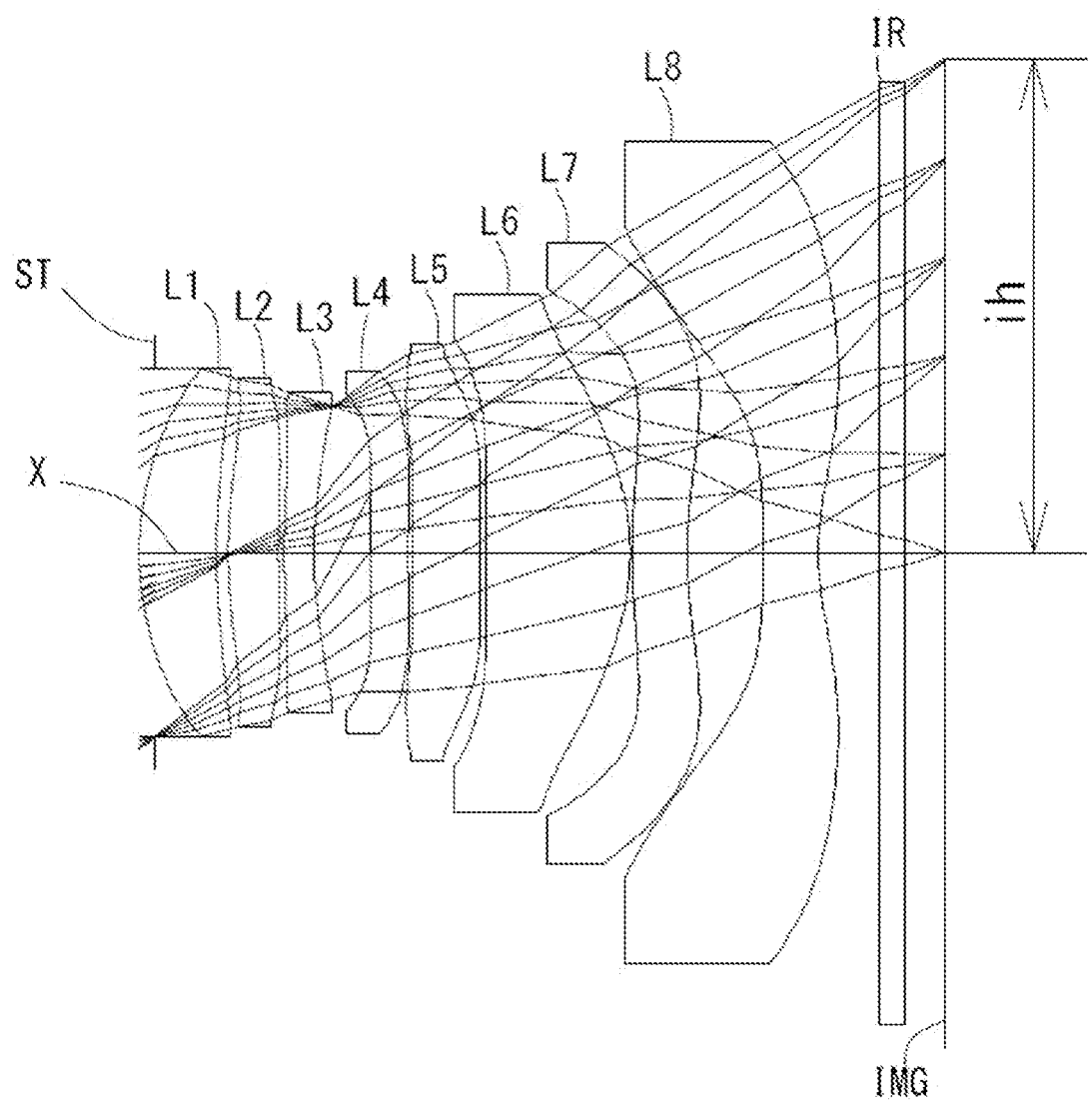
FIG. 15 is a schematic view showing an imaging lens in Example 8 according to the present invention.

FIG. 14 shows spherical aberration (mm), astigmatism (mm), and distortion (%) of the imaging lens in Example 7. As shown in FIG. 14, each aberration is corrected excellently.

Example 8

The basic lens data is shown below in Table 8.

TABLE 8

Example8

Unit mm f = 4.71　　　　　　　　　　　i h = 3.93
Fno = 1.60　　　　　　　　　　TTL = 6.37
ω(°) = 39.2

Surface Data

| Surface Number i | Curvature Curvature | Surface Distance d | Refractive Index Nd | Abbe Number νd |
|---|---|---|---|---|
| (Object) | Infinity | Infinity | | |
| 1 (Stop) | Infinity | −0.1315 | | |
| 2* | 2.5084 | 0.6151 | 1.544 | 55.86 (ν d1) |
| 3* | 4.6896 | 0.0939 | | |
| 4* | 3.6375 | 0.4001 | 1.544 | 55.86 (ν d2) |
| 5* | 9.1244 | 0.0500 | | |
| 6* | 7.0272 | 0.2400 | 1.671 | 19.48 (ν d3) |
| 7* | 4.0958 | 0.4527 | | |
| 8* | 45.9902 | 0.2981 | 1.535 | 55.66 (ν d4) |
| 9* | 14.4704 | 0.0321 | | |
| 10* | 16.4355 | 0.6404 | 1.535 | 55.66 (ν d5) |
| 11* | 26.3774 | 0.0501 | | |
| 12* | −124.7899 | 1.1542 | 1.544 | 55.86 (ν d6) |
| 13* | −1.8756 | 0.0150 | | |
| 14* | 6.0568 | 0.4388 | 1.671 | 19.48 (ν d7) |
| 15* | 3.5609 | 0.6038 | | |
| 16* | −79.3071 | 0.4430 | 1.535 | 55.66 (ν d8) |
| 17* | 2.0972 | 0.4845 | | |
| 18 | Infinity | 0.2100 | 1.517 | 84.20 |
| 19 | Infinity | 0.3219 | | |
| Image Plane | Infinity | | | |

Constituent Lens Data

| Lens | Start Surface | Focal Length | Composite Focal Length | |
|---|---|---|---|---|
| 1 | 2 | 9.050 | f34 | −10.839 |
| 2 | 4 | 10.835 | f56 | 3.412 |
| 3 | 6 | −15.122 | | |
| 4 | 8 | −39.609 | | |
| 5 | 10 | 80.020 | | |
| 6 | 12 | 3.487 | | |
| 7 | 14 | −13.850 | | |
| 8 | 16 | −3.813 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | 5.364451E−03 | −6.907444E−02 | −6.994301E−02 | −8.351065E−02 | −7.869244E−02 |

TABLE 8-continued

| | | Example8 | | | |
|---|---|---|---|---|---|
| A6 | −3.075671E−02 | 2.303892E−02 | −6.387023E−03 | 1.162823E−01 | 1.080950E−01 |
| A8 | 8.566083E−02 | 2.551471E−02 | 1.175496E−01 | −1.429724E−01 | −9.632944E−02 |
| A10 | −1.391805E−01 | −7.518916E−02 | −2.511961E−01 | −3.470973E−02 | −2.074334E−01 |
| A12 | 1.396531E−01 | 8.252330E−02 | 2.809506E−01 | 2.795942E−01 | 6.370717E−01 |
| A14 | −8.821545E−02 | −4.768431E−02 | −1.840872E−01 | −3.182735E−01 | −7.211848E−01 |
| A16 | 3.408806E−02 | 1.433549E−02 | 7.038106E−02 | 1.759011E−01 | 4.322776E−01 |
| A18 | −7.324993E−03 | −1.865768E−03 | −1.481643E−02 | −5.004974E−02 | −1.369182E−01 |
| A20 | 6.653422E−04 | 3.751796E−05 | 1.296233E−03 | 5.916703E−03 | 1.812032E−02 |

| | Tenth Surface | Eleventh Surface | Twelfth Surface | Thirteenth Surface | Fourteenth Surface |
|---|---|---|---|---|---|
| k | 0.000000E+00 | 0.000000E+00 | 0.000000E+00 | −8.234970E+00 | −2.975962E+00 |
| A4 | −1.651272E−01 | 1.184390E−01 | 1.449418E−01 | −8.152076E−02 | −3.216480E−02 |
| A6 | −1.108751E+00 | −7.059335E−01 | −6.809754E−01 | 9.398760E−02 | 1.401597E−02 |
| A8 | 1.916223E+00 | 1.243800E+00 | 1.042486E+00 | −8.133536E−02 | −2.514762E−02 |
| A10 | −1.687405E+00 | −1.250000E+00 | −1.109510E+00 | 5.700771E−02 | 2.096782E−02 |
| A12 | 8.801090E−01 | 7.339716E−01 | 7.147250E−01 | −3.303984E−02 | −1.005584E−02 |
| A14 | −2.811729E−01 | −2.404617E−01 | −2.802825E−01 | 1.322107E−02 | 6.131013E−03 |
| A16 | 5.275933E−02 | 3.760966E−02 | 6.531625E−02 | −3.157925E−03 | −1.148056E−03 |
| A18 | −4.951195E−03 | −1.058203E−03 | −8.234522E−03 | 4.012433E−04 | 1.332558E−04 |
| A20 | 1.350694E−04 | −2.443007E−04 | 4.498561E−04 | −2.092758E−05 | −6.221267E−06 |

| | | Aspheric Surface Data | | |
|---|---|---|---|---|
| | | Seventh Surface | Eighth Surface | Ninth Surface |
| | k | 0.000000E+00 | 0.000000E+00 | −1.740052E+02 |
| | A4 | −1.209218E−02 | 1.135900E−02 | 2.235428E−01 |
| | A6 | −7.207133E−02 | −1.601005E−01 | −1.247610E+00 |
| | A8 | 3.465353E−01 | 2.710609E−01 | 2.297114E+00 |
| | A10 | −6.283268E−01 | −2.991265E−01 | −2.365440E+00 |
| | A12 | 1.469950E+00 | 1.665878E−01 | 1.611796E+00 |
| | A14 | −1.414210E+00 | −8.941981E−02 | −6.042800E−01 |
| | A16 | 8.207519E−01 | 8.314158E−02 | 1.365897E−01 |
| | A18 | −2.655846E−01 | −4.962753E−02 | −1.222235E−02 |
| | A20 | 3.706744E−02 | 1.111298E−02 | −3.875018E−04 |

| | | Fifteenth Surface | Sixteenth Surface | Seventeenth Surface |
|---|---|---|---|---|
| | k | 0.000000E+00 | −1.864901E+02 | −5.100600E+00 |
| | A4 | −5.919973E−02 | −1.288412E−01 | −9.073913E−02 |
| | A6 | 8.411911E−03 | 2.840614E−02 | 3.774853E−02 |
| | A8 | 1.107383E−03 | 3.969881E−04 | −1.173706E−02 |
| | A10 | −2.280386E−03 | −1.953762E−03 | 2.705942E−03 |
| | A12 | 1.410899E−03 | 7.871368E−04 | −4.290455E−04 |
| | A14 | −3.645429E−04 | −1.727576E−04 | 4.377913E−05 |
| | A16 | 5.110221E−05 | 2.221373E−05 | −2.696938E−06 |
| | A18 | −4.035571E−06 | −1.483567E−06 | 8.965640E−08 |
| | A20 | 1.475730E−07 | 3.965277E−08 | −1.200345E−09 |

The imaging lens in Example 8 satisfies conditional expressions (1) to (15) as shown in Table 16.

Figure 16:
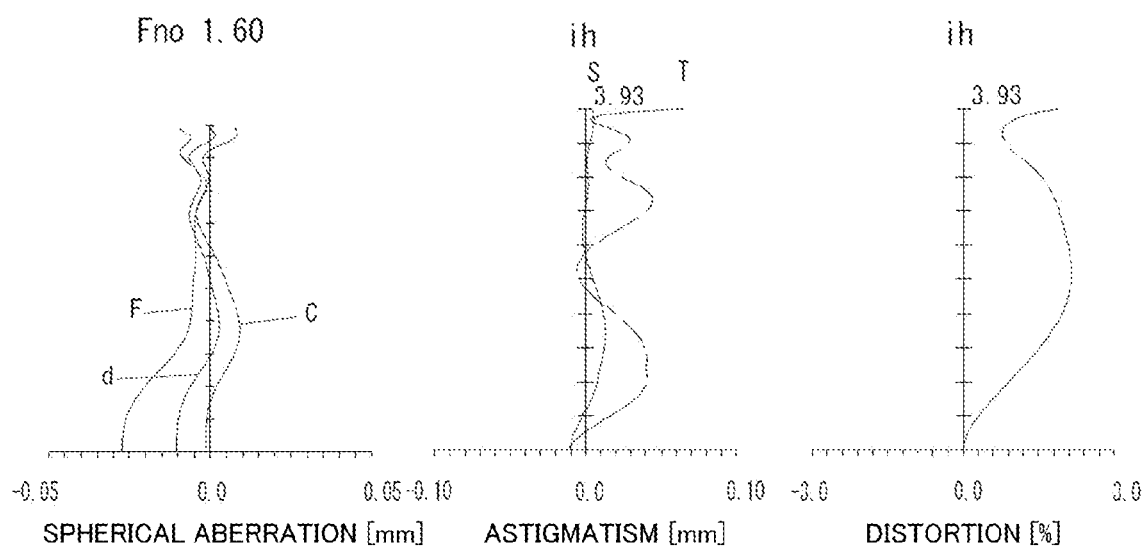
FIG. 16 shows spherical aberration, astigmatism, and distortion of the imaging lens in Example 8 according to the present invention.
Figure 17:
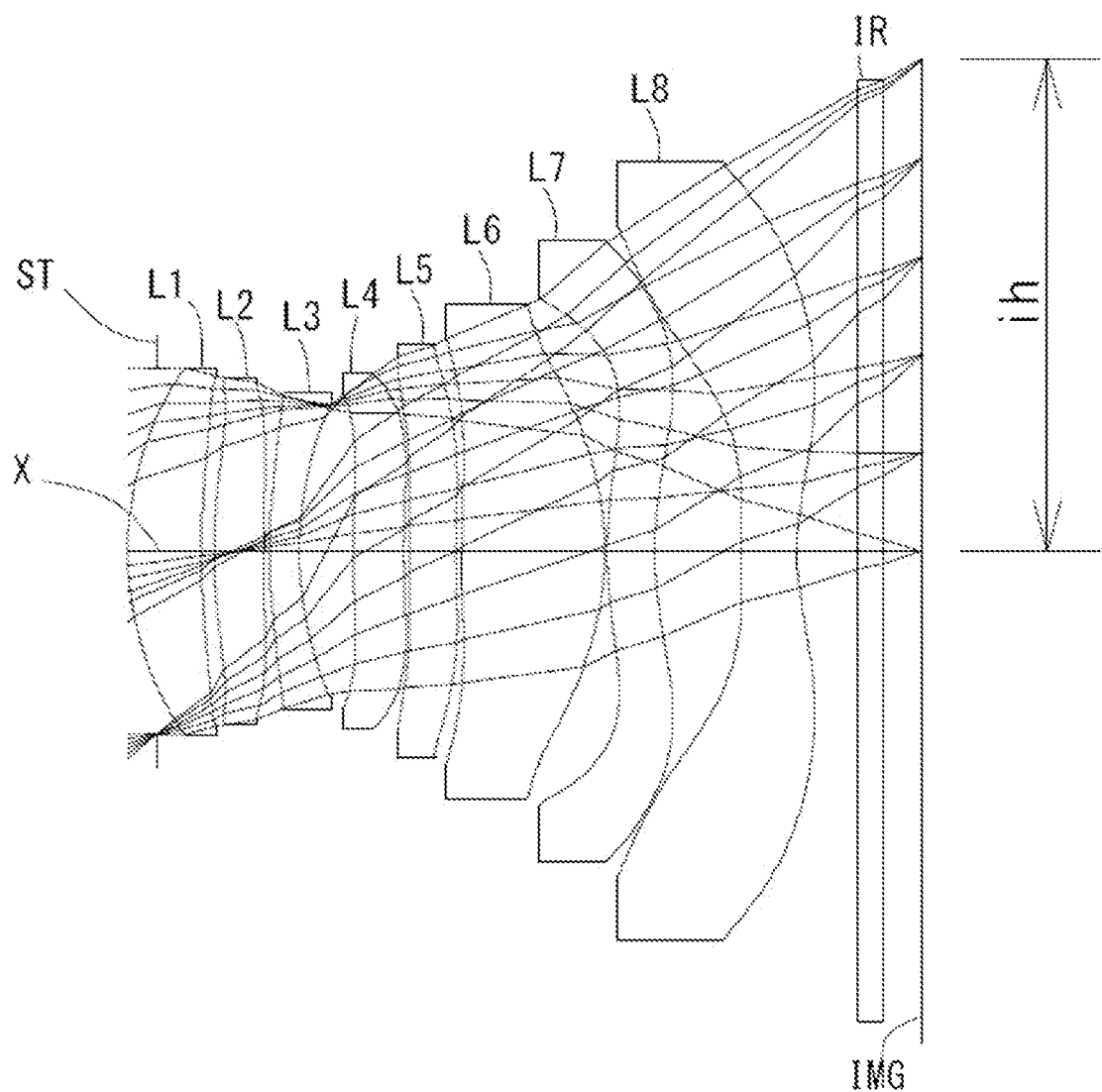
FIG. 17 is a schematic view showing an imaging lens in Example 9 according to the present invention.

FIG. 16 shows spherical aberration (mm), astigmatism (mm), and distortion (%) of the imaging lens in Example 8. As shown in FIG. 16, each aberration is corrected excellently.

Example 9

The basic lens data is shown below in Table 9.

TABLE 9

| Example9 |
|---|
| Unit mm |

| | |
|---|---|
| f = 4.71 | i h = 3.93 |
| Fno = 1.60 | TTL = 6.29 |
| ω(°) = 39.7 | |

TABLE 9-continued

Example9

Surface Data

| Surface Number i | Curvature Curvature | Surface Distance d | Refractive Index Nd | Abbe Number νd |
|---|---|---|---|---|
| (Object) | Infinity | Infinity | | |
| 1 (Stop) | Infinity | −0.2272 | | |
| 2* | 2.5926 | 0.5869 | 1.544 | 55.86 (ν d1) |
| 3* | 5.0038 | 0.1005 | | |
| 4* | 3.6028 | 0.4000 | 1.544 | 55.86 (ν d2) |
| 5* | 8.4914 | 0.0500 | | |
| 6* | 4.1435 | 0.2400 | 1.671 | 19.48 (ν d3) |
| 7* | 2.6815 | 0.4348 | | |
| 8* | 12.6389 | 0.4024 | 1.535 | 55.66 (ν d4) |
| 9* | 11.4834 | 0.0444 | | |
| 10* | 21.8417 | 0.3711 | 1.671 | 19.48 (ν d5) |
| 11* | 9.3845 | 0.6501 | | |
| 12* | 13.0694 | 1.1477 | 1.544 | 55.86 (ν d6) |
| 13* | −2.2784 | 0.8160 | | |
| 14* | 3.7069 | 0.3805 | 1.671 | 19.48 (ν d7) |
| 15* | 3.0265 | 0.6992 | | |
| 16* | 80.5010 | 0.4430 | 1.535 | 55.66 (ν d8) |
| 17* | 2.0917 | 0.4845 | | |
| 18 | Infinity | 0.2100 | 1.517 | 64.20 |
| 19 | Infinity | 0.3014 | | |
| Image Plane | Infinity | | | |

Constituent Lens Data

| Lens | Start Surface | Focal Length | Composite Focal Length | |
|---|---|---|---|---|
| 1 | 2 | 9.125 | f34 | −11.454 |
| 2 | 4 | 10.653 | f56 | 4.190 |
| 3 | 6 | −12.119 | | |
| 4 | 8 | −267.303 | | |
| 5 | 10 | −24.805 | | |
| 6 | 12 | 3.661 | | |
| 7 | 14 | −31.680 | | |
| 8 | 16 | −4.023 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | 3.426395E−03 | −5.934329E−02 | −8.351809E−02 | −8.239260E−02 | −9.056349E−02 |
| A6 | −3.123431E−02 | 4.883336E−02 | 1.910538E−02 | 1.036461E−01 | 7.528760E−02 |
| A8 | 8.680617E−02 | −6.833902E−02 | −4.534987E−02 | −1.474149E−01 | 8.526479E−02 |
| A10 | −1.391050E−01 | 9.375218E−02 | 9.298771E−02 | 9.220747E−02 | −4.544496E−01 |
| A12 | 1.396213E−01 | −9.034316E−02 | −1.292610E−01 | 1.341479E−02 | 7.953233E−01 |
| A14 | −8.824783E−02 | 5.694599E−02 | 1.101172E−01 | −6.317110E−02 | −7.733356E−01 |
| A16 | 3.408346E−02 | −2.185255E−02 | −5.474043E−02 | 4.394811E−02 | 4.404619E−01 |
| A18 | −7.319014E−03 | 4.502727E−03 | 1.442617E−02 | −1.396241E−02 | −1.378594E−01 |
| A20 | 6.694206E−04 | −3.531468E−04 | −1.528849E−03 | 1.792219E−03 | 1.835081E−02 |

| | Tenth Surface | Eleventh Surface | Twelfth Surface | Thirteenth Surface | Fourteenth Surface |
|---|---|---|---|---|---|
| k | 0.000000E+00 | 0.000000E+00 | 0.000000E+00 | −8.682868E+00 | −1.007195E+01 |
| A4 | 9.311709E−02 | −1.565562E−02 | 2.432245E−02 | −5.231767E−02 | −7.209585E−03 |
| A6 | −6.640181E−01 | −3.789292E−01 | −2.821784E−01 | 2.925387E−02 | −2.559476E−02 |
| A8 | 1.311891E+00 | 8.678853E−01 | 6.056957E−01 | −9.322629E−03 | 8.912656E−04 |
| A10 | −1.488654E+00 | −1.054823E+00 | −7.108876E−01 | 1.054784E−03 | 1.353041E−02 |
| A12 | 1.067357E+00 | 7.861202E−01 | 4.963015E−01 | −2.104006E−03 | −1.403744E−02 |
| A14 | −4.860178E−01 | −3.687968E−01 | −2.130757E−01 | 1.948335E−03 | 6.948403E−03 |
| A16 | 1.354351E−01 | 1.065402E−01 | 5.564029E−02 | −6.507693E−04 | −1.858024E−03 |
| A18 | −2.094155E−02 | −1.739079E−02 | −8.155885E−03 | 9.583021E−05 | 2.689439E−04 |
| A20 | −3.560377E−01 | −3.811830E−05 | 5.601486E−06 | 6.489201E−07 | −5.675473E−06 |

TABLE 9-continued

Example9

Ashperic Surface Data

|  | | Seventh Surface | Eighth Surface | Ninth Surface |
|---|---|---|---|---|
| | k | 0.000000E+00 | 0.000000E+00 | −1.740052E+02 |
| | A4 | −2.758083E−02 | −1.515996E−02 | 1.710971E−01 |
| | A6 | −1.065237E−01 | −8.874314E−02 | −8.423710E−01 |
| | A8 | 5.086552E−01 | 2.812261E−01 | 1.655526E+00 |
| | A10 | −1.553601E+00 | −7.469226E−01 | −2.078084E+00 |
| | A12 | 2.401545E+00 | 1.269697E+00 | 1.719426E+00 |
| | A14 | −2.328115E+00 | −1.363487E+00 | −9.500080E−01 |
| | A16 | 1.382156E+00 | 8.842732E−01 | 3.418519E−01 |
| | A18 | −4.593647E−01 | −3.151023E−01 | −7.307049E−02 |
| | A20 | 6.550588E−02 | 4.738911E−02 | 7.049502E−03 |
| | | Fifteenth Surface | Sixteenth Surface | Seventeenth Surface |
| | k | 0.000000E+00 | −1.664901E+02 | −7.983262E+00 |
| | A4 | −3.545807E−02 | −1.612684E−01 | −7.773978E−02 |
| | A6 | −2.680193E−02 | 7.844559E−02 | 3.258051E−02 |
| | A8 | 2.149553E−02 | −4.394901E−02 | −1.221380E−02 |
| | A10 | −1.171975E−02 | 2.099532E−02 | 3.529112E−03 |
| | A12 | 4.444711E−03 | −6.342170E−03 | −6.983206E−04 |
| | A14 | −1.082500E−03 | 1.175526E−03 | 8.909129E−05 |
| | A16 | 1.596478E−04 | −1.317776E−04 | −6.988251E−06 |
| | A18 | −1.296658E−05 | 8.263601E−06 | 3.028510E−07 |
| | A20 | 4.451175E−07 | −2.205747E−07 | −5.572961E−09 |

The imaging lens in Example 9 satisfies conditional expressions (1) to (15) as shown in Table 16.

Figure 18:
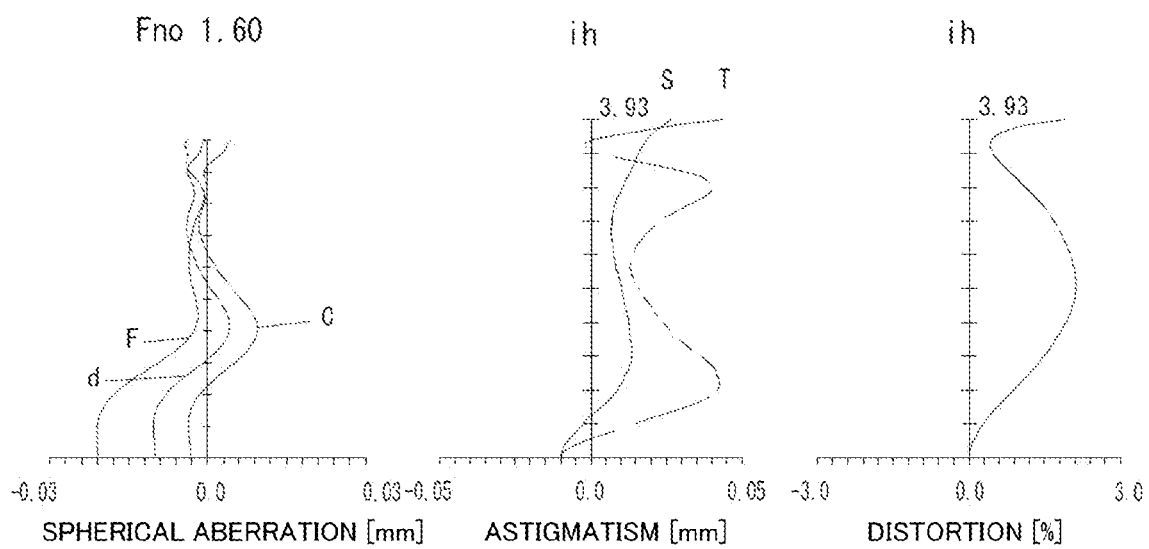
FIG. 18 shows spherical aberration, astigmatism, and distortion of the imaging lens in Example 9 according to the present invention.
Figure 19:
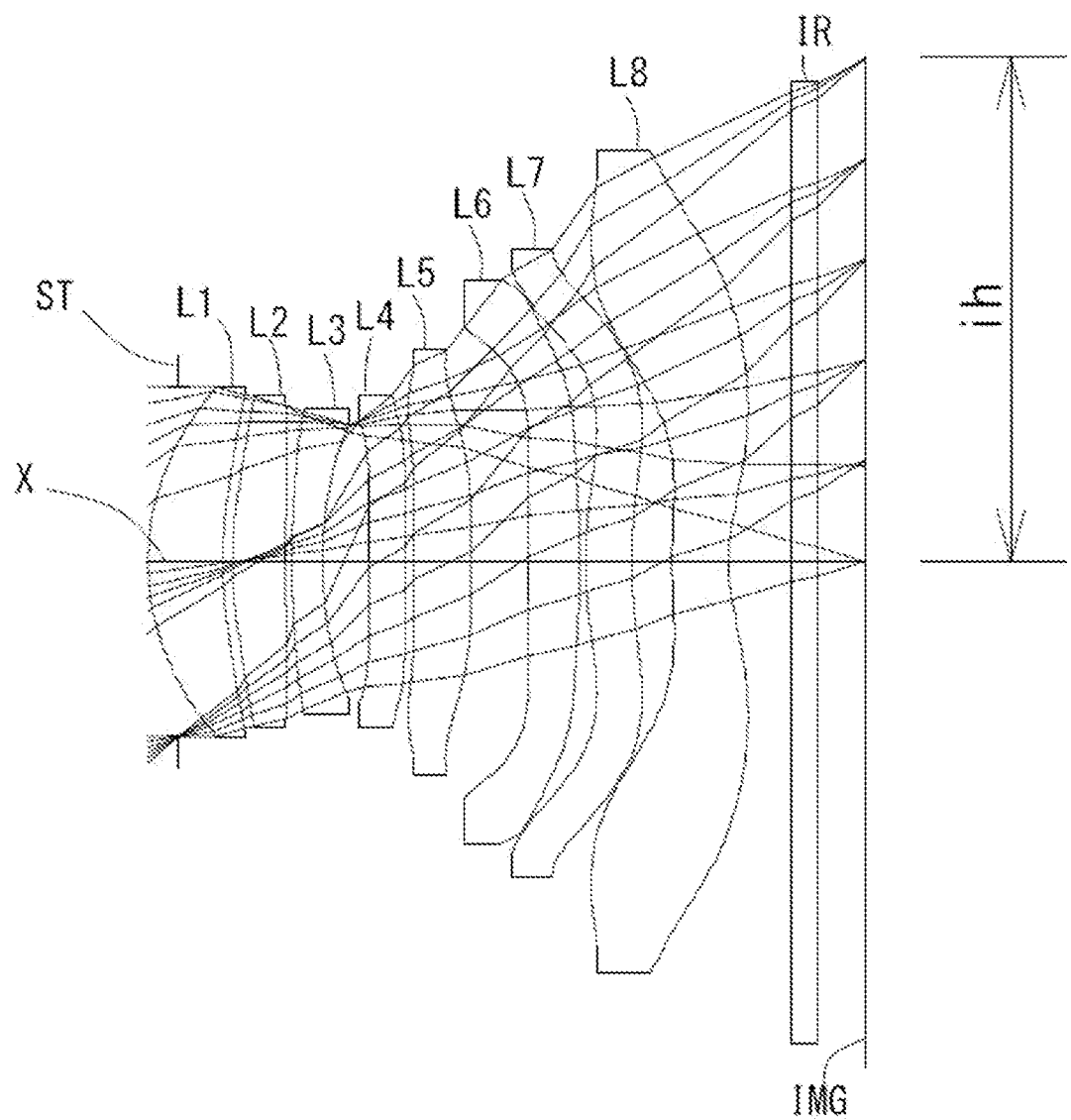
FIG. 19 is a schematic view showing an imaging lens in Example 10 according to the present invention.

FIG. 18 shows spherical aberration (mm), astigmatism (mm), and distortion (%) of the imaging lens in Example 9. As shown in FIG. 18, each aberration is corrected excellently.

Example 10

The basic lens data is shown below in Table 10.

TABLE 10

Example10

Unit mm f = 4.67  
Fno = 1.70  
ω(°) = 39.2  
i h = 3.93  
TTL = 5.54

Surface Data

| Surface Number i | Curvature Curvature | Surface Distance d | Refractive Index Nd | Abbe Number νd |
|---|---|---|---|---|
| (Object) | Infinity | Infinity | | |
| 1 (Stop) | Infinity | −0.2450 | | |
| 2* | 1.9189 | 0.5870 | 1.544 | 55.86 (ν d1) |
| 3* | 3.3302 | 0.0752 | | |
| 4* | 3.1012 | 0.4127 | 1.544 | 55.86 (ν d2) |
| 5* | 7.0485 | 0.0500 | | |
| 6* | 4.6321 | 0.2400 | 1.671 | 19.48 (ν d3) |
| 7* | 2.8681 | 0.3627 | | |
| 8* | 23.8272 | 0.2800 | 1.661 | 20.37 (ν d4) |
| 9* | 13.7875 | 0.0732 | | |
| 10* | 15.3989 | 0.4511 | 1.535 | 55.66 (ν d5) |
| 11* | −21.7478 | 0.4428 | | |
| 12* | −43.7602 | 0.4065 | 1.544 | 55.86 (ν d6) |
| 13* | −5.5682 | 0.0438 | | |
| 14* | 4.3977 | 0.3600 | 1.871 | 19.48 (ν d7) |
| 15* | 5.0011 | 0.3341 | | |

TABLE 10-continued

| Example10 | | | | |
|---|---|---|---|---|
| 16* | 4.6293 | 0.4430 | 1.535 | 55.66 (v d8) |
| 17* | 1.6477 | 0.4845 | | |
| 18 | Infinity | 0.2100 | 1.517 | 64.20 |
| 19 | Infinity | 0.3765 | | |
| Image Plane | Infinity | | | |

Constituent Lens Data

| Lens | Start Surface | Focal Length | Composite Focal Length | |
|---|---|---|---|---|
| 1 | 2 | 7.255 | f34 | −8.513 |
| 2 | 4 | 9.812 | f56 | 7.224 |
| 3 | 6 | −11.865 | | |
| 4 | 8 | −50.079 | | |
| 5 | 10 | 16.929 | | |
| 6 | 12 | 11.918 | | |
| 7 | 14 | 43.793 | | |
| 8 | 16 | −5.045 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | 2.255838E−03 | −3.667393E−02 | −4.176112E−02 | −1.316641E−01 | −1.602746E−01 |
| A6 | −3.179285E−02 | −3.702628E−02 | −3.813657E−02 | 2.034408E−01 | 2.524976E−01 |
| A8 | 8.524310E−02 | 1.335672E−01 | 1.456455E−01 | −1.867723E−01 | −1.342479E−01 |
| A10 | −1.395405E−01 | −3.107805E−01 | −4.247050E−01 | −1.415086E−01 | −4.773670E−01 |
| A12 | 1.395658E−01 | 4.451181E−01 | 7.036330E−01 | 6.760067E−01 | 1.445492E+00 |
| A14 | −8.813530E−02 | −3.793080E−01 | −6.668312E−01 | −9.152546E−01 | −1.922514E+00 |
| A16 | 3.408536E−02 | 1.913887E−01 | 3.671856E−01 | 6.406594E−01 | 1.412129E+00 |
| A18 | −7.328024E−03 | −5.311794E−02 | −1.104116E−01 | −2.335872E−01 | −5.517872E−01 |
| A20 | 6.808898E−04 | 6.257985E−03 | 1.409715E−02 | 3.515180E−02 | 8.960498E−02 |

| | Tenth Surface | Eleventh Surface | Twelfth Surface | Thirteenth Surface | Fourteenth Surface |
|---|---|---|---|---|---|
| k | 0.000000E+00 | 0.000000E+00 | 0.000000E+00 | −3.611852E+01 | −1.353570E+00 |
| A4 | −1.359579E−01 | −7.853512E−02 | 9.019235E−04 | 3.589444E−02 | 6.899755E−02 |
| A6 | 1.957013E−01 | 3.295418E−02 | 1.251154E−01 | 2.101416E−02 | −1.774849E−01 |
| A8 | −3.983212E−01 | −7.093055E−02 | −2.634518E−01 | −7.639402E−02 | 1.092170E−01 |
| A10 | 5.7744213E−01 | 9.468820E−02 | 2.801873E−01 | 6.895875E−02 | −3.166939E−02 |
| A12 | −4.892676E−01 | −7.023904E−02 | −1.652103E−01 | −3.759052E−02 | 1.540241E−04 |
| A14 | 2.540968E−01 | 3.794879E−02 | 6.883187E−02 | 1.303364E−02 | 2.715381E−03 |
| A16 | −8.136053E−02 | −1.437840E−02 | −1.798472E−02 | −2.727868E−03 | −7.870692E−04 |
| A18 | 1.486181E−02 | 3.151283E−03 | 2.641289E−03 | 3.115802E−04 | 9.491173E−05 |
| A20 | −1.194243E−03 | −2.885623E−04 | −1.643216E−04 | −1.491381E−05 | −4.343944E−06 |

Aspheric Surface Data

| | Seventh Surface | Eighth Surface | Ninth Surface |
|---|---|---|---|
| k | 0.000000E+00 | 0.000000E+00 | −4.034014E+02 |
| A4 | −5.126354E−02 | −6.133089E−02 | −8.638084E−02 |
| A6 | 2.568081E−02 | 2.055639E−01 | 2.099274E−01 |
| A8 | 4.227698E−01 | −1.008490E+00 | −6.325360E−01 |
| A10 | −1.706536E+00 | 2.818032E+00 | 1.175763E+00 |
| A12 | 3.526137E+00 | −5.085498E+00 | −1.425088E+00 |
| A14 | −4.336259E+00 | 5.851001E+00 | 1.128342E+00 |
| A16 | 3.190128E+00 | −4.161614E+00 | −5.689557E−01 |
| A18 | −1.292764E+00 | 1.666947E+00 | 1.652374E−01 |
| A20 | 2.222680E−01 | −2.584115E−01 | −2.125189E−02 |

| | Fifteenth Surface | Sixteenth Surface | Seventeenth Surface |
|---|---|---|---|
| k | 0.000000E+00 | −2.680472E+01 | −5.964922E+00 |
| A4 | 8.111158E−02 | −1.656337E−01 | −1.102894E−01 |
| A6 | −1.905804E−01 | 4.264904E−02 | 4.590037E−02 |
| A8 | 1.341615E−01 | −5.058155E−03 | −9.968867E−03 |
| A10 | −5.891368E−02 | 1.381762E−03 | 1.797495E−03 |
| A12 | 1.697107E−02 | −5.053514E−04 | −2.584595E−04 |

TABLE 10-continued

Example10

| | | | | |
|---|---|---|---|---|
| A14 | −3.138650E−03 | 9.763103E−05 | 2.720106E−05 |
| A16 | 3.522985E−04 | −1.000292E−05 | −1.785778E−06 |
| A18 | −2.131385E−05 | 5.296822E−07 | 6.117823E−08 |
| A20 | 5.138442E−07 | −1.150695E−08 | −7.744718E−10 |

The imaging lens in Example 10 satisfies conditional expressions (1) to (15) as shown in Table 16.

Figure 20:
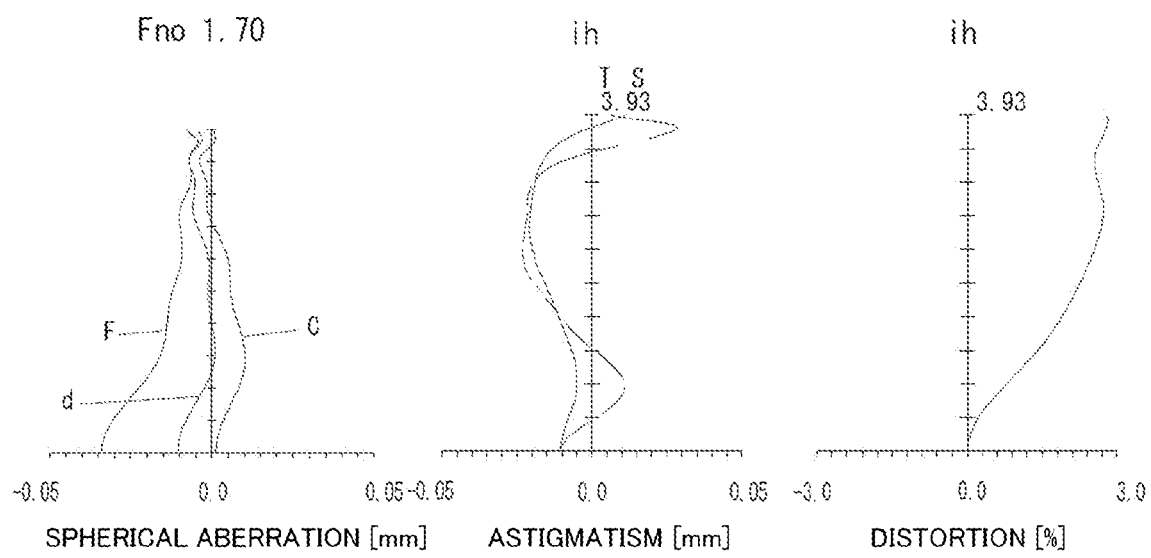
FIG. 20 shows spherical aberration, astigmatism, and distortion of the imaging lens in Example 10 according to the present invention.
Figure 21:
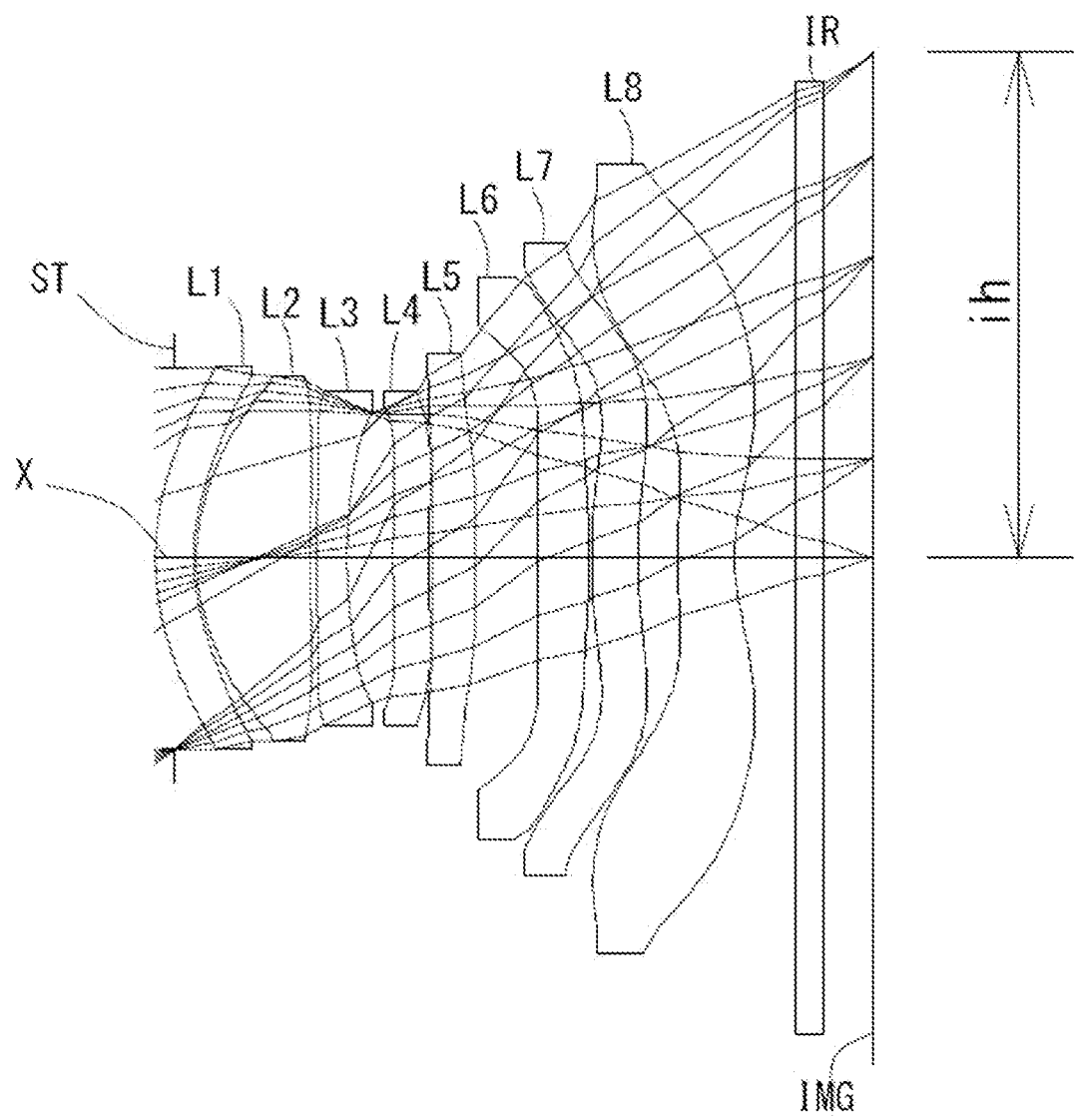
FIG. 21 is a schematic view showing an imaging lens in Example 11 according to the present invention.

FIG. 20 shows spherical aberration (mm), astigmatism (mm), and distortion (%) of the imaging lens in Example 10. As shown in FIG. 20, each aberration is corrected excellently.

Example 11

The basic lens data is shown below in Table 11.

TABLE 11

Example11

Unit mm f = 4.66  
Fno = 1.55  
ω(°) = 39.2  
i h = 3.93  
TTL = 5.54

Surface Data

| Surface Number i | Curvature Curvature | Surface Distance d | Refractive Index Nd | Abbe Number νd |
|---|---|---|---|---|
| (Object) | Infinity | Infinity | | |
| 1 (Stop) | Infinity | −0.1449 | | |
| 2* | 2.1517 | 0.3000 | 1.614 | 25.58 (ν d1) |
| 3* | 1.8120 | 0.0200 | | |
| 4* | 1.6562 | 0.8561 | 1.544 | 55.86 (ν d2) |
| 5* | 6.2783 | 0.0500 | | |
| 6* | 7.0514 | 0.2400 | 1.671 | 19.48 (ν d3) |
| 7* | 3.8740 | 0.3617 | | |
| 8* | 13.1840 | 0.2800 | 1.861 | 20.37 (ν d4) |
| 9* | 13.2488 | 0.0241 | | |
| 10* | 9.3361 | 0.3351 | 1.535 | 55.68 (ν d5) |
| 11* | 29.8944 | 0.4965 | | |
| 12* | −31.1339 | 0.3994 | 1.544 | 55.96 (ν d6) |
| 13* | −5.5029 | 0.0150 | | |
| 14* | 4.9917 | 0.3648 | 1.671 | 19.48 (ν d7) |
| 15* | 4.9861 | 0.3062 | | |
| 16* | 3.0413 | 0.4433 | 1.635 | 55.68 (ν d8) |
| 17* | 1.4308 | 0.4845 | | |
| 18 | Infinity | 0.2100 | 1.617 | 64.20 |
| 19 | Infinity | 0.3912 | | |
| Image Plane | Infinity | | | |

Constituent Lens Data

| Lens | Start Surface | Focal Length | Composite Focal Length | |
|---|---|---|---|---|
| 1 | 2 | −28.141 | f34 | −13.213 |
| 2 | 4 | 3.632 | f56 | 8.486 |
| 3 | 6 | −13.207 | | |
| 4 | 8 | 1500.651 | | |
| 5 | 10 | 25.241 | | |
| 6 | 12 | 12.214 | | |
| 7 | 14 | 263.092 | | |
| 8 | 16 | −5.588 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | −1.010278E−02 | 1.073642E−02 | 1.001357E−02 | −1.287908E−01 | −1.533791E−01 |

TABLE 11-continued

| | | Example11 | | | |
|---|---|---|---|---|---|
| A6  | −3.586948E−02 | −2.833175E−01 | −1.606243E−01 | 2.498131E−01 | 1.215358E−01 |
| A8  | 8.675216E−02 | 5.821885E−01 | 1.453468E−01 | −4.600153E−01 | 1.649242E−01 |
| A10 | −1.391135E−01 | −7.476868E−01 | 1.199561E−01 | 6.387732E−01 | −6.977306E−01 |
| A12 | 1.397305E−01 | 6.177524E−01 | −4.402943E−01 | −6.473584E−01 | 1.115761E+00 |
| A14 | −8.816305E−02 | −3.251111E−01 | 4.786558E−01 | 4.431272E−01 | −1.021832E+00 |
| A16 | 3.406590E−02 | 1.045508E−01 | −2.683558E−01 | −1.850964E−01 | 5.627711E−01 |
| A18 | −7.330397E−03 | −1.835374E−02 | 7.842437E−02 | 4.136408E−02 | −1.731158E−01 |
| A20 | 6.675522E−04 | 1.283202E−03 | −9.510418E−03 | −3.727672E−03 | 2.274811E−02 |

| | Tenth Surface | Eleventh Surface | Twelfth Surface | Thirteenth Surface | Fourteenth Surface |
|---|---|---|---|---|---|
| k   | 0.000000E+00 | 0.000000E+00 | 0.000000E+00 | −3.449505E+01 | 2.000000E−01 |
| A4  | −2.778991E−01 | −1.292417E−01 | −3.656186E−02 | −4.520081E−02 | 2.050298E−02 |
| A6  | 1.162099E+00 | 2.240041E−01 | 2.307990E−01 | 2.850639E−01 | −2.503093E−02 |
| A8  | −3.153465E+00 | −4.530744E−01 | −3.611961E−01 | −4.129629E−01 | −6.654844E−02 |
| A10 | 4.834776E+00 | 5.469680E−01 | 2.817120E−01 | 3.028971E−01 | 7.765780E−02 |
| A12 | −4.466807E+00 | −3.695183E−01 | −1.357798E−01 | −1.354079E−01 | −4.139387E−02 |
| A14 | 2.583552E+00 | 1.471541E−01 | 4.242023E−02 | 3.829053E−02 | 1.276548E−02 |
| A16 | −9.243889E−01 | −3.506542E−02 | −8.651106E−03 | −6.670562E−03 | −2.301159E−03 |
| A18 | 1.882048E−01 | 4.736067E−03 | 1.076653E−03 | 6.528502E−04 | 2.241350E−04 |
| A20 | −1.673055E−02 | −2.855568E−04 | −6.175403E−05 | −2.749774E−05 | −9.097152E−06 |

| | | Aspheric Surface Data | | |
|---|---|---|---|---|
| | | Seventh Surface | Eighth Surface | Ninth Surface |
| | k   | 0.000000E+00 | 0.000000E+00 | 0.000000E+00 |
| | A4  | −4.890425E−02 | −1.677292E−02 | −1.562579E−01 |
| | A6  | −2.980932E−02 | 1.522478E−01 | 9.929889E−01 |
| | A8  | 3.954220E−01 | −9.197160E−01 | −3.227816E+00 |
| | A10 | −9.229821E−01 | 2.314688E+00 | 5.735798E+00 |
| | A12 | 1.204061E+00 | −3.530217E+00 | −6.374171E+00 |
| | A14 | −9.055335E−01 | 3.347858E+00 | 4.553198E+00 |
| | A16 | 3.674034E−01 | −1.944554E+00 | −2.037951E+00 |
| | A18 | −6.095357E−02 | 6.395576E−01 | 5.216632E−01 |
| | A20 | 3.474853E−04 | −9.144484E−02 | −5.525892E−02 |

| | | Fifteenth Surface | Sixteenth Surface | Seventeenth Surface |
|---|---|---|---|---|
| | k   | 0.000000E+00 | −4.642967E+01 | −8.390597E+00 |
| | A4  | 1.304567E−02 | −1.908972E−01 | −1.060256E−01 |
| | A6  | −6.192061E−02 | 9.558202E−02 | 4.631268E−02 |
| | A8  | 1.550405E−02 | −4.784080E−02 | −1.555881E−02 |
| | A10 | 6.359650E−03 | 1.958380E−02 | 3.977203E−03 |
| | A12 | −5.674877E−03 | −5.074211E−03 | −7.505593E−04 |
| | A14 | 1.825599E−03 | 7.997120E−04 | 9.982941E−05 |
| | A16 | −3.082376E−04 | −7.520963E−05 | −8.869339E−06 |
| | A18 | 2.699983E−05 | 3.901557E−06 | 4.717705E−07 |
| | A20 | −9.676983E−07 | −8.624467E−08 | −1.121785E−08 |

The imaging lens in Example 11 satisfies conditional expressions (1) to (15) as shown in Table 16.

Figure 22:
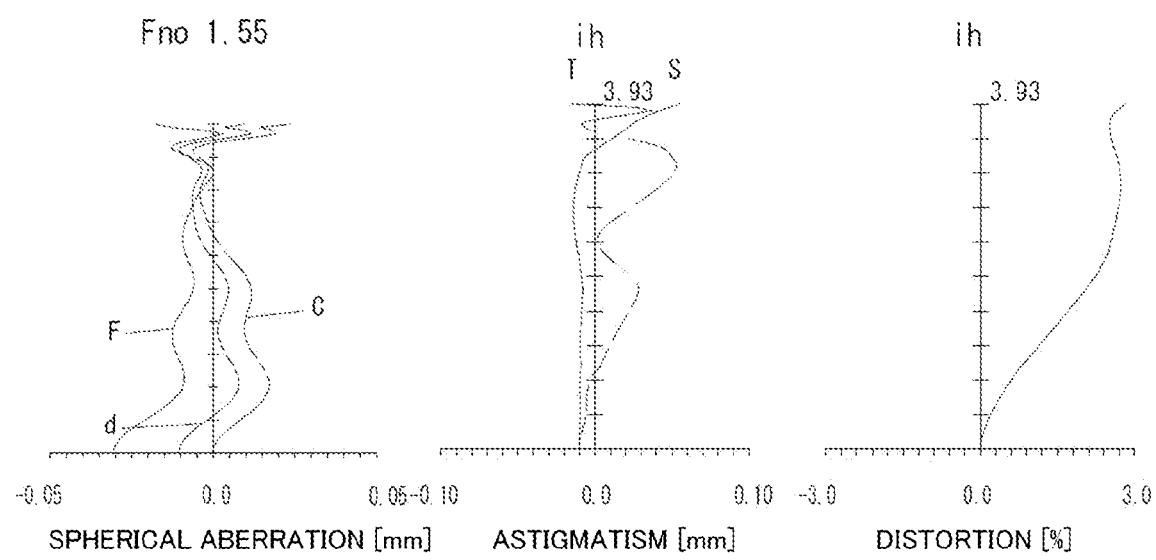
FIG. 22 shows spherical aberration, astigmatism, and distortion of the imaging lens in Example 11 according to the present invention.
Figure 23:
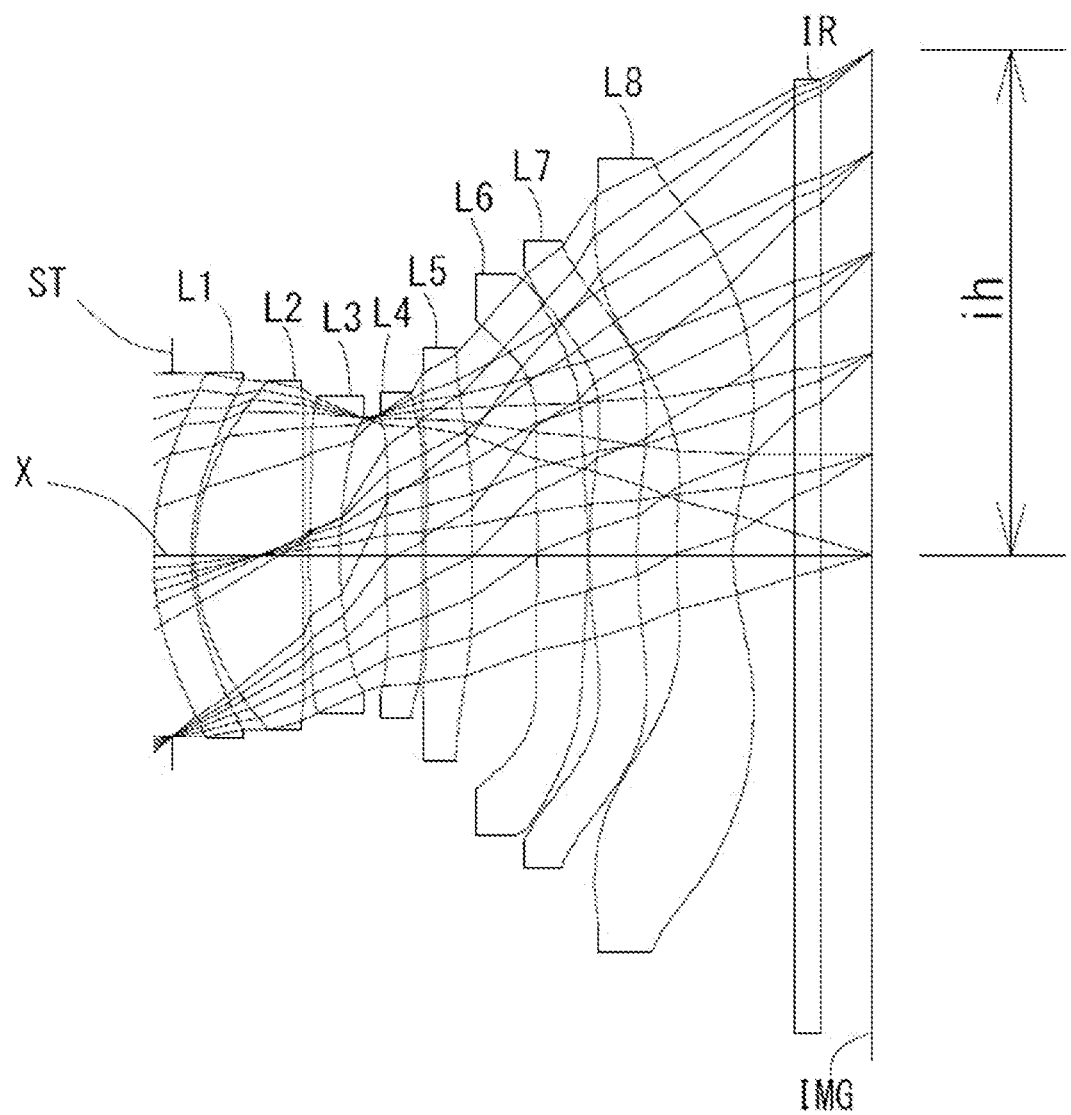
FIG. 23 is a schematic view showing an imaging lens in Example 12 according to the present invention.

FIG. 22 shows spherical aberration (mm), astigmatism (mm), and distortion (%) of the imaging lens in Example 11. As shown in FIG. 22, each aberration is corrected excellently.

Example 12

The basic lens data is shown below in Table 12.

TABLE 12

| Example12 |
|---|
| Unit mm |

| | |
|---|---|
| f = 4.66 | i h = 3.93 |
| Fno = 1.65 | TTL = 5.54 |
| ω(°) = 39.2 | |

TABLE 12-continued

Example12

Surface Data

| Surface Number i (Object) | Curvature Curvature Infinity | Surface Distance d Infinity | Refractive Index Nd | Abbe Number vd |
|---|---|---|---|---|
| 1 (Stop) | Infinity | −0.1485 | | |
| 2* | 2.1945 | 0.3000 | 1.614 | 25.58 (v d1) |
| 3* | 1.8557 | 0.0265 | | |
| 4* | 1.6501 | 0.8401 | 1.544 | 55.66 (v d2) |
| 5* | 8.3136 | 0.0500 | | |
| 6* | 6.0430 | 0.2400 | 1.671 | 19.48 (v d3) |
| 7* | 3.4975 | 0.3633 | | |
| 8* | 18.5613 | 0.2800 | 1.061 | 20.37 (v d4) |
| 9* | 15.3112 | 0.0294 | | |
| 10* | 9.4661 | 0.3562 | 1.535 | 55.86 (v d5) |
| 11* | 62.4677 | 0.5091 | | |
| 12* | −34.4716 | 0.3923 | 1.544 | 55.86 (v d6) |
| 13* | −5.9363 | 0.0150 | | |
| 14* | 4.8252 | 0.3733 | 1.671 | 19.48 (v d7) |
| 15* | 4.9980 | 0.3016 | | |
| 16* | 3.2259 | 0.4430 | 1.535 | 55.86 (v d8) |
| 17* | 1.4695 | 0.4845 | | |
| 18 | Infinity | 0.2100 | 1.517 | 84.20 |
| 19 | Infinity | 0.3930 | | |
| Image Plane | Infinity | | | |

Constituent Lens Data

| Lens | Start Surface | Focal Length | Composite Focal Length | |
|---|---|---|---|---|
| 1 | 2 | −29.479 | f34 | −11.661 |
| 2 | 4 | 3.621 | f56 | 8.310 |
| 3 | 6 | −12.854 | | |
| 4 | 8 | −137.032 | | |
| 5 | 10 | 20.813 | | |
| 6 | 12 | 13.111 | | |
| 7 | 14 | 111.297 | | |
| 8 | 16 | −5.533 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | −1.205942E−02 | −3.501114E−02 | −1.698905E−01 | −1.152905E−01 | −1.557365E−01 |
| A6 | −3.503581E−02 | −1.051086E−01 | −6.707759E−02 | 1.482442E−01 | 1.176947E−01 |
| A8 | 8.593519E−02 | 1.875706E−01 | −1.993871E−02 | −1.281680E−01 | 1.776993E−01 |
| A10 | −1.390869E−01 | −1.500671E−01 | 3.470549E−01 | 2.491704E−02 | −6.905816E−01 |
| A12 | 1.397229E−01 | 2.929100E−01 | −6.998945E−01 | 7.222518E−02 | 1.110530E+00 |
| A14 | −8.817659E−02 | 6.589748E−02 | 7.041392E−01 | −1.000039E−01 | −1.066971E+00 |
| A16 | 3.405726E−02 | −6.221931E−02 | −3.978383E−01 | 7.074537E−02 | 6.332597E−01 |
| A18 | −7.332653E−03 | 2.259328E−02 | 1.207216E−01 | −2.751574E−02 | −2.131223E−01 |
| A20 | 6.687690E−04 | −3.135438E−03 | −1.541731E−02 | 4.385912E−03 | 3.085735E−02 |

| | Tenth Surface | Eleventh Surface | Twelfth Surface | Thirteenth Surface | Fourteenth Surface |
|---|---|---|---|---|---|
| k | 0.000000E+00 | 0.000000E+00 | 0.000000E+00 | −3.909476E+01 | −4.000000E−01 |
| A4 | −1.789633E−01 | −1.030224E−01 | −9.061425E−03 | 9.296236E−03 | 3.561774E−02 |
| A6 | 3.344017E−01 | 9.758122E−02 | 1.302420E−01 | 9.966122E−02 | −9.286335E−02 |
| A8 | −5.802666E−01 | −1.669222E−01 | −2.265236E−01 | −1.600207E−01 | 2.018407E−02 |
| A10 | 5.586700E−01 | 1.960502E−01 | 1.873585E−01 | 1.118661E−01 | 2.369960E−02 |
| A12 | −2.211927E−01 | −1.216873E−01 | −1.015079E−01 | −4.784046E−02 | −2.216553E−02 |
| A14 | −2.537135E−02 | 4.378874E−02 | 3.799397E−02 | 1.317644E−02 | 8.622739E−03 |
| A16 | 5.276956E−02 | −1.013653E−02 | −9.538944E−03 | −2.295468E−03 | −1.768848E−03 |
| A18 | −1.681496E−02 | 1.586150E−03 | 1.425488E−03 | 2.275825E−04 | 1.867779E−04 |
| A20 | 1.778171E−03 | −1.310985E−04 | −9.330489E−05 | −9.784227E−05 | −8.006285E−06 |

Aspheric Surface Data

| | Seventh Surface | Eighth Surface | Ninth Surface |
|---|---|---|---|
| k | 0.000000E+00 | 0.000000E+00 | −3.137729E+02 |
| A4 | −5.043591E−02 | −4.275350E−02 | −8.513194E−02 |

TABLE 12-continued

| | | Example12 | | |
|---|---|---|---|---|
| | A6 | −4.241236E−03 | 2.274643E−01 | 3.176215E−01 |
| | A8 | 2.600667E−01 | −1.145373E+00 | −9.728310E−01 |
| | A10 | −4.574151E−01 | 2.927159E+00 | 1.719486E+00 |
| | A12 | 2.580698E−01 | −4.763871E+00 | −2.082394E−01 |
| | A14 | 2.751860E−01 | 4.965267E+00 | 1.718318E+00 |
| | A16 | −5.317039E−01 | −3.225185E+00 | −9.077581E−01 |
| | A18 | 3.236355E−01 | 1.195065E+00 | 2.747749E−01 |
| | A20 | −7.103199E−02 | −1.923821E−01 | −3.596249E−02 |
| | | Fifteenth Surface | Sixteenth Surface | Seventeenth Surface |
| | k | 0.000000E+00 | −3.761128E+01 | −7.207030E+00 |
| | A4 | 2.733746E−02 | −1.739754E−01 | −1.112679E−01 |
| | A6 | −9.866762E−02 | 5.615875E−02 | 4.327498E−02 |
| | A8 | 5.192833E−02 | −1.463944E−02 | −1.084719E−02 |
| | A10 | −1.214074E−02 | 5.299788E−03 | 1.819740E−03 |
| | A12 | 1.551636E−04 | −1.488497E−03 | −9.612321E−05 |
| | A14 | 8.087691E−04 | 2.505741E−04 | −1.021767E−05 |
| | A16 | −1.942719E−04 | −2.441639E−05 | 2.260762E−06 |
| | A18 | 1.989373E−05 | 1.283367E−06 | −1.500144E−07 |
| | A20 | −7.795914E−07 | −2.833936E−08 | 3.487931E−09 |

The imaging lens in Example 12 satisfies conditional expressions (1) to (15) as shown in Table 16.

Figure 24:
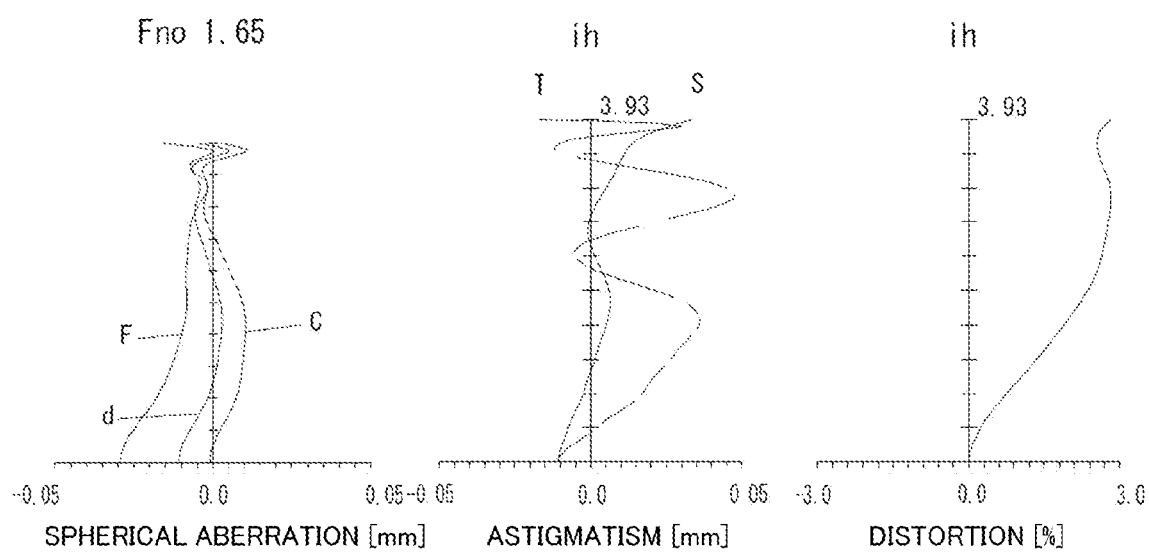
FIG. 24 shows spherical aberration, astigmatism, and distortion of the imaging lens in Example 12 according to the present invention.
Figure 25:
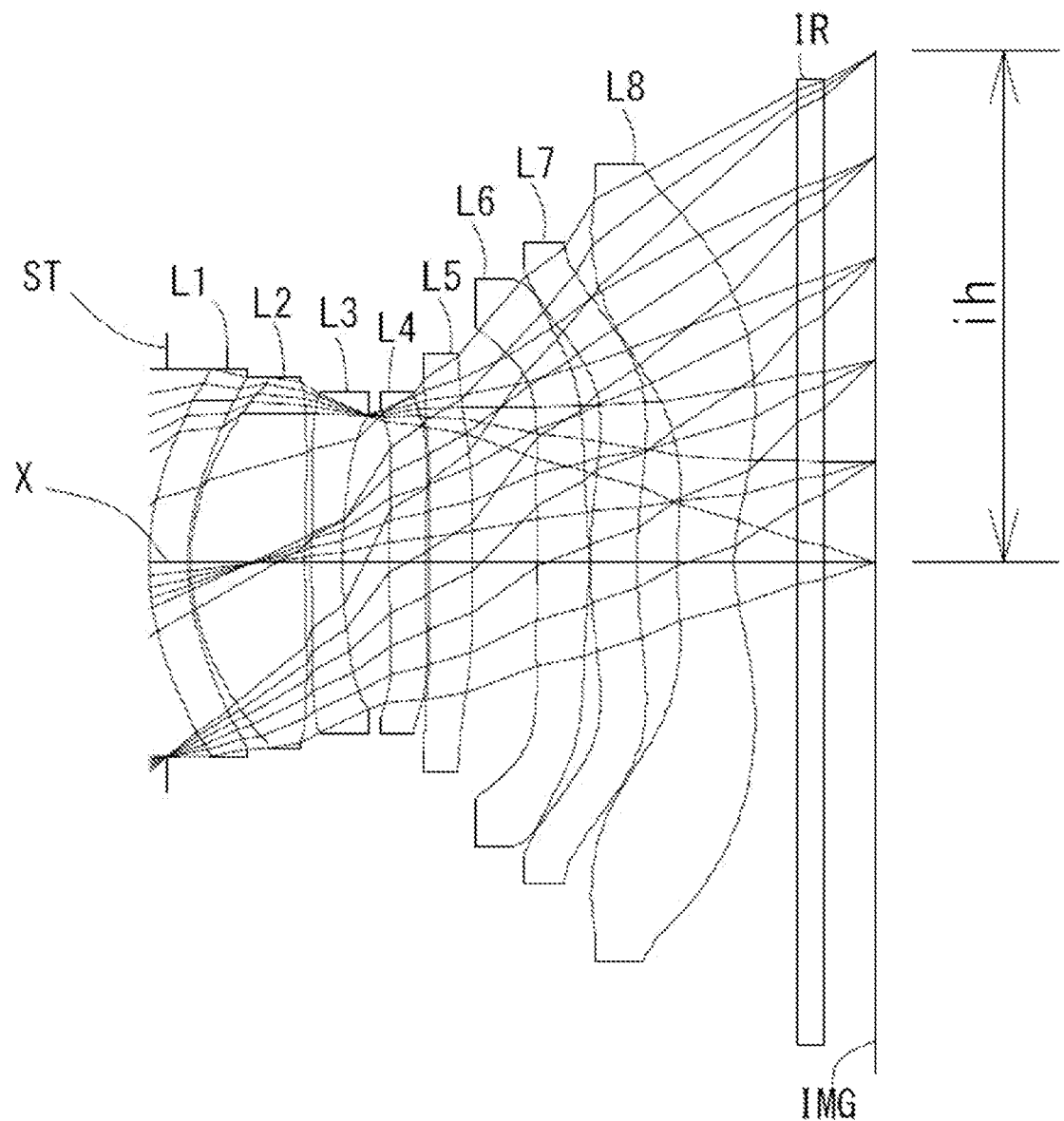
FIG. 25 is a schematic view showing an imaging lens in Example 13 according to the present invention.

FIG. 24 shows spherical aberration (mm), astigmatism (mm), and distortion (%) of the imaging lens in Example 12. As shown in FIG. 24, each aberration is corrected excellently.

Example 13

The basic lens data is shown below in Table 13.

TABLE 13

| Example13 | | | | |
|---|---|---|---|---|
| Unit mm | | | | |
| f = 4.66 | | | i h = 3.93 | |
| Fno = 1.55 | | | TTL = 5.54 | |
| ω(°) = 39.2 | | | | |
| Surface Data | | | | |
| Surface Number i (Object) | Curvature Curvature Infinity | Surface Distance d Infinity | Refractive Index Nd | Abbe Number νd |
| 1 (Stop) | Infinity | −0.1408 | | |
| 2* | 2.1508 | 0.3000 | 1.614 | 25.58 (ν d1) |
| 3* | 1.8055 | 0.0200 | | |
| 4* | 1.6505 | 0.8847 | 1.544 | 55.66 (ν d2) |
| 5* | 7.9116 | 0.0500 | | |
| 6* | 6.8921 | 0.2400 | 1.671 | 19.48 (ν d3) |
| 7* | 3.9021 | 0.3629 | | |
| 8* | 13.1233 | 0.2800 | 1.661 | 20.37 (ν d4) |
| 9* | 13.0088 | 0.0253 | | |
| 10* | 9.3696 | 0.3358 | 1.535 | 55.66 (ν d5) |
| 11* | 31.2761 | 0.4984 | | |
| 12* | −30.2947 | 0.3988 | 1.544 | 55.86 (ν d6) |
| 13* | −5.4701 | 0.0151 | | |
| 14* | 4.9934 | 0.3613 | 1.671 | 19.48 (ν d7) |
| 15* | 4.9850 | 0.3061 | | |
| 16* | 3.0373 | 0.4436 | 1.535 | 55.86 (ν d8) |
| 17* | 1.4297 | 0.4845 | | |
| 18 | Infinity | 0.2100 | 1.517 | 84.20 |
| 19 | Infinity | 0.3918 | | |
| Image Plane | Infinity | | | |

TABLE 13-continued

Example13

Constituent Lens Data

| Lens | Start Surface | Focal Length | Composite Focal Length | |
|---|---|---|---|---|
| 1 | 2 | −27.350 | f34 | −13.724 |
| 2 | 4 | 3.650 | f56 | 8.439 |
| 3 | 6 | −13.844 | | |
| 4 | 8 | −84445.498 | | |
| 5 | 10 | 24.880 | | |
| 6 | 12 | 12.195 | | |
| 7 | 14 | 271.126 | | |
| 8 | 16 | −5.588 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | −1.003929E−02 | 1.181913E−02 | 1.045509E−02 | −1.287439E−02 | −1.534487E−01 |
| A6 | −3.585458E−02 | −2.835422E−01 | −1.477472E−01 | 2.476923E−01 | 1.223996E−01 |
| A8 | 8.578021E−02 | 5.755138E−01 | 1.278041E−01 | −4.483194E−01 | 1.615702E−01 |
| A10 | −1.391055E−01 | −7.298350E−01 | 1.619780E−01 | 6.044723E−01 | −6.901695E−01 |
| A12 | 1.397287E−01 | 5.936255E−01 | −4.973967E−01 | −6.014102E−01 | 1.103378E+00 |
| A14 | −8.816256E−02 | −3.061285E−01 | 5.251071E−01 | 4.075530E−01 | −1.007730E+00 |
| A16 | 3.406551E−02 | 9.590631E−02 | −2.905678E−01 | −1.690811E−01 | 6.528102E−01 |
| A18 | −7.330637E−03 | −1.626930E−02 | 8.416857E−02 | 3.745373E−02 | −1.692989E−01 |
| A20 | 6.674888E−04 | 1.075105E−03 | −1.012955E−02 | −3.326535E−03 | 2.214627E−02 |

| | Tenth Surface | Eleventh Surface | Twelfth Surface | Thirteenth Surface | Fourteenth Surface |
|---|---|---|---|---|---|
| k | 0.000000E+00 | 0.000000E+00 | 0.000000E+00 | −3.449505E+01 | 2.000000E−10 |
| A4 | −2.680805E−01 | −1.307682E−01 | −3.981281E−02 | −4.588337E−02 | 2.133645E−02 |
| A6 | 1.112657E+00 | 2.335859E−01 | 2.464538E−01 | 2.895144E−01 | −2.468602E−02 |
| A8 | −3.018460E+00 | −4.713113E−01 | −3.923009E−01 | −4.205829E−01 | −7.009561E−02 |
| A10 | 4.594752E+00 | 5.600221E−01 | 3.174270E−01 | 3.098735E−01 | 8.219688E−02 |
| A12 | −4.187706E+00 | −3.706905E−01 | −1.613467E−01 | −1.391745E−01 | −4.410935E−02 |
| A14 | 2.378629E+00 | 1.438941E−01 | 5.387023E−02 | 3.950751E−02 | 1.365538E−02 |
| A16 | −8.336343E−01 | −3.335778E−02 | −1.175101E−02 | −6.901724E−03 | −2.466417E−03 |
| A18 | 1.651682E−01 | 4.383252E−03 | 1.535599E−03 | 6.767454E−04 | 2.404368E−04 |
| A20 | −1.447826E−02 | −2.589690E−04 | −9.082283E−05 | −2.853972E−05 | −9.761844E−06 |

Aspheric Surface Data

| | Seventh Surface | Eighth Surface | Ninth Surface |
|---|---|---|---|
| k | 0.000000E+00 | 0.000000E+00 | 0.000000E+00 |
| A4 | −4.912423E−02 | −1.423111E−02 | −1.464068E−01 |
| A6 | −2.695293E−02 | 1.419904E−01 | 9.355436E−01 |
| A8 | 3.798839E−01 | −9.155903E−01 | −3.066597E+00 |
| A10 | −8.716884E−01 | 2.377518E+00 | 5.460194E+00 |
| A12 | 1.099523E+00 | −3.708625E+00 | −6.069169E+00 |
| A14 | −7.734257E−01 | 3.581625E+00 | 4.337504E+00 |
| A16 | 2.667865E−01 | −2.113598E+00 | −1.945485E+00 |
| A18 | −1.883062E−02 | 7.045161E−01 | 4.999774E−01 |
| A20 | −7.757655E−03 | −1.017874E−01 | −5.612865E−02 |

| | Fifteenth Surface | Sixteenth Surface | Seventeenth Surface |
|---|---|---|---|
| k | 0.000000E+00 | −4.642967E+01 | −8.361343E+00 |
| A4 | 1.354480E−02 | −1.916331E−01 | −1.066259E−01 |
| A6 | −6.302902E−02 | 9.610785E−02 | 4.711592E−02 |
| A8 | 1.586564E−02 | −4.770377E−02 | −1.591577E−02 |
| A10 | 6.780955E−03 | 1.933385E−02 | 4.027570E−03 |
| A12 | −6.085272E−03 | −4.962313E−03 | −7.411360E−04 |
| A14 | 1.980080E−03 | 7.755224E−04 | 9.523790E−05 |

TABLE 13-continued

| | Example13 | | |
|---|---|---|---|
| A16 | −3.381278E−04 | −7.234559E−05 | −8.165811E−06 |
| A18 | 2.983710E−05 | 3.721521E−06 | 4.220758E−07 |
| A20 | 1.083660E−06 | −8.155677E−08 | −9.855407E−09 |

The imaging lens in Example 13 satisfies conditional expressions (1) to (15) as shown in Table 16.

Figure 26:
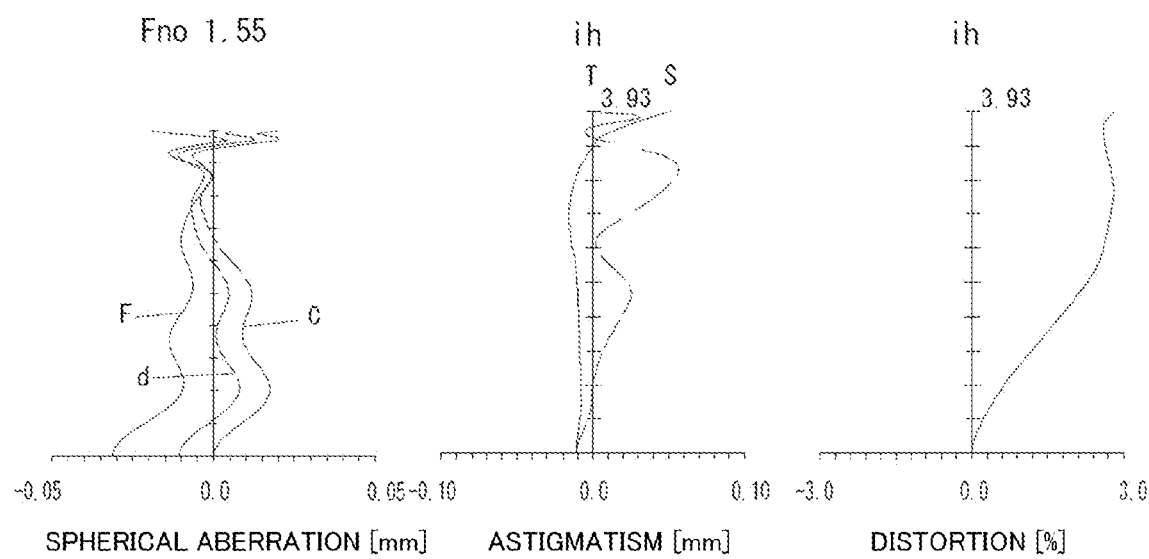
FIG. 26 shows spherical aberration, astigmatism, and distortion of the imaging lens in Example 13 according to the present invention.
Figure 27:
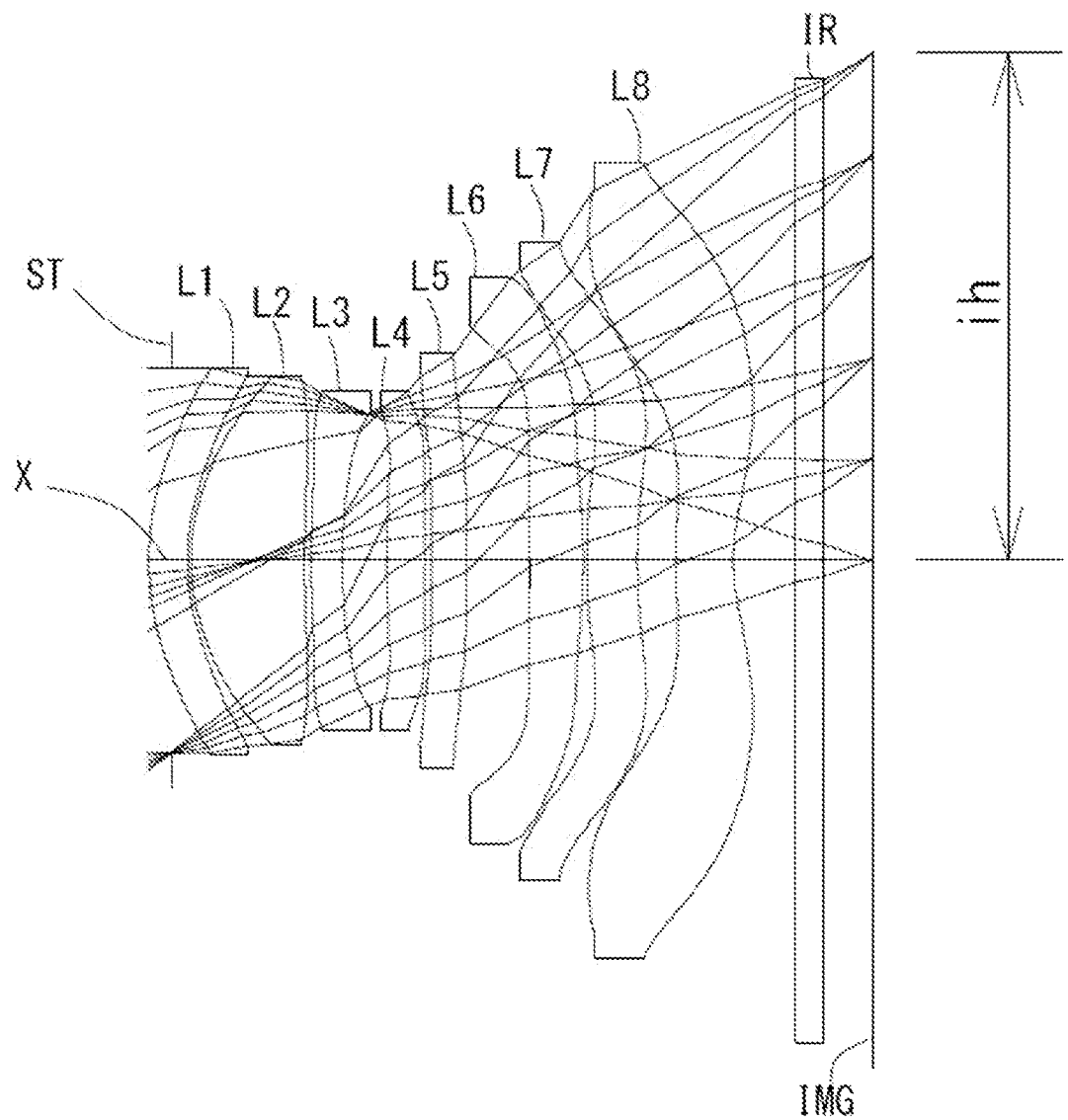
FIG. 27 is a schematic view showing an imaging lens in Example 14 according to the present invention.

FIG. 26 shows spherical aberration (mm), astigmatism (mm), and distortion (%) of the imaging lens in Example 13. As shown in FIG. 26, each aberration is corrected excellently.

Example 14

The basic lens data is shown below in Table 14.

TABLE 14

Example14

Unit mm $f = 4.67$
$Fno = 1.55$
$\omega(°) = 39.2$
$ih = 3.93$
$TTL = 5.54$

Surface Data

| Surface Number i | Curvature Curvature | Surface Distance d | Refractive Index Nd | Abbe Number νd |
|---|---|---|---|---|
| (Object) | Infinity | Infinity | | |
| 1 (Stop) | Infinity | −0.1734 | | |
| 2* | 2.1444 | 0.3000 | 1.614 | 25.58 (ν d1) |
| 3* | 1.7922 | 0.0263 | | |
| 4* | 1.6407 | 0.8809 | 1.544 | 55.56 (ν d2) |
| 5* | 7.2253 | 0.0500 | | |
| 6* | 6.8556 | 0.2400 | 1.671 | 19.48 (ν d3) |
| 7* | 3.6377 | 0.3497 | | |
| 8* | 10.7022 | 0.2963 | 1.544 | 55.86 (ν d4) |
| 9* | 23.8716 | 0.0432 | | |
| 10* | 14.5567 | 0.2695 | 1.671 | 19.48 (ν d5) |
| 11* | 18.9900 | 0.4933 | | |
| 12* | −21.8578 | 0.4175 | 1.544 | 55.86 (ν d6) |
| 13* | −4.9056 | 0.0271 | | |
| 14* | 5.2904 | 0.3949 | 1.671 | 19.48 (ν d7) |
| 15* | 5.2461 | 0.2971 | | |
| 16* | 3.5125 | 0.4456 | 1.535 | 55.86 (ν d8) |
| 17* | 1.5284 | 0.4845 | | |
| 18 | Infinity | 0.2100 | 1.517 | 64.20 |
| 19 | Infinity | 0.3822 | | |
| Image Plane | Infinity | | | |

Constituent Lens Data

| Lens | Start Surface | Focal Length | Composite Focal Length | |
|---|---|---|---|---|
| 1 | 2 | −26.284 | f34 | −25.851 |
| 2 | 4 | 3.694 | f56 | 10.399 |
| 3 | 6 | −14.955 | | |
| 4 | 8 | 35.360 | | |
| 5 | 10 | 90.660 | | |
| 6 | 12 | 11.550 | | |
| 7 | 14 | 331.597 | | |
| 8 | 16 | −5.489 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | −1.035919E−02 | 1.592574E−02 | 1.809089E−02 | −1.241171E−01 | −1.516567E−01 |
| A6 | −3.599710E−02 | −3.234264E−01 | −1.949634E−01 | 2.452632E−01 | 1.272417E−01 |

TABLE 14-continued

| | Example14 | | | | |
|---|---|---|---|---|---|
| A8  | 8.586921E−02  | 6.976698E−01  | 2.540720E−01  | −4.420349E−01 | 1.379277E−01  |
| A10 | −1.390508E−01 | −9.401977E−01 | −6.433763E−02 | 5.911982E−01  | −6.469116E−01 |
| A12 | 1.397431E−01  | 8.167632E−01  | −2.657741E−01 | −5.843337E−01 | 1.049123E+00  |
| A14 | −8.816221E−02 | −4.548940E−01 | 3.762241E−01  | 3.949471E−01  | −8.819606E−01 |
| A16 | 3.406401E−02  | 1.567054E−01  | −2.320486E−01 | −1.635222E−01 | 6.288395E−01  |
| A18 | −7.331605E−03 | −3.018157E−02 | 7.133722E−02  | 3.612253E−02  | −1.623684E−01 |
| A20 | 6.672825E−04  | 2.437583E−03  | −8.928028E−03 | −3.195873E−03 | 2.130273E−02  |

| | Tenth Surface | Eleventh Surface | Twelfth Surface | Thirteenth Surface | Fourteenth Surface |
|---|---|---|---|---|---|
| k   | 0.000000E+00  | 0.000000E+00  | 0.000000E+00  | −3.449505E+01 | 6.000000E−01  |
| A4  | −2.547130E−01 | −1.272932E−01 | −2.924758E−02 | −2.799073E−02 | 2.620973E−02  |
| A6  | 9.393408E−01  | 2.358755E−01  | 2.414040E−01  | 2.352386E−01  | −4.388036E−02 |
| A8  | −2.607538E+00 | −5.047287E−01 | −4.094505E−01 | −3.673449E−01 | −5.646925E−02 |
| A10 | 4.313307E+00  | 6.569068E−01  | 3.553405E−01  | 2.888151E−01  | 8.033502E−02  |
| A12 | −4.361537E+00 | −4.936226E−01 | −1.943644E−01 | −1.379665E−01 | −4.599011E−02 |
| A14 | 2.761513E+00  | 2.244028E−01  | 6.937887E−02  | 4.132463E−02  | 1.471769E−02  |
| A16 | −1.073481E+00 | −6.197368E−02 | −1.598392E−02 | −7.546922E−03 | −2.708805E−03 |
| A18 | 2.347086E−01  | 9.573336E−03  | 2.182510E−03  | 7.672002E−04  | 2.869309E−04  |
| A20 | −2.211445E−02 | −6.577931E−04 | −1.332488E−04 | −3.331165E−05 | −1.090038E−05 |

| | Aspheric Surface Data | | |
|---|---|---|---|
| | Seventh Surface | Eighth Surface | Ninth Surface |
| | 0.000000E+00  | 0.000000E+00  | 0.000000E+00  |
| | −4.936780E−02 | −6.800515E−03 | −1.934888E−01 |
| | −4.155293E−02 | −9.951760E−04 | 1.105202E+00  |
| | 4.462469E−01  | −1.127479E−01 | 3.632510E+00  |
| | −1.032399E+00 | 1.140454E−01  | 6.844843E+00  |
| | 1.328525E+00  | 7.215778E−02  | −8.089031E+00 |
| | −8.705742E−01 | −3.184587E−01 | 6.078108E+00  |
| | 3.680235E−01  | 3.250383E−01  | −2.829741E+00 |
| | −4.733845E−02 | −1.442676E−01 | 7.471277E−01  |
| | −4.303147E−03 | 2.482301E−02  | −8.555570E−02 |

| | Fifteenth Surface | Sixteenth Surface | Seventeenth Surface |
|---|---|---|---|
| | 0.000000E+00  | −4.527985E+01 | −8.437124E+00 |
| | 2.035801E−02  | −1.909067E−01 | −1.072663E−01 |
| | −7.996639E−02 | 9.297962E−02  | 4.584799E−02  |
| | 3.360904E−02  | −4.400508E−02 | −1.436399E−02 |
| | −4.054974E−03 | 1.729995E−02  | 3.318627E−03  |
| | −1.884577E−03 | −4.350465E−03 | −5.602170E−04 |
| | 9.474360E−04  | 6.676737E−04  | 6.679400E−05  |
| | −1.838203E−04 | −6.113030E−05 | −5.397784E−06 |
| | 1.722712E−05  | 3.083433E−06  | 2.688020E−07  |
| | −6.425857E−07 | −6.617025E−08 | −6.160842E−09 |

The imaging lens in Example 14 satisfies conditional expressions (1) to (15) as shown in Table 16.

Figure 28:
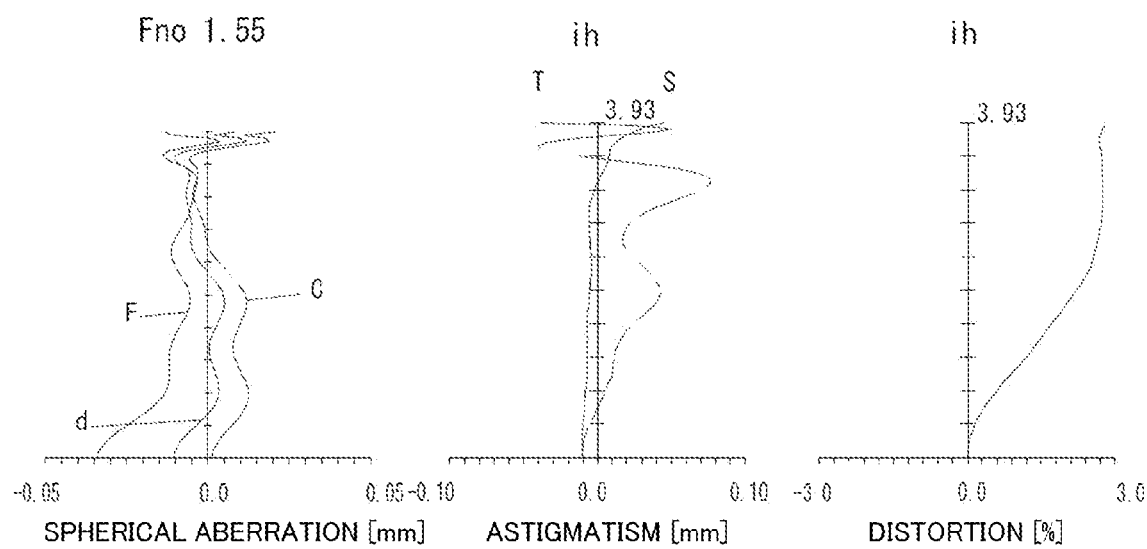
FIG. 28 shows spherical aberration, astigmatism, and distortion of the imaging lens in Example 14 according to the present invention.
Figure 29:
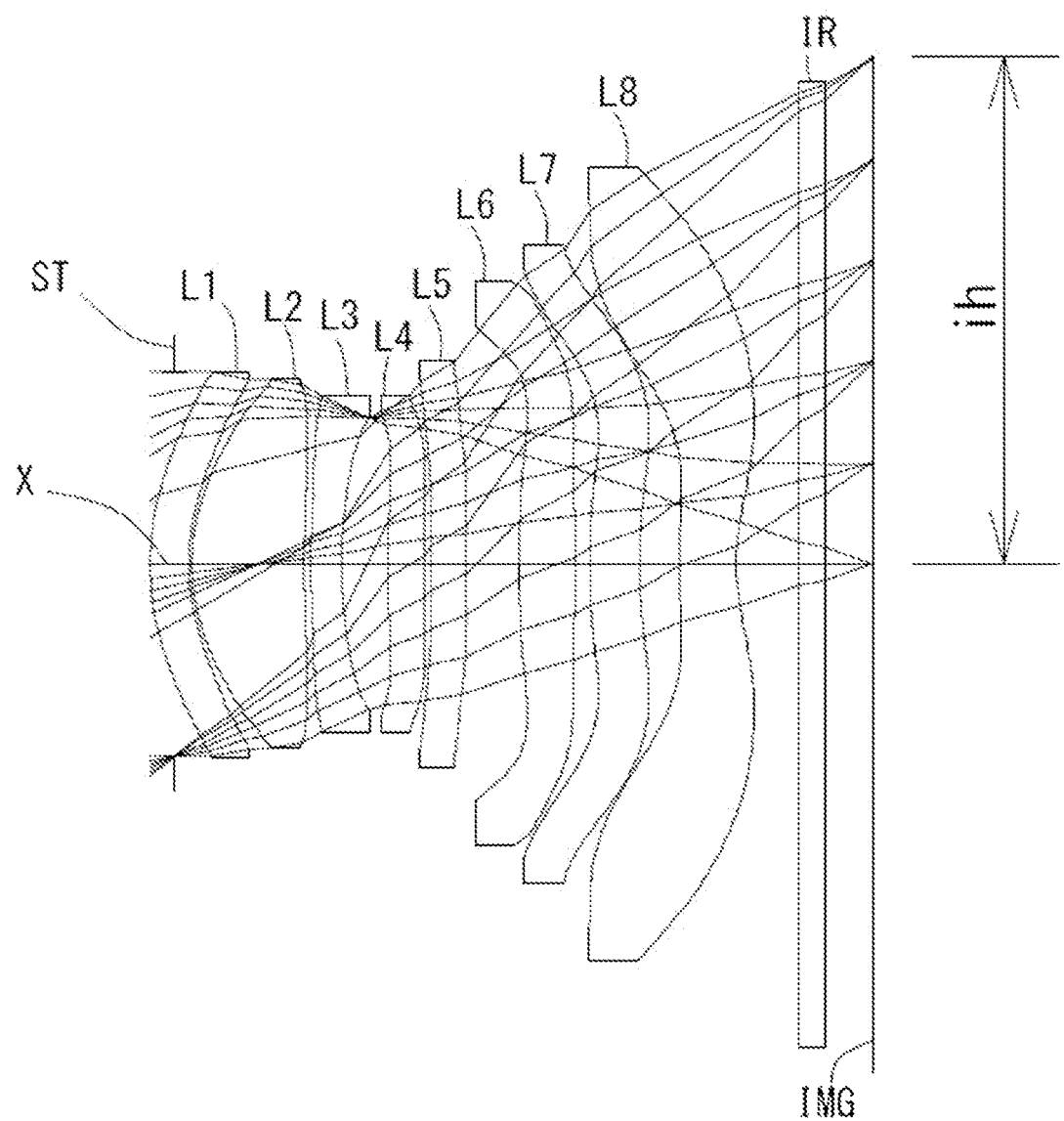
FIG. 29 is a schematic view showing an imaging lens in Example 15 according to the present invention.

FIG. 28 shows spherical aberration (mm), astigmatism (mm), and distortion (%) of the imaging lens in Example 14. As shown in FIG. 28, each aberration is corrected excellently.

Example 15

The basic lens data is shown below in Table 15.

TABLE 15

| Example15 | |
|---|---|
| Unit mm | |
| f = 4.66 | i h = 3.93 |
| Fno = 1.55 | TTL = 5.54 |
| ω(°) = 39.2 | |

TABLE 15-continued

Example15

Surface Data

| Surface Number i | Curvature Curvature | Surface Distance d | Refractive Index Nd | Abbe Number νd |
|---|---|---|---|---|
| (Object) | Infinity | Infinity | | |
| 1 (Stop) | Infinity | −0.1887 | | |
| 2* | 2.1457 | 0.3000 | 1.614 | 25.58 (ν d1) |
| 3* | 1.7984 | 0.0233 | | |
| 4* | 1.6441 | 0.6713 | 1.544 | 55.66 (ν d2) |
| 5* | 6.9421 | 0.0500 | | |
| 6* | 5.2085 | 0.2400 | 1.671 | 19.48 (ν d3) |
| 7* | 3.5029 | 0.3595 | | |
| 8* | 10.8678 | 0.2828 | 1.544 | 55.86 (ν d4) |
| 9* | 15.9897 | 0.0543 | | |
| 10* | 20.5585 | 0.2699 | 1.671 | 19.48 (ν d5) |
| 11* | 13.7816 | 0.4095 | | |
| 12* | 10.0010 | 0.4362 | 1.544 | 55.86 (ν d6) |
| 13* | −6.8688 | 0.1083 | | |
| 14* | 5.3208 | 0.3908 | 1.671 | 19.48 (ν d7) |
| 15* | 5.1721 | 0.3036 | | |
| 16* | 3.4440 | 0.4430 | 1.535 | 55.86 (ν d8) |
| 17* | 1.5500 | 0.4845 | | |
| 18 | Infinity | 0.2100 | 1.517 | 64.20 |
| 10 | Infinity | 0.3723 | | |
| Image Plane | Infinity | | | |

Constituent Lens Data

| Lens | Start Surface | Focal Length | Composite Focal Length | |
|---|---|---|---|---|
| 1 | 2 | −26.941 | f34 | −23.150 |
| 2 | 4 | 3.741 | f56 | 10.054 |
| 3 | 6 | −16.884 | | |
| 4 | 8 | 61.142 | | |
| 5 | 10 | −63.285 | | |
| 6 | 12 | 8.707 | | |
| 7 | 14 | 4934.173 | | |
| 8 | 16 | −5.738 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | 0.000000E+00 | 0.000000E+00 |
| A4 | −1.039293E−02 | 6.531980E−02 | 3.232918E−02 | −1.383309E−01 | −1.514892E−01 |
| A6 | −3.596725E−02 | −5.484489E−01 | −2.461838E−01 | 3.187506E−01 | 1.320678E−01 |
| A8 | 8.585550E−02 | 1.254029E+00 | 3.187377E−01 | −6.319111E−01 | 1.262758E−01 |
| A10 | −1.390739E−01 | −1.773315E+00 | −2.268023E−02 | 8.874112E−01 | −6.343286E−01 |
| A12 | 1.397294E−01 | 1.598121E+00 | −4.460498E−01 | −8.790233E−01 | 1.045067E+00 |
| A14 | −8.816706E−02 | −9.168898E−01 | 5.841848E−01 | 5.830843E−01 | −9.709739E−01 |
| A16 | 3.406376E−02 | 3.242482E−01 | −3.514336E−01 | −2.376677E−01 | 6.421827E−01 |
| A18 | −7.330607E−03 | −6.423595E−02 | 1.063118E−01 | 5.237451E−02 | −1.698469E−01 |
| A20 | 6.680060E−04 | 5.407463E−03 | −1.311248E−02 | −4.696706E−03 | 2.283098E−02 |

| | Tenth Surface | Eleventh Surface | Twelfth Surface | Thirteenth Surface | Fourteenth Surface |
|---|---|---|---|---|---|
| k | 0.000000E+00 | 0.000000E+00 | 0.000000E+00 | −3.449505E+01 | 9.000841E−01 |
| A4 | −2.909711E−01 | −1.591037E−01 | −5.114778E−02 | 3.465943E−02 | 4.936763E−02 |
| A6 | 1.101086E+00 | 3.052521E−01 | 2.523664E−01 | 9.800017E−02 | −9.088957E−02 |
| A8 | −3.004448E+00 | −5.789390E−01 | −4.597557E−01 | −2.038844E−01 | −1.241336E−02 |
| A10 | 5.018737E+00 | 7.143063E−01 | 4.513300E−01 | 1.696418E−01 | 5.248953E−02 |
| A12 | −5.168595E+00 | −5.233775E−01 | −2.735275E−01 | −8.201457E−02 | −3.082503E−02 |
| A14 | 3.328464E+00 | 2.340402E−01 | 1.066116E−01 | 2.433611E−02 | 1.129588E−02 |
| A16 | −1.311447E+00 | −6.395257E−02 | −2.503807E−02 | −4.342347E−03 | −2.129472E−03 |
| A18 | 2.897701E−01 | 9.961638E−03 | 3.522890E−03 | 4.276860E−04 | 2.135672E−04 |
| A20 | −2.753001E−02 | −6.826570E−04 | −2.175921E−04 | −1.793169E−05 | −8.850266E−06 |

TABLE 15-continued

Example15

Aspheric Surface Data

|  | | Seventh Surface | Eighth Surface | Ninth Surface |
|---|---|---|---|---|
| | k | 0.000000E+00 | 0.000000E+00 | 0.000000E+00 |
| | A4 | −4.652242E−02 | 9.332567E−02 | −2.073631E−01 |
| | A6 | −6.937114E−02 | −7.095699E−01 | 1.210795E+00 |
| | A8 | 5.513467E−01 | 2.469027E+00 | −4.007815E+00 |
| | A10 | −1.261420E+00 | −5.649845E+00 | 7.553550E+00 |
| | A12 | 1.646962E+00 | 8.225399E+00 | −8.880387E+00 |
| | A14 | −1.256748E+00 | −7.645811E+00 | 6.608713E+00 |
| | A16 | 5.277153E−01 | 4.381340E+00 | −3.039598E+00 |
| | A18 | −8.761526E−02 | −1.405289E+00 | 7.921933E−01 |
| | A20 | 2.280757E−03 | 1.929082E−01 | −8.960577E−02 |

|  | | Fifteenth Surface | Sixteenth Surface | Seventeenth Surface |
|---|---|---|---|---|
| | k | 0.000000E+00 | −4.917323E+01 | −9.178005E+00 |
| | A4 | 3.466854E−02 | −1.789037E−01 | −9.704356E−02 |
| | A6 | −9.469313E−02 | 6.630755E−02 | 2.601903E−02 |
| | A8 | 3.348821E−02 | −2.183717E−02 | 8.613155E−04 |
| | A10 | 1.868140E−03 | 7.948109E−03 | −3.030739E−03 |
| | A12 | −5.163369E−03 | −2.081754E−03 | 1.007936E−03 |
| | A14 | 1.799220E−03 | 3.360496E−04 | −1.880296E−04 |
| | A16 | −3.046811E−04 | −3.219723E−05 | 1.552949E−05 |
| | A18 | 2.629975E−05 | 1.693527E−06 | −7.521216E−07 |
| | A20 | −8.258052E−07 | −3.789189E−08 | 1.478394E−08 |

The imaging lens in Example 15 satisfies conditional expressions (1) to (15) as shown in Table 16.

Figure 30:
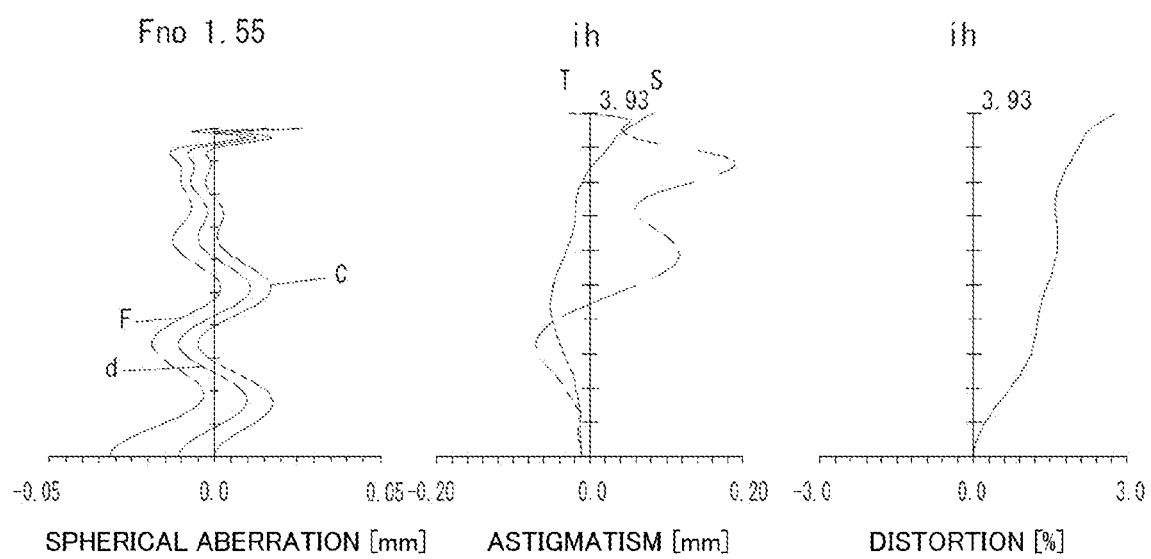
FIG. 30 shows spherical aberration, astigmatism, and distortion of the imaging lens in Example 15 according to the present invention.

FIG. 30 shows spherical aberration (mm), astigmatism (mm), and distortion (%) of the imaging lens in Example 15.

As shown in FIG. 30, each aberration is corrected excellently.

In table 16, values of conditional expressions (1) to (15) related to the Examples 1 to 15 are shown.

TABLE 16

| Conditional expression | Example1 | Example2 | Example3 | Example4 | Example5 | Example6 | Example7 | Example8 |
|---|---|---|---|---|---|---|---|---|
| (1) vd7/vd8 | 0.35 | 0.35 | 0.35 | 0.35 | 0.35 | 0.35 | 0.35 | 0.35 |
| (2) (D1/|f1|) × 100 | 7.33 | 7.61 | 7.48 | 7.55 | 7.13 | 7.77 | 8.58 | 6.80 |
| (3) (D7/TTL) × 100 | 6.14 | 6.15 | 6.11 | 6.14 | 6.21 | 6.02 | 6.38 | 6.89 |
| (4) D4/D8 | 0.63 | 0.64 | 0.65 | 0.63 | 0.63 | 0.64 | 0.65 | 0.67 |
| (5) D7/D8 | 0.81 | 0.81 | 0.81 | 0.81 | 0.83 | 0.83 | 0.88 | 0.99 |
| (6) f6/f | 1.35 | 1.35 | 1.37 | 1.37 | 1.12 | 0.96 | 0.86 | 0.74 |
| (7) |f7|/f | 5.58 | 10.94 | 16.55 | 9.11 | 10.48 | 9.46 | 4.44 | 2.94 |
| (8) f8/f | −0.88 | −0.88 | −0.88 | −0.85 | −0.79 | −0.76 | −0.75 | −0.81 |
| (9) r4/f | 1.72 | 1.82 | 1.76 | 1.75 | 1.89 | 1.94 | 1.87 | 1.94 |
| (10) r12/f | −1.10 | −1.03 | −1.12 | −0.91 | −0.48 | −0.48 | −0.43 | −0.40 |
| (11) (T4/TTL) × 100 | 1.79 | 1.52 | 1.41 | 0.62 | 0.71 | 0.42 | 0.28 | 0.50 |
| (12) |f1|/f | 1.63 | 1.59 | 1.61 | 1.60 | 1.68 | 1.75 | 1.62 | 1.92 |
| (13) |f4|/f | 22.07 | 79.88 | 79.87 | 8.43 | 6.90 | 7.15 | 13.48 | 8.42 |
| (14) f34/f | −2.27 | −2.46 | −2.71 | −2.20 | −2.08 | −2.23 | −2.27 | −2.30 |
| (15) f56/f | 1.28 | 1.33 | 1.32 | 1.24 | 0.92 | 0.85 | 0.78 | 0.72 |

| Conditional expression | Example9 | Example10 | Example11 | Example12 | Example13 | Example14 | Example15 |
|---|---|---|---|---|---|---|---|
| (1) vd7/vd8 | 0.35 | 0.35 | 0.35 | 0.35 | 0.35 | 0.35 | 0.35 |
| (2) (D1/|f1|) × 100 | 6.43 | 8.09 | 1.07 | 1.02 | 1.10 | 1.14 | 1.11 |
| (3) (D7/TTL) × 100 | 8.05 | 8.50 | 6.59 | 6.74 | 6.53 | 7.13 | 7.06 |
| (4) D4/D8 | 0.91 | 0.63 | 0.63 | 0.63 | 0.63 | 0.66 | 0.64 |
| (5) D7/D8 | 0.86 | 0.81 | 0.82 | 0.84 | 0.81 | 0.89 | 0.88 |
| (6) f6/f | 0.78 | 2.55 | 2.62 | 2.81 | 2.61 | 2.48 | 1.87 |
| (7) |f7|/f | 6.73 | 8.39 | 56.41 | 23.87 | 55.13 | 71.14 | 1057.91 |
| (8) f8/f | −0.85 | −1.08 | −1.20 | −1.19* | −1.20 | −1.18 | −1.23 |
| (9) r4/f | 1.80 | 1.51 | 1.77 | 1.78 | 1.70 | 1.55 | 1.49 |
| (10) r12/f | −0.48 | −1.21 | −1.18 | −1.27 | −1.17 | −1.05 | −1.90 |
| (11) (T4/TTL) × 100 | 0.71 | 1.32 | 0.44 | 0.53 | 0.46 | 0.78 | 0.98 |
| (12) |f1|/f | 1.94 | 1.55 | 6.03 | 6.32 | 5.86 | 5.63 | 5.78 |

TABLE 16-continued

| | | | | | | | |
|---|---|---|---|---|---|---|---|
| (13) \|f4\|/f | 56.80 | 10.73 | 321.75 | 29.38 | 18104.82 | 7.58 | 13.11 |
| (14) f34/f | −2.43 | −2.04 | −2.83 | −2.50 | −2.94 | −5.54 | −4.96 |
| (15) f56/f | 0.89 | 1.55 | 1.82 | 1.78 | 1.81 | 2.23 | 2.16 |

When the imaging lens according to the present invention is adopted to a product with the camera function, there is realized contribution to the wide field of view, the low-profileness and the low F-number of the camera and also high performance thereof.

DESCRIPTION OF REFERENCE NUMERALS

ST: an aperture stop,
L1: a first lens,
L2: a second lens,
L3: a third lens,
L4: a fourth lens,
L5: a fifth lens,
L6: a sixth lens,
L7: a seventh lens,
L8: an eighth lens,
ih: a maximum image height,
IR: a filter, and
IMG: an image plane.

What is claimed is:

1. An imaging lens comprising, in order from an object side to an image side,
a first lens having a convex surface facing the object side near an optical axis,
a second lens having positive refractive power near the optical axis,
a third lens having negative refractive power near the optical axis,
a fourth lens,
a fifth lens having positive refractive power near the optical axis,
a sixth lens having positive refractive power near the optical axis,
a seventh lens having positive refractive power near the optical axis, and
an eighth lens having negative refractive power near the optical axis and having a concave surface facing the image side near the optical axis,
wherein
an image-side surface of said eighth lens is formed as an aspheric surface having at least one pole point in a position off the optical axis, and a below conditional expression (3) is satisfied:

$$3.00<(D7/TTL)\times 100<8.70 \qquad (3)$$

where
D7: a thickness along the optical axis of the seventh lens, and
TTL: a total track length.

2. The imaging lens according to claim 1, wherein an image-side surface of said sixth lens is a convex surface facing the image side near the optical axis.

3. The imaging lens according to claim 1, wherein an image-side surface of said seventh lens is a concave surface facing the image side near the optical axis.

4. The imaging lens according to claim 1, wherein a below conditional expression (1) is satisfied:

$$0.15<vd7/vd8<0.55 \qquad (1)$$

where
vd7: an abbe number at d-ray of the seventh lens, and
vd8: an abbe number at d-ray of the eighth lens.

5. The imaging lens according to claim 1, wherein a below conditional expression (2) is satisfied:

$$0.50<(D1/|f1|)\times 100<13.00 \qquad (2)$$

where
D1: a thickness along the optical axis of the first lens, and
f1: a focal length of the first lens.

6. The imaging lens according to claim 1, wherein a below conditional expression (4) is satisfied:

$$0.30<D4/D8<1.20 \qquad (4)$$

where
D4: a thickness along the optical axis of the fourth lens, and
D8: a thickness along the optical axis of the eighth lens.

7. The imaging lens according to claim 1, wherein a below conditional expression (5) is satisfied:

$$0.40<D7/D8<1.40 \qquad (5)$$

where
D7: the thickness along the optical axis of the seventh lens, and
D8: the thickness along the optical axis of the eighth lens.

8. The imaging lens according to claim 1, wherein a below conditional expression (6) is satisfied:

$$0.30<f6/f<4.50 \qquad (6)$$

where
f6: a focal length of the sixth lens, and
f: a focal length of the overall optical system of the imaging lens.

9. The imaging lens according to claim 1, wherein a below conditional expression (7) is satisfied:

$$1.40<|f7|/f \qquad (7)$$

where
f7: a focal length of the seventh lens, and
f: the focal length of the overall optical system of the imaging lens.

10. The imaging lens according to claim 1, wherein a below conditional expression (8) is satisfied:

$$-1.90<f8/f<-0.60 \qquad (8)$$

where
f8: a focal length of the eighth lens, and
f: the focal length of the overall optical system of the imaging lens.

11. The imaging lens according to claim 1, wherein a below conditional expression (9) is satisfied:

$$0.70<r4/f<2.70 \qquad (9)$$

where
r4: paraxial curvature radius of the image-side surface of the second lens, and
f: the focal length of the overall optical system of the imaging lens.

12. The imaging lens according to claim 1, wherein a below conditional expression (10) is satisfied:

$$-3.00 < r12/f < -0.20 \tag{10}$$

where
- r12: paraxial curvature radius of the image-side surface of the sixth lens, and
- f: the focal length of the overall optical system of the imaging lens.

13. An imaging lens comprising, in order from an object side to an image side,
- a first lens having a convex surface facing the object side near an optical axis,
- a second lens having positive refractive power near the optical axis,
- a third lens having negative refractive power near the optical axis,
- a fourth lens,
- a fifth lens having positive refractive power near the optical axis,
- a sixth lens having positive refractive power near the optical axis,
- a seventh lens having positive refractive power near the optical axis, and
- an eighth lens having negative refractive power near the optical axis and having a concave surface facing the image side near the optical axis, wherein
an image-side surface of said eighth lens is formed as an aspheric surface having at least one pole point in a position off the optical axis, and a below conditional expression (5) is satisfied:

$$0.40 < D7/D8 < 1.40 \tag{5}$$

where
- D7: the thickness along the optical axis of the seventh lens, and
- D8: the thickness along the optical axis of the eighth lens.

14. An imaging lens comprising, in order from an object side to an image side,
- a first lens having a convex surface facing the object side near an optical axis,
- a second lens having positive refractive power near the optical axis,
- a third lens having negative refractive power near the optical axis,
- a fourth lens,
- a fifth lens having positive refractive power near the optical axis,
- a sixth lens having positive refractive power near the optical axis,
- a seventh lens having positive refractive power near the optical axis, and
- an eighth lens having negative refractive power near the optical axis and having a concave surface facing the image side near the optical axis, wherein
an image-side surface of said eighth lens is formed as an aspheric surface having at least one pole point in a position off the optical axis, and a below conditional expression (6) is satisfied:

$$0.30 < f6/f < 4.50 \tag{6}$$

where
- f6: a focal length of the sixth lens, and
- f: a focal length of the overall optical system of the imaging lens.

\* \* \* \* \*